US007810069B2

(12) United States Patent
Charisius et al.

(10) Patent No.: US 7,810,069 B2
(45) Date of Patent: Oct. 5, 2010

(54) METHODS AND SYSTEMS FOR RELATING DATA STRUCTURES AND OBJECT-ORIENTED ELEMENTS FOR DISTRIBUTED COMPUTING

(75) Inventors: Dietrich Charisius, Stuttgart (DE); Alexander Aptus, Esslingen (DE)

(73) Assignee: Borland Software Corporation, Rockville, MD (US)

( * ) Notice: Subject to any disclaimer, the term of this patent is extended or adjusted under 35 U.S.C. 154(b) by 1311 days.

(21) Appl. No.: 09/839,526

(22) Filed: Apr. 20, 2001

(65) Prior Publication Data

US 2002/0016954 A1 Feb. 7, 2002

Related U.S. Application Data

(63) Continuation-in-part of application No. 09/680,063, filed on Oct. 4, 2000, now Pat. No. 6,851,107.

(60) Provisional application No. 60/199,046, filed on Apr. 21, 2000, provisional application No. 60/157,826, filed on Oct. 5, 1999.

(51) Int. Cl.
*G06F 9/44* (2006.01)

(52) U.S. Cl. ...................................... 717/110; 717/106

(58) Field of Classification Search ......... 717/104–114, 717/120–123, 168–178, 116, 118; 345/964–970
See application file for complete search history.

(56) References Cited

U.S. PATENT DOCUMENTS 4,203,096 A * 5/1980 Farley et al. ................ 340/538
5,325,531 A * 6/1994 McKeeman et al. .......... 717/145
5,367,468 A * 11/1994 Fukasawa et al. ............. 716/11
5,408,599 A * 4/1995 Nomura et al. ............. 715/273
5,499,371 A * 3/1996 Henninger et al. .......... 717/108
5,630,131 A * 5/1997 Palevich et al. ............. 717/108
5,748,975 A * 5/1998 Van De Vanter ............ 715/236
5,760,788 A * 6/1998 Chainini et al. ............. 345/474
5,883,639 A * 3/1999 Walton et al. ............... 715/762

(Continued)

FOREIGN PATENT DOCUMENTS

EP 1 030 242 A2 8/2000

(Continued)

OTHER PUBLICATIONS

Hedin "Supporting Programming Conventions", 1996, pp. 1-7. available at <http://citeseerx.ist.psu.edu/viewdoc/summary?doi=10.1.1.55.7602> as of Jun. 4, 2009.*

(Continued)

*Primary Examiner*—Jason Mitchell
(74) *Attorney, Agent, or Firm*—Kokka & Backus, PC

(57) ABSTRACT

Methods and systems consistent with the present invention provide an improved software development tool which allows a developer to receive an identification of a data structure with an attribute field in a database, determine whether the data structure is associated with source code, if the data structure is associated with the source code, determine whether an attribute field of the data structure is associated with an attribute in the source code, and if the attribute field is not associated with the attribute in the source code, generate the attribute in the source code from the attribute field.

128 Claims, 43 Drawing Sheets

U.S. PATENT DOCUMENTS

| | | | | |
|---|---|---|---|---|
| 5,983,016 | A * | 11/1999 | Brodsky et al. | 717/104 |
| 6,038,393 | A * | 3/2000 | Iyengar et al. | 717/104 |
| 6,237,135 | B1 * | 5/2001 | Timbol | 717/107 |
| 6,247,020 | B1 * | 6/2001 | Minard | 707/104.1 |
| 6,346,945 | B1 * | 2/2002 | Mansurov et al. | 345/473 |
| 6,366,874 | B1 * | 4/2002 | Lee et al. | 703/14 |
| 6,560,769 | B1 * | 5/2003 | Moore et al. | 717/100 |
| 6,564,368 | B1 * | 5/2003 | Beckett et al. | 717/113 |
| 6,654,954 | B1 * | 11/2003 | Hicks | 717/162 |
| 6,684,385 | B1 * | 1/2004 | Bailey et al. | 717/109 |
| 6,701,513 | B1 * | 3/2004 | Bailey | 717/109 |
| 6,851,107 | B1 * | 2/2005 | Coad et al. | 717/108 |
| 6,874,146 | B1 * | 3/2005 | Iyengar | 719/313 |
| 2002/0078071 | A1 * | 6/2002 | Foster | 707/200 |

FOREIGN PATENT DOCUMENTS

EP 1 030 252 A1 8/2000

OTHER PUBLICATIONS

Hedin "Enforcing programming conventions by attribute extension in an open compiler", 1996, pp. 1-16. available at <http://citeseerx.ist.psu.edu/viewdoc/summary?doi=10.1.1.44.2846> as of Jun. 4, 2009.*

CSC-103 98S: Java Style Guide, last modified 1998, available at <http://www.math.grin.edu/~rebelsky/Courses/CS103/98S/Handouts/java-styleguide.html> as of Jun. 4, 2009.*

Unified Modeling Language (UML) UML Booch & OMT Quick Reference for Rational Rose 4.0.

Rational Rose Corporation, Rational Rose Release 4.0 (Nov. 1996) "Using Rational Rose 4.0" Chapters 3-11, pp. 11-207.

UML Distilled Applying the Standard Object Modeling Language 1997 Martin Fowler with Kendall Scott, Chapters 1-11, pp. 1-173.

James Martin, "Principles of Object-Oriented Analysis and Design," Prentice Hall, Oct. 29, 1992, Chapters 1-22.

M.M. Burnett, et al., "Visual Object-Oriented Programming Concepts and Environments," Manning Publishing, 1994, Chapters 1-12.

Erich Gamma, et al, "Design Patterns Elements of Reusable Object-Oriented Software," Addison-Wesley, 1994, Chapter 1.

Wayne Citrin, et al., "A Formal Definition of Control Semantics in a Completely Visual Language," Sep. 1993, Mac World.

RR Software Inc., "JANUS/ADA 95 Compiler User Manual," Version 5.1 Dec. 1995, pp. 6-1 to 6-48.

F. Penz, "Visual Programming in the ObjectWorld," Journal of Visual Languages and Computing, Mar. 1991, vol. 2, p. 17-41.

L. Vanhelsuwe, "Mastering Javabeans," Sybex, Chapter 2.

David Withey McIntrye, "A Visual Method for Generating Iconic Programming Environments," UMI Dissertation Services.

Java Blend Application Programming Guide (Nov. 1999) Chapters 1-7, pp. 1-140.

Java Blen Tutorial (Nov. 1999) Chapters 1-4, pp. 1-132.

* cited by examiner

QA Audit

| Title | Abbreviation | Chosen |
|---|---|---|
| ⊟ Coding Style | | |
| Access of Static Members Through Objects | AOSMTO | ☑ |
| Assignment To Formal Parameters | ATFP | ☑ |
| Complex Assignment | CA | ☑ |
| Don't Use the Negation Operator Frequently | DUNOF | ☑ |
| Operator '?:' May Not Be Used | OMNBU | ☑ |
| Provide Incremental In For-Statement or use w.... | PIIFS | ☑ |
| Replacement For Demand Imports | RFDI | ☑ |
| Use Abbreviated Assignment Operator | UAAO | ☑ |
| Use 'this' Explicitly To Access Class Members | UTETACM | ☑ |
| ⊟ Critical Errors | | |
| Avoid Hiding Inherited Attributes | AHIA | ☑ |
| Avoid Hiding Inherited Static Methods | AHISM | ☑ |
| Command Query Separation | CQS | ☑ |
| Hiding of Names | HON | ☑ |
| Inaccessible Constructor Or Method Matches | ICOMM | ☑ |
| Multiple Visible Declarations With Same Name | MVDWSN | ☑ |
| Overriding a Non-Abstract Method With an Ab... | ONAMWAM | ☑ |
| Overriding a Private Method | OPM | ☑ |

Severity: High 800
802

Select all | Unselect all | Set defaults | Save set As... | Load set...

AOSMTO - Access Of Static Members Through Objects

Static members should be referenced through class names rather than through objects. —804

Start | Cancel | Help

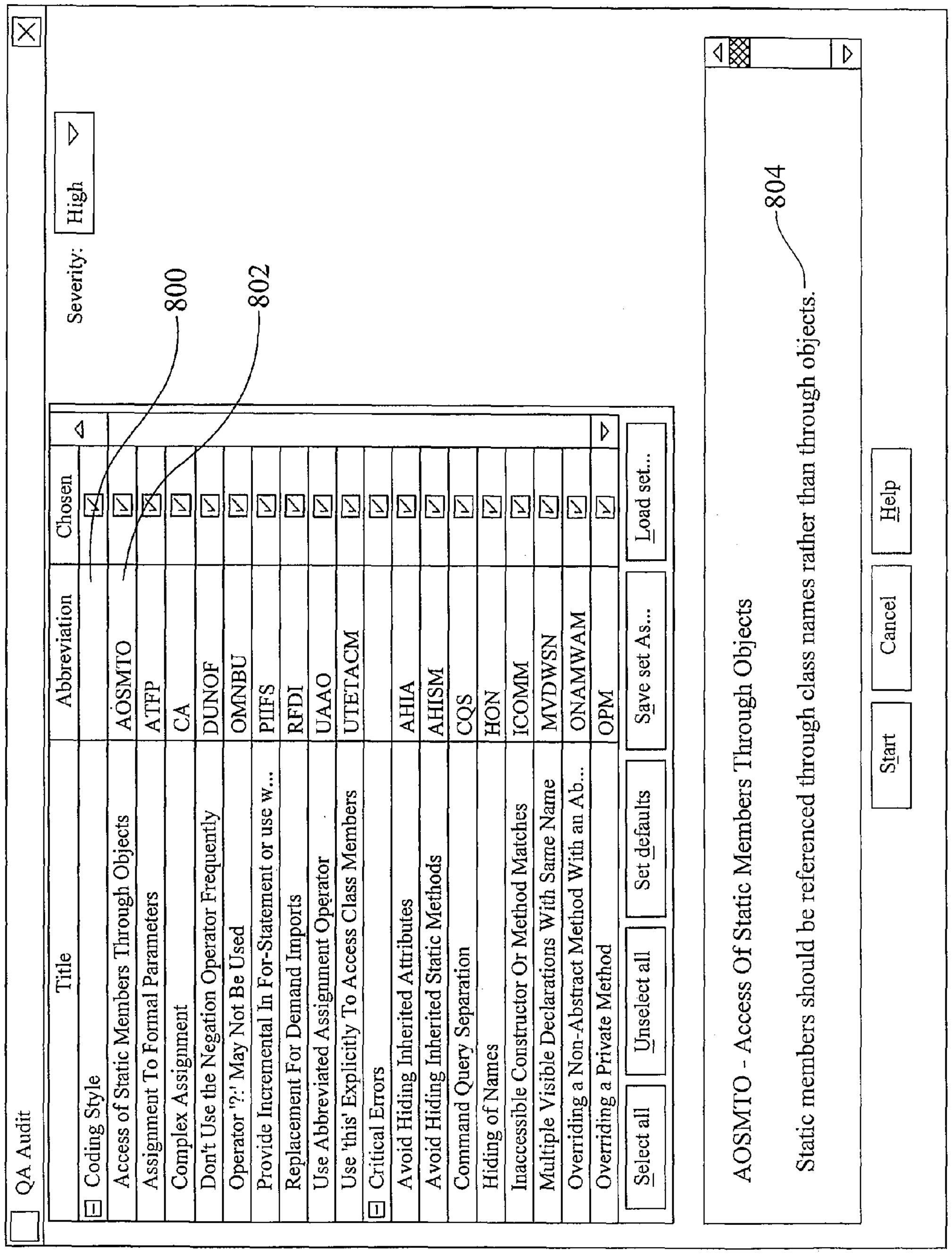

FIG. 8A

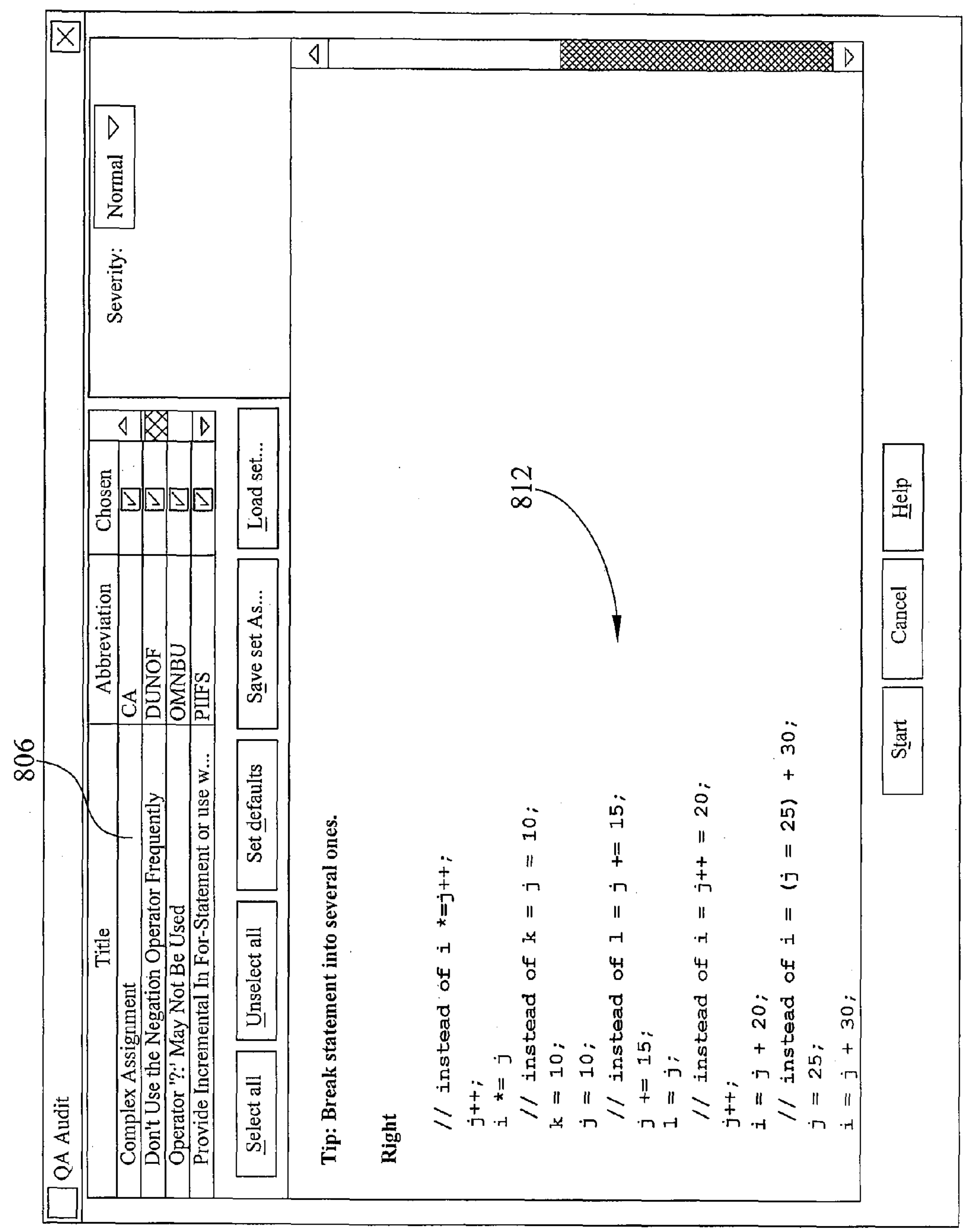

FIG. 8C (Rotated screenshot content:)

QA Audit

| Title | Abbreviation | Chosen |
|---|---|---|
| Complex Assignment | CA | ✓ |
| Don't Use the Negation Operator Frequently | DUNOF | ✗ |
| Operator '?': May Not Be Used | OMNBU | ✓ |
| Provide Incremental In For-Statement or use w... | PIIFS | ✓ |

806

Severity: Normal

Select all | Unselect all | Set defaults | Save set As... | Load set...

Tip: Break statement into several ones.

Right

```
// instead of i *=j++;
j++;
i *= j
// instead of k = j = 10;
k = 10;
j = 10;
// instead of l = j += 15;
j += 15;
l = j;
// instead of i = j++ = 20;
j++;
i = j + 20;
// instead of i = (j = 25) + 30;
j = 25;
i = j + 30;
```

812

Start | Cancel | Help

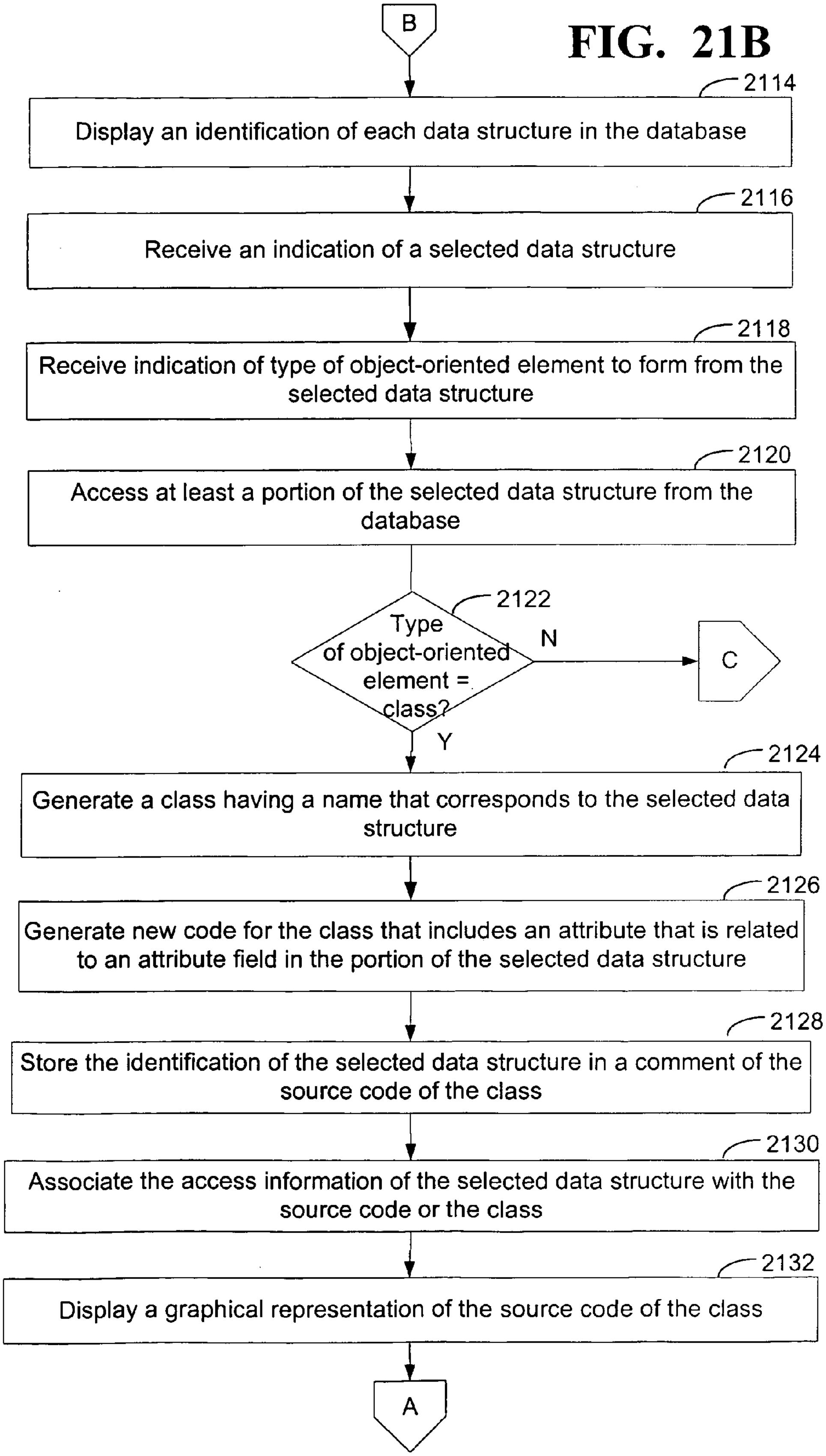

B
FIG. 21B
2114
Display an identification of each data structure in the database
2116
Receive an indication of a selected data structure
2118
Receive indication of type of object-oriented element to form from the selected data structure
2120
Access at least a portion of the selected data structure from the database
2122
Type of object-oriented element = class?
N
C
Y
2124
Generate a class having a name that corresponds to the selected data structure
2126
Generate new code for the class that includes an attribute that is related to an attribute field in the portion of the selected data structure
2128
Store the identification of the selected data structure in a comment of the source code of the class
2130
Associate the access information of the selected data structure with the source code or the class
2132
Display a graphical representation of the source code of the class
A

```
/* Generated by Together */
import  javax.ejb.EntityBean;
import  javax.ejb.EntityContext;
import  java.rmi.RemoteException;
import  javax.ejb.EJBException;
import  javax.ejb.CreateException;
import  java.sql.SQLException;

/**
 * @ejbHome <{ DEPARTMENTHome}>
 * @ejbRemote <{DEPARTMENT}>
 * @ejbPrimaryKey <{  DEPARTMENTPK}>
 * @ejbSchemaName DEMO
 * @ejbStructureID DEPARTMENT
 * @ ejbACCESS Server: Oracle 7.3x/8x
 * @ejbACCESS Driver:   oracle.jdbc.driver.OracleDriver,
 * @ejbACCESS  Classpath: $ TGH$/lib/ classes111.zip,
 * @ejbACCESS  URL:jdbc:oracle:thin@localhost:1521:together      */
public class  DEPARTMENTBean implements   EntityBean
{
    private  EntityContext  ctx;
    public long  DEPARTMENT_ID;
    public String NAME;
    public long  LOCATION_ID;

    public void  setEntityContext(  EntityContext context) throws
RemoteException,  EJBException
    {
        ctx = context;
    }

    public void  unsetEntityContext() throws   RemoteException,
EJBException
    {
        ctx = null;
    }

    public void  ejbActivate() throws   RemoteException,  EJBException
    {
    }

    public void  ejbPassivate() throws   RemoteException,  EJBException
    {
    }

    public void  ejbRemove() throws   RemoteException,  EJBException
    {
    }

    public void  ejbStore() throws   RemoteException,  EJBException
    {
    }

    public void  ejbLoad() throws   RemoteException,  EJBException
    {
    }
```

2804

METHODS AND SYSTEMS FOR RELATING DATA STRUCTURES AND OBJECT-ORIENTED ELEMENTS FOR DISTRIBUTED COMPUTING

CROSS-REFERENCE TO RELATED APPLICATIONS

This application claims the benefit of the filing date of U.S. Provisional Application No. 60/199,046, entitled "Software Development Tool," filed on Apr. 21, 2000, and is a continuation-in-part of U.S. patent application Ser. No. 09/680,063, entitled "Method and System for Developing Software," filed on Oct. 4, 2000, now U.S. Pat. No. 6,851,107 which claims the benefit of the filing date of U.S. Provisional Application No. 60/157,826, entitled "Visual Unified Modeling Language Development Tool," filed on Oct. 5, 1999, and U.S. Provisional Application No. 60/199,046, entitled "Software Development Tool," filed on Apr. 21, 2000; all of which are incorporated herein by reference.

The following identified U.S. patent applications are also relied upon and are incorporated by reference in this application:

U.S. patent application Ser. No. 09/680,065, entitled "Method And System For Displaying Changes Of Source Code," filed on Oct. 4, 2000;

U.S. patent application Ser. No. 09/680,030, entitled "Method And System For Generating, Applying, And Defining A Pattern," filed on Oct. 4, 2000;

U.S. patent application Ser. No. 09/680,064, entitled "Method And System For Collapsing A Graphical Representation Of Related Elements," filed on Oct. 4, 2000;

U.S. patent application Ser. No. 09/839,045, entitled "Methods and Systems for Generating Source Code for Object Oriented Elements," and filed on the same date herewith;

U.S. patent application Ser. No. 09/839,525, entitled "Methods and Systems for Finding Specific Line Of Source Code," and filed on the same date herewith;

U.S. patent application Ser. No. 09/839,645, entitled "Methods and Systems for Finding and Displaying Linked Objects," and filed on the same date herewith;

U.S. patent application Ser. No. 09/839,527, entitled "Methods and Systems for Animating the Interaction of Objects in an Object Oriented Program," and filed on the same date herewith;

U.S. patent application Ser. No. 09/839,646, entitled "Methods and Systems for Supporting and Deploying Distributed Computing Components," and filed on the same date herewith;

U.S. patent application Ser. No. 09/838,580, entitled "Diagrammatic Control of a Software in a Version Control System," and filed on the same date herewith;

U.S. patent application Ser. No. 09/838,578, entitled "Navigation Links in Generated Documentation," and filed on the same date herewith;

U.S. patent application Ser. No. 09/839,644, entitled "Methods and Systems for Identifying Dependencies Between Object-Oriented Elements," and filed on the same date herewith; and U.S. patent application Ser. No. 09/839,524, entitled "Methods and Systems for Relating a Data Definition File and a Data Model for Distributed Computing," and filed on the same date herewith.

FIELD OF THE INVENTION

The present invention relates generally to data processing systems and, more particularly, to methods and systems for relating data structures and object-oriented elements for distributed computing.

BACKGROUND OF THE INVENTION

Computer instructions are written in source code. Although a skilled programmer can understand source code to determine what the code is designed to accomplish, with highly complex software systems, a graphical representation or model of the source code is helpful to organize and visualize the structure and components of the system. Using models, the complex systems are easily identified, and the structural and behavioral patterns can be visualized and documented.

The well-known Unified Modeling Language (UML) is a general-purpose notational language for visualizing, specifying, constructing, and documenting complex software systems. UML is used to model systems ranging from business information systems to Web-based distributed systems, to real-time embedded systems. UML formalizes the notion that real-world objects are best modeled as self-contained entities that contain both data and functionality. UML is more clearly described in the following references, which are incorporated herein by reference: (1) Martin Fowler, *UML Distilled Second Edition: Applying the Standard Object Modeling Language*, Addison-Wesley (1999); (2) Booch, Rumbaugh, and Jacobson, *The Unified Modeling Language User Guide*, Addison-Wesley (1998); (3) Peter Coad, Jeff DeLuca, and Eric Lefebvre, *Java Modeling in Color with UML: Enterprise Components and Process*, Prentice Hall (1999); and (4) Peter Coad, Mark Mayfield, and Jonathan Kern, *Java Design: Building Better Apps & Applets* (2nd Ed.), Prentice Hall (1998).

As shown in FIG. 1, conventional software development tools 100 allow a programmer to view UML 102 while viewing source code 104. The source code 104 is stored in a file, and a reverse engineering module 106 converts the source code 104 into a representation of the software project in a database or repository 108. The software project comprises source code 104 in at least one file which, when compiled, forms a sequence of instructions to be run by the data processing system. The repository 108 generates the UML 102. If any changes are made to the UML 102, they are automatically reflected in the repository 108, and a code generator 110 converts the representation in the repository 108 into source code 104. Such software development tools 100, however, do not synchronize the displays of the UML 102 and the source code 104. Rather, the repository 108 stores the representation of the software project while the file stores the source code 104. A modification in the UML 102 does not appear in the source code 104 unless the code generator 110 re-generates the source code 104 from the data in the repository 108. When this occurs, the entire source code 104 is rewritten. Similarly, any modifications made to the source code 104 do not appear in the UML 102 unless the reverse engineering module 106 updates the repository 108. As a result, redundant information is stored in the repository 108 and the source code 104. In addition, rather than making incremental changes to the source code 104, conventional software development tools 100 rewrite the overall source code 104 when modifications are made to the UML 102, resulting in wasted processing time. This type of manual, large-grained synchronization requires either human intervention, or a "batch" style process to try to keep the two views (the UML 102 and the source code 104) in sync. Unfortunately, this approach, adopted by many tools, leads to many undesirable side-effects; such as desired changes to the source code being overwritten by the tool. A further disadvantage with conventional software development tools 100 is that they are designed to only work in a single programming language. Thus, a tool 100 that is designed for Java™ programs cannot be utilized to develop a program in C++. There is a need in the art for a tool that avoids the limitations of these conventional software development tools.

SUMMARY OF THE INVENTION

Methods and systems consistent with the present invention provide an improved software development tool that overcomes the limitations of conventional software development tools. The improved software development tool of the present invention allows a developer to simultaneously view a graphical and a textual display of source code. The graphical and textual views are synchronized so that a modification in one view is automatically reflected in the other view. The software development tool is designed for use with more than one programming language.

The software development tool also saves a developer time and effort in producing error free code. The software development tool significantly reduces programming development time for a developer by allowing the developer to generate or update source code for an object-oriented element, such as a class or a distributed computing component, from a data structure. Similarly, the software development tool saves a developer time that would be spent manually creating a data structure to map to a previously developed object-oriented element by allowing the developer to form or update a data structure from the object-oriented element.

In accordance with methods consistent with the present invention, a method is provided in a data processing system. The data processing system has a memory device with source code and a secondary storage device with a data structure corresponding to the source code. The method comprises the steps of receiving an indication that the data structure has been modified, and automatically reflecting the modification in the source code so as to avoid completely regenerating the source code.

In accordance with methods consistent with the present invention, a method is provided in a data processing system. The data processing system has a memory device with source code and a secondary storage device with a data structure corresponding to the source code. The method comprises the steps of receiving an indication that the source code has been modified, and automatically reflecting the modification in the data structure so as to avoid completely regenerating the data structure.

In accordance with articles of manufacture consistent with the present invention, a computer-readable medium is provided. The computer-readable medium contains instructions for controlling a data processing system to perform a method. The data processing system has a memory device with source code and a secondary storage device with a data structure corresponding to the source code. The method comprises the steps of receiving an indication that the data structure has been modified, and automatically reflecting the modification in the source code so as to avoid completely regenerating the source code.

In accordance with articles of manufacture consistent with the present invention, a computer-readable medium is provided. The computer-readable medium contains instructions for controlling a data processing system to perform a method. The data processing system has a memory device with source code and a secondary storage device with a data structure corresponding to the source code. The method comprises the steps of receiving an indication that the source code has been modified, and automatically reflecting the modification in the data structure so as to avoid completely regenerating the data structure.

Additional implementations are directed to systems and computer devices incorporating the methods described above. It is also to be understood that both the foregoing general description and the detailed description to follow are exemplary and explanatory only and are not restrictive of the invention, as claimed.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 8A depicts a user interface displayed by the software development tool depicted in FIG. 2, where the user interface displays a list of predefined criteria which the software development tool checks in the source code;

FIG. 8C depicts a user interface displayed by the software development tool depicted in FIG. 2, where the user interface displays an example of source code which conforms to the criteria which the software development tool checks in the source code;

FIGS. 21A-C depicts a flow diagram illustrating an exemplary process performed by the software development tool for generating source code for an object-oriented element from a data structure in a database;

FIG. 28 displays the source code for the Enterprise JavaBean™ in FIG. 27 that is generated by the software development tool;

Figure 1:
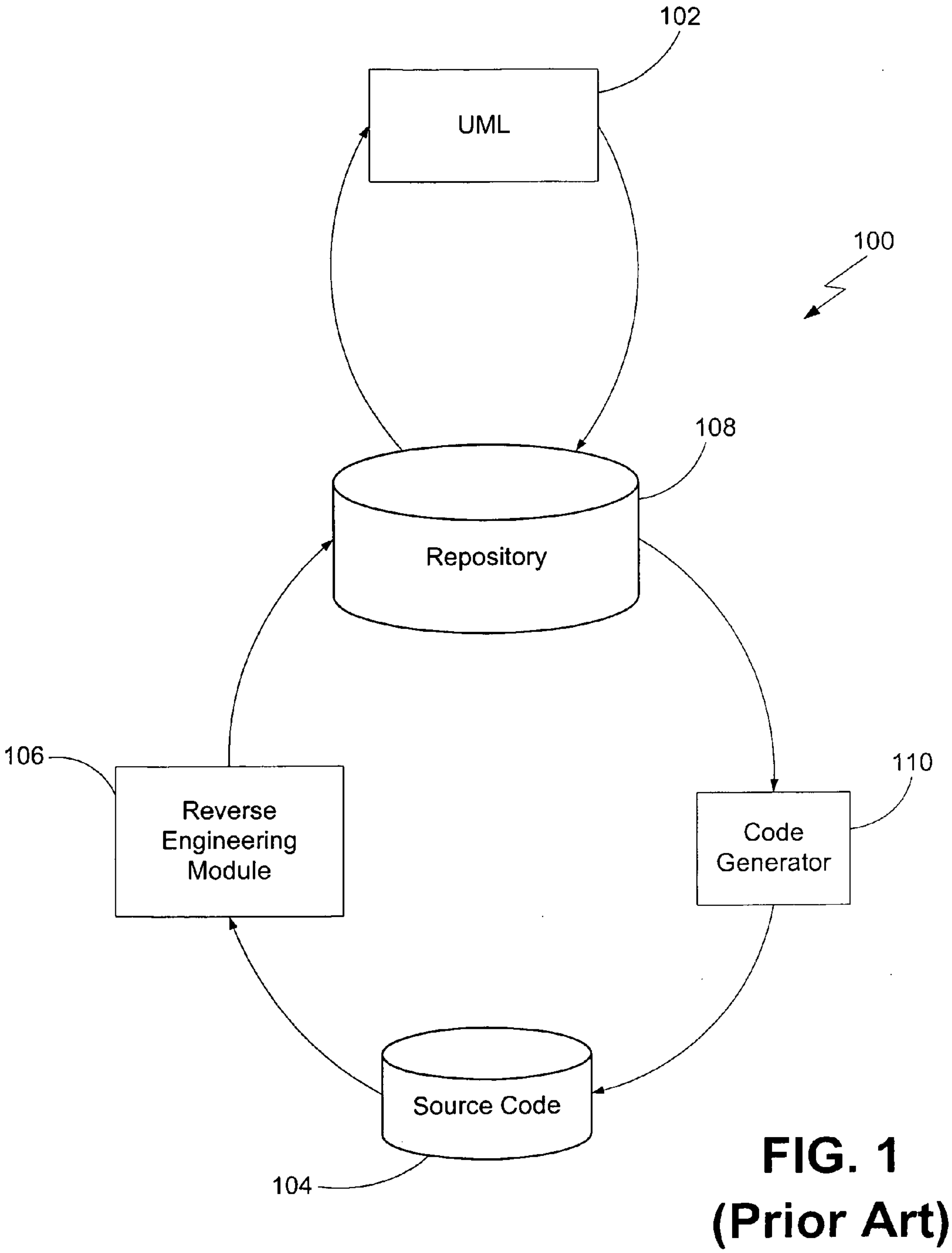
FIG. 1 depicts a conventional software development tool.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE INVENTION

Methods and systems consistent with the present invention provide an improved software development tool that creates a graphical representation of source code regardless of the programming language in which the code is written. In addition, the software development tool simultaneously reflects any modifications to the source code to both the display of the graphical representation as well as the textual display of the source code.

Figure 2:
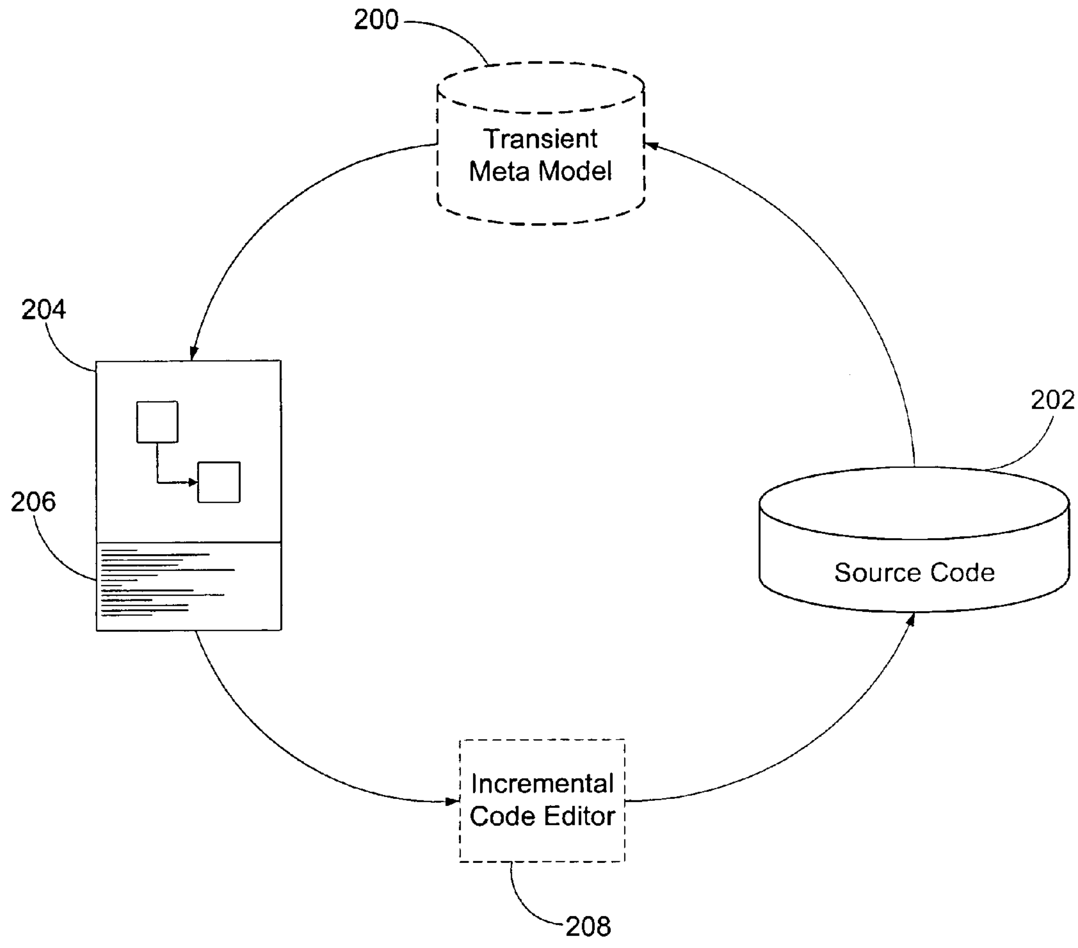
FIG. 2 depicts an overview of a software development tool in accordance with the present invention.

As depicted in FIG. 2, source code 202 is being displayed in both a graphical form 204 and a textual form 206. In accordance with methods and systems consistent with the present invention, the improved software development tool generates a transient meta model (TMM) 200 which stores a language-neutral representation of the source code 202. The graphical 204 and textual 206 representations of the source code 202 are generated from the language-neutral representation in the TMM 200. Although modifications made on the displays 204 and 206 may appear to modify the displays 204 and 206, in actuality all modifications are made directly to the source code 202 via an incremental code editor (ICE) 208, and the TMM 200 is used to generate the modifications in both the graphical 204 and the textual 206 views from the modifications to the source code 202.

The improved software development tool provides simultaneous round-trip engineering, i.e., the graphical representation 204 is synchronized with the textual representation 206. Thus, if a change is made to the source code 202 via the graphical representation 204, the textual representation 206 is updated automatically. Similarly, if a change is made to the source code 202 via the textual representation 206, the graphical representation 204 is updated to remain synchronized. There is no repository, no batch code generation, and no risk of losing code.

Figure 3:
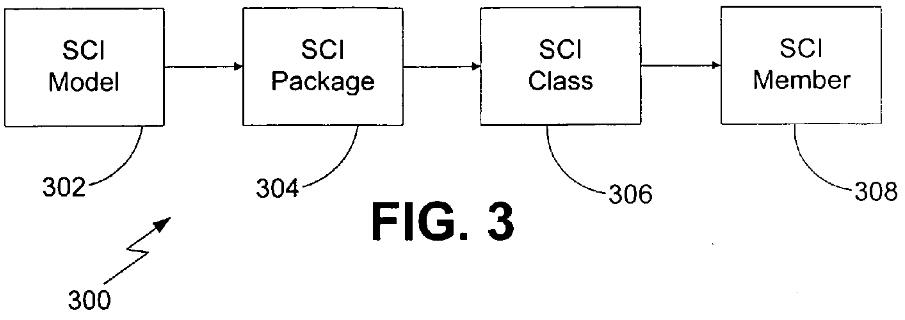
FIG. 3 depicts a data structure of the language-neutral representation created by the software development tool of FIG. 2.

The data structure 300 of the language-neutral representation is depicted in FIG. 3. The data structure 300 comprises a Source Code Interface (SCI) model 302, an SCI package 304, an SCI class 306, and an SCI member 308. The SCI model 302 is the source code organized into packages. The SCI model 302 corresponds to a directory for a software project being developed by the user, and the SCI package 304 corresponds to a subdirectory. The software project comprises the source code in at least one file that is compiled to form a sequence of instructions to be run by a data processing system. The data processing system is discussed in detail below. As is well known in object-oriented programming, the class 306 is a category of objects which describes a group of objects with similar properties (attributes), common behavior (operations or methods), common relationships to other objects, and common semantics. The members 308 comprise attributes and/or operations.

Figure 4:
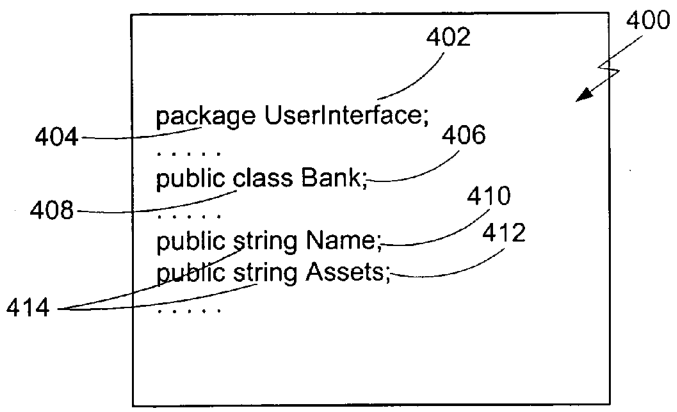
FIG. 4 depicts representative source code.
Figure 5:
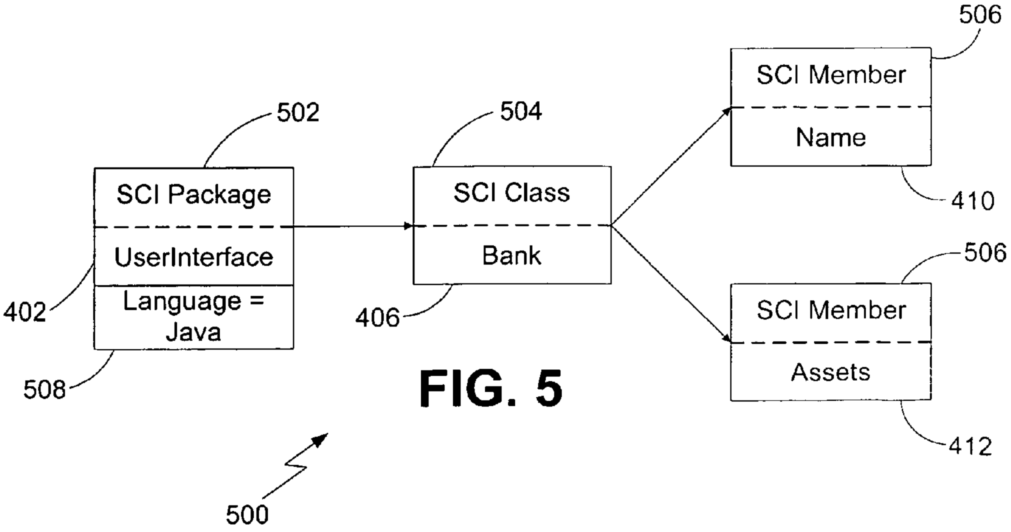
FIG. 5 depicts the data structure of the language-neutral representation of the source code of FIG. 4.

For example, the data structure 500 for the source code 400 depicted in FIG. 4 is depicted in FIG. 5. UserInterface 402 is defined as a package 404. Accordingly, UserInterface 402 is contained in SCI package 502. Similarly, Bank 406, which is defined as a class 408, is contained in SCI class 504, and Name 410 and Assets 412, which are defined as attributes (strings 414), are contained in SCI members 506. Since these elements are in the same project, all are linked. The data structure 500 also identifies the language in which the source code is written 508, e.g., the Java™ language.

Figure 6:
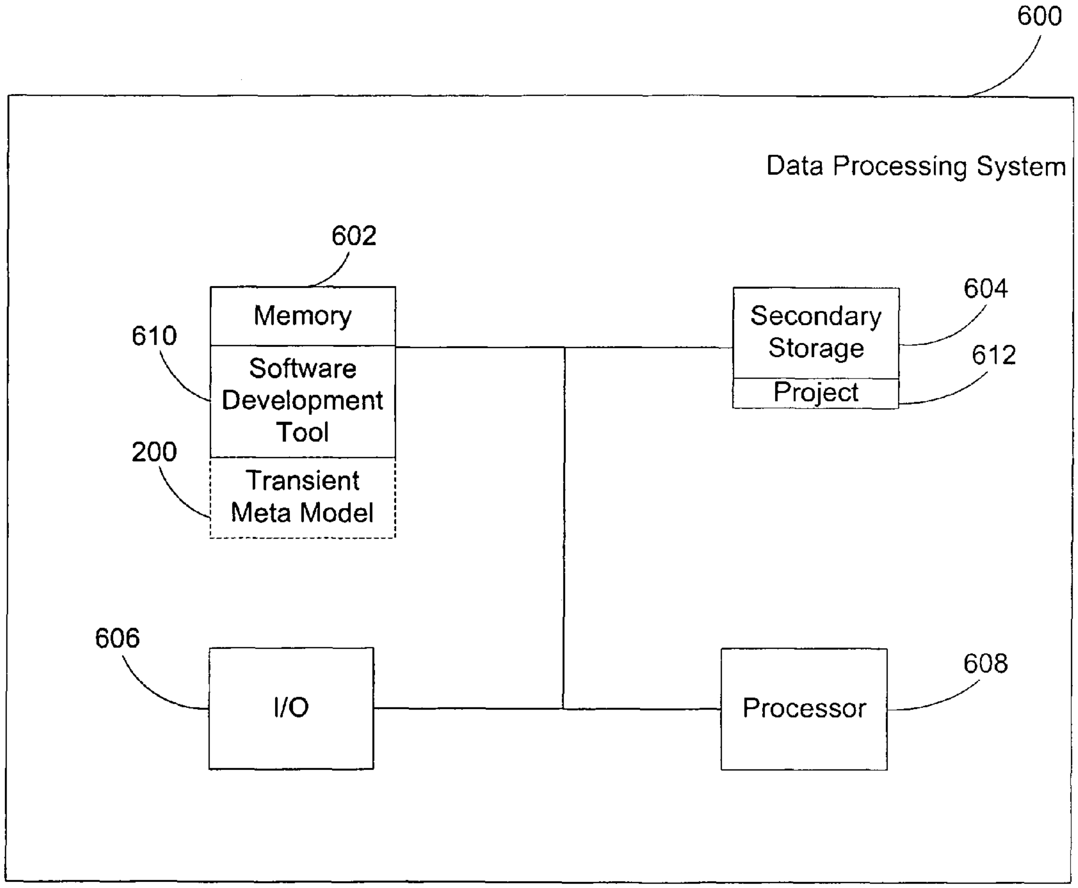
FIG. 6 depicts a data processing system suitable for practicing the present invention.

FIG. 6 depicts a data processing system 600 suitable for practicing methods and systems consistent with the present invention. Data processing system 600 comprises a memory 602, a secondary storage device 604, an I/O device 606, and a processor 608. Memory 602 includes the improved software development tool 610. The software development tool 610 is used to develop a software project 612, and create the TMM 200 in the memory 602. The project 612 is stored in the secondary storage device 604 of the data processing system 600. One skilled in the art will recognize that data processing system 600 may contain additional or different components.

Although aspects of the present invention are described as being stored in memory, one skilled in the art will appreciate that these aspects can also be stored on or read from other types of computer-readable media, such as secondary storage devices, like hard disks, floppy disks, or CD-ROM; or other forms of RAM or ROM either currently known or later developed.

Figure 7:
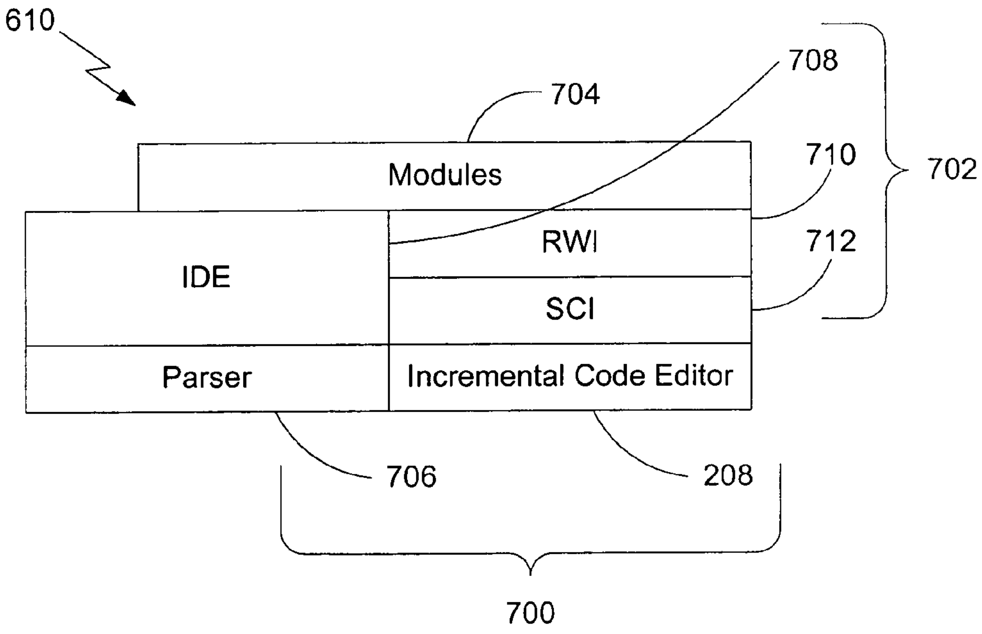
FIG. 7 depicts an architectural overview of the software development tool of FIG. 2.

FIG. 7 illustrates an architectural overview of the improved software development tool 610. The tool 610 comprises a core 700, an open application program interface (API) 702, and modules 704. The core 700 includes a parser 706 and an ICE 208. The parser 706 converts the source code into the language-neutral representation in the TMM, and the ICE 208 converts the text from the displays into source code. There are three main packages composing the API 702: Integrated Development Environment (IDE) 708; Read-Write Interface (RWI) 710; and Source Code Interface (SCI) 712. Each package includes corresponding subpackages. As is well known in the art, a package is a collection of attributes, notifications, operations, or behaviors that are treated as a single module or program unit.

IDE 708 is the API 702 needed to generate custom outputs based on information contained in a model. It is a read-only interface, i.e., the user can extract information from the model, but not change the model. IDE 708 provides the functionality related to the model's representation in IDE 708 and interaction with the user. Each package composing the IDE group has a description highlighting the areas of applicability of this concrete package.

RWI 710 enables the user to go deeper into the architecture. Using RWI 710, information can be extracted from and written to the models. RWI not only represents packages, classes and members, but it may also represent different diagrams (class diagrams, use case diagrams, sequence diagrams and others), links, notes, use cases, actors, states, etc.

SCI 712 is at the source code level, and allows the user to work with the source code almost independently of the language being used.

There are a variety of modules 704 in the software development tool 610 of the present invention. Some of the modules 704 access information to generate graphical and code documentation in custom formats, export to different file formats, or develop patterns. The software development tool also includes a quality assurance (QA) module which monitors the modifications to the source code and calculates the complexity metrics, i.e., the measurement of the program's performance or efficiency, to support quality assurance. The types of metrics calculated by the software development tool include basic metrics, cohesion metrics, complexity metrics, coupling metrics, Halstead metrics, inheritance metrics, maximum metrics, polymorphism metrics, and ratio metrics. Examples of these metrics with their respective definitions are identified in Tables 1-9 below.

TABLE 1

Basic Metrics

| Basic Metrics | Description |
|---|---|
| Lines Of Code | Counts the number of code lines. |
| Number Of Attributes | Counts the number of attributes. If a class has a high number of attributes, it may be appropriate to divide it into subclasses. |
| Number Of Classes | Counts the number of classes. |
| Number Of Import Statements | Counts the number of imported packages/classes. This measure can highlight excessive importing, and also can be used as a measure of coupling. |
| Number Of Members | Counts the number of members, i.e., attributes and operations. If a class has a high number of members, it may be appropriate to divide it into subclasses. |
| Number Of Operations | Counts the number of operations. If a class has a high number of operations, it may be appropriate to divide it into subclasses. |

TABLE 2

Cohesion Metrics

| Cohesion Metrics | Description |
|---|---|
| Lack Of Cohesion Of Methods 1 | Takes each pair of methods in the class and determines the set of fields they each access. A low value indicates high coupling between methods, which indicates potentially low reusability and increased testing because many methods can affect the same attributes. |
| Lack Of Cohesion Of Methods 2 | Counts the percentage of methods that do not access a specific attribute averaged over all attributes in the class. A high value of cohesion (a low lack of cohesion) implies that the class is well designed. |
| Lack Of Cohesion Of Methods 3 | Measures the dissimilarity of methods in a class by attributes. A low value indicates good class subdivision, implying simplicity and high reusability. A high lack of cohesion increases complexity, thereby increasing the likelihood of errors during the development process. |

TABLE 3

Complexity Metrics

| Complexity Metrics | Description |
|---|---|
| Attribute Complexity | Defined as the sum of each attribute's value in the class. |
| Cyclomatic Complexity | Represents the cognitive complexity of the class. It counts the number of possible paths through an algorithm by counting the number of distinct regions on a flowgraph, i.e., the number of 'if,' 'for' and 'while' statements in the operation's body. |

TABLE 3-continued

| Complexity Metrics | |
|---|---|
| Complexity Metrics | Description |
| Number Of Remote Methods | Processes all of the methods and constructors, and counts the number of different remote methods called. A remote method is defined as a method which is not declared in either the class itself or its ancestors. |
| Response For Class | Calculated as 'Number of Local Methods' + 'Number of Remote Methods.' A class which provides a larger response set is considered to be more complex and requires more testing than one with a smaller overall design complexity. |
| Weighted Methods Per Class 1 | The sum of the complexity of all methods for a class, where each method is weighted by its cyclomatic complexity. The number of methods and the complexity of the methods involved is a predictor of how much time and effort is required to develop and maintain the class. |
| Weighted Methods Per Class 2 | Measures the complexity of a class, assuming that a class with more methods than another is more complex, and that a method with more parameters than another is also likely to be more complex. |

TABLE 4

| Coupling Metrics | |
|---|---|
| Coupling Metrics | Description |
| Coupling Between Objects | Represents the number of other classes to which a class is coupled. Counts the number of reference types that are used in attribute declarations, formal parameters, return types, throws declarations and local variables, and types from which attribute and method selections are made. Excessive coupling between objects is detrimental to modular design and prevents reuse. The more independent a class is, the easier it is to reuse it in another application. In order to improve modularity and promote encapsulation, inter-object class couples should be kept to a minimum. The larger the number of couples, the higher the sensitivity to changes in other parts of the design, and therefore maintenance is more difficult. A measure of coupling is useful to determine how complex the testing of various parts of a design is likely to be. The higher the inter-object class coupling, the more rigorous the testing needs to be. |
| Data Abstraction Coupling | Counts the number of reference types used in the attribute declarations. |
| FanOut | Counts the number of reference types that are used in attribute declarations, formal parameters, return types, throws declarations and local variables. |

TABLE 5

| Halstead Metrics | |
|---|---|
| Halstead Metrics | Description |
| Halstead Difficulty | This measure is one of the Halstead Software Science metrics. It is calculated as ('Number of Unique Operators' / 'Number of Unique Operands') * ('Number of Operands' / 'Number of Unique Operands'). |
| Halstead Effort | This measure is one of the Halstead Software Science metrics. It is calculated as 'Halstead Difficulty' * 'Halstead Program Volume.' |
| Halstead Program Length | This measure is one of the Halstead Software Science metrics. It is calculated as 'Number of Operators' + 'Number of Operands.' |

TABLE 5-continued

| Halstead Metrics | |
|---|---|
| Halstead Metrics | Description |
| Halstead Program Vocabulary | This measure is one of the Halstead Software Science metrics. It is calculated as 'Number of Unique Operators' + 'Number of Unique Operands.' |
| Halstead Program Volume | This measure is one of the Halstead Software Science metrics. It is calculated as 'Halstead Program Length' * Log2('Halstead Program Vocabulary'). |
| Number Of Operands | This measure is used as an input to the Halstead Software Science metrics. It counts the number of operands used in a class. |
| Number Of Operators | This measure is used as an input to the Halstead Software Science metrics. It counts the number of operators used in a class. |
| Number Of Unique Operands | This measure is used as an input to the Halstead Software Science metrics. It counts the number of unique operands used in a class. |
| Number Of Unique Operators | This measure is used as an input to the Halstead Software Science metrics. It counts the number of unique operators used in a class. |

TABLE 6

| Inheritance Metrics | |
|---|---|
| Inheritance Metrics | Description |
| Depth Of Inheritance Hierarchy | Counts how far down the inheritance hierarchy a class or interface is declared. High values imply that a class is quite specialized. |
| Number Of Child Classes | Counts the number of classes which inherit from a particular class, i.e., the number of classes in the inheritance tree down from a class. Non-zero value indicates that the particular class is being re-used. The abstraction of the class may be poor if there are too many child classes. It should also be stated that a high value of this measure points to the definite amount of testing required for each child class. |

TABLE 7

| Maximum Metrics | |
|---|---|
| Maximum Metrics | Description |
| Maximum Number Of Levels | Counts the maximum depth of 'if,' 'for' and 'while' branches in the bodies of methods. Logical units with a large number of nested levels may need implementation simplification and process improvement because groups that contain more than seven pieces of information are increasingly harder for people to understand in problem solving. |
| Maximum Number Of Parameters | Displays the maximum number of parameters among all class operations. Methods with many parameters tend to be more specialized and, thus, are less likely to be reusable. |
| Maximum Size Of Operation | Counts the maximum size of the operations for a class. Method size is determined in terms of cyclomatic complexity, i.e., the number of 'if,' 'for' and 'while' statements in the operation's body. |

TABLE 8

| Polymorphism Metrics | |
|---|---|
| Polymorphism Metrics | Description |
| Number Of Added Methods | Counts the number of operations added by a class. A large value of this measure indicates that the functionality of the given class becomes increasingly distinct from that of the parent classes. In this case, it should be considered whether this class genuinely should be inheriting from the parent, or if it could be broken down into several smaller classes. |
| Number Of Overridden Methods | Counts the number of inherited operations which a class overrides. Classes without parents are not processed. High values tend to indicate design problems, i.e., subclasses should generally add to and extend the functionality of the parent classes rather than overriding them. |

TABLE 9

| Ratio Metrics | |
|---|---|
| Ratio Metrics | Description |
| Comment Ratio | Counts the ratio of comments to total lines of code including comments. |
| Percentage Of Package Members | Counts the percentage of package members in a class. |
| Percentage Of Private Members | Counts the percentage of private members in a class. |
| Percentage Of Protected Members | Counts the percentage of protected members in a class. |
| Percentage Of Public Members | Counts the proportion of vulnerable members in a class. A large proportion of such members means that the class has high potential to be affected by external classes and means that increased efforts will be needed to test such a class thoroughly. |
| True Comment Ratio | Counts the ratio of comments to total lines of code excluding comments. |

The QA module also provides audits, i.e., the module checks for conformance to predefined or user-defined styles. The types of audits provided by the module include coding style, critical errors, declaration style, documentation, naming style, performance, possible errors and superfluous content. Examples of these audits with their respective definitions are identified in Tables 10-17 below.

TABLE 10

| Coding Style Audits | |
|---|---|
| Coding Style Audits | Description |
| Access Of Static Members Through Objects | Static members should be referenced through class names rather than through objects. |
| Assignment To Formal Parameters | Formal parameters should not be assigned. |
| Complex Assignment | Checks for the occurrence of multiple assignments and assignments to variables within the same expression. Complex assignments should be avoided since they decrease program readability. |
| Don't Use the Negation Operator Frequently | The negation operator slows down the readability of the program. Thus, it is recommended that it not be used frequently. |
| Operator '?:' May Not Be Used | The operator '?:' makes the code harder to read than the alternative form with an if-statement. |
| Provide Incremental In For-Statement or use while-statement | Checks if the third argument of the 'for'-statement is missing. |
| Replacement For Demand Imports | Demand import-declarations must be replaced by a list of single import-declarations that are actually imported into the compilation unit. In other words, import-statements may not end with an asterisk. |
| Use Abbreviated Assignment Operator | Use the abbreviated assignment operator in order to write programs more rapidly. Also some compilers run faster with the abbreviated assignment operator. |
| Use 'this' Explicitly To Access Class Members | Tries to make the developer use 'this' explicitly when trying to access class members. Using the same class member names with parameter names often makes what the developer is referring to unclear. |

TABLE 11

| Critical Errors Audits | |
|---|---|
| Critical Audits | Errors Description |
| Avoid Hiding Inherited Attributes | Detects when attributes declared in child classes hide inherited attributes. |
| Avoid Hiding Inherited Static Methods | Detects when inherited static operations are hidden by child classes. |
| Command Query Separation | Prevents methods that return a value from a modifying state. The methods used to query the state of an object must be different from the methods used to perform commands (change the state of the object). |
| Hiding Of Names | Declarations of names should not hide other declarations of the same name. |
| Inaccessible Constructor Or Method Matches | Overload resolution only considers constructors and methods that are visible at the point of the call. If, however, all the constructors and methods were considered, there may be more matches. This rule is violated in this case. Imagine that ClassB is in a different package than ClassA. Then the allocation of ClassB violates this rule since the second constructor is not visible at the point of the allocation, but it still matches the allocation (based on signature). Also the call to open in ClassB violates this rule since the second and the third declarations of open are not visible at the point of the call, but it still matches the call (based on signature). |

TABLE 11-continued

| Critical Errors Audits | |
|---|---|
| Critical Audits | Errors Description |
| Multiple Visible Declarations With Same Name | Multiple declarations with the same name must not be simultaneously visible except for overloaded methods. |
| Overriding a Non-Abstract Method With an Abstract Method | Checks for abstract methods overriding non-abstract methods in a subclass. |
| Overriding a Private Method | A subclass should not contain a method with the same name and signature as in a superclass if these methods are declared to be private. |
| Overloading Within a Subclass | A superclass method may not be overloaded within a subclass unless all overloading in the superclass are also overridden in the subclass. It is very unusual for a subclass to be overloading methods in its superclass without also overriding the methods it is overloading. More frequently this happens due to inconsistent changes between the superclass and subclass - i.e., the intention of the user is to override the method in the superclass, but due to the error, the subclass method ends up overloading the superclass method. |
| Use of Static Attribute for Initialization | Non-final static attributes should not be used in initializations of attributes. |

TABLE 12

| Declaration Style Audits | |
|---|---|
| Declaration Style Audits | Description |
| Badly Located Array Declarators | Array declarators must be placed next to the type descriptor of their component type. |
| Constant Private Attributes Must Be Final | Private attributes that never get their values changed must be declared final. By explicitly declaring them in such a way, a reader of the source code get some information of how the attribute is supposed to be used. |
| Constant Variables Must Be Final | Local variables that never get their values changed must be declared final. By explicitly declaring them in such a way, a reader of the source code obtains information about how the variable is supposed to be used. |
| Declare Variables In One Statement Each | Several variables (attributes and local variables) should not be declared in the same statement. |
| Instantiated Classes Should Be Final | This rule recommends making all instantiated classes final. It checks classes which are present in the object model. Classes from search/classpath are ignored. |
| List All Public And Package Members First | Enforces a standard to improve readability. Methods/data in your class should be ordered properly. |
| Order Of Appearance Of Modifiers | Checks for correct ordering of modifiers. For classes, this includes visibility (public, protected or private), abstract, static, final. For attributes, this includes visibility (public, protected or private), static, final, transient, volatile. For operations, this includes visibility (public, protected or private), abstract, static, final, synchronized, native. |
| Put the Main Function Last | Tries to make the program comply with various coding standards regarding the form of the class definitions. |

TABLE 13

| Documentation Audits | |
|---|---|
| Documentation Audits | Description |
| Bad Tag In JavaDoc Comments | This rule verifies code against accidental use of improper JavaDoc tags. |
| Distinguish Between JavaDoc And Ordinary Comments | Checks whether the JavaDoc comments in your program ends with '**/' and ordinary C-style ones with '*/.' |

TABLE 14

| Naming Style Audits | |
|---|---|
| Naming Style Audits | Description |
| Class Name Must Match Its File Name | Checks whether top level classes or interfaces have the same name as the file in which they reside. |
| Group Operations With Same Name Together | Enforces standard to improve readability. |
| Naming Conventions | Takes a regular expression and item name and reports all occurrences where the pattern does not match the declaration. |
| Names Of Exception Classes | Names of classes which inherit from Exception should end with Exception. |
| Use Conventional Variable Names | One-character local variable or parameter names should be avoided, except for temporary and looping variables, or where a variable holds an undistinguished value of a type. |

TABLE 15

| Performance Audits | |
|---|---|
| Performance Audits | Description |
| Avoid Declaring Variables Inside Loops | This rule recommends declaring local variables outside the loops since declaring variables inside the loop is less efficient. |
| Append To String Within a Loop | Performance enhancements can be obtained by replacing String operations with StringBuffer operations if a String object is appended within a loop. |
| Complex Loop Expressions | Avoid using complex expressions as repeat conditions within loops. |

TABLE 16

| Possible Error Audits | |
|---|---|
| Possible Error Audits | Description |
| Avoid Public And Package Attributes | Declare the attributes either private or protected, and provide operations to access or change them. |
| Avoid Statements With Empty Body | Avoid statements with empty body. |
| Assignment To For-Loop Variables | 'For'-loop variables should not be assigned. |
| Don't Compare Floating Point Types | Avoid testing for equality of floating point numbers since floating-point numbers that should be equal are not always equal due to rounding problems. |
| Enclosing Body Within a Block | The statement of a loop must always be a block. The 'then' and 'else' parts of 'if'-statements must always be blocks. This makes it easier to add statements without accidentally introducing bugs in case the developer forgets to add braces. |
| Explicitly Initialize All Variables | Explicitly initialize all variables. The only reason not to initialize a variable is where it's declared is if the initial value depends on some computation occurring first. |
| Method finalize() Doesn't Call super. finalize() | Calling of super. finalize() from finalize() is good practice of programming, even if the base class doesn't define the finalize() method. This makes class implementations less dependent on each other. |
| Mixing Logical Operators Without Parentheses | An expression containing multiple logical operators should be parenthesized properly. |
| No Assignments In Conditional Expressions | Use of assignment within conditions makes the source code hard to understand. |
| Use 'equals' Instead Of '= =' | The '= =' operator used on strings checks if two string objects are two identical objects. In most situations, however, one likes to simply check if two strings have the same value. In these cases, the 'equals' method should be used. |
| Use 'L' Instead Of 'l' at the end of integer constant | It is better to use uppercase 'L' to distinguish the letter 'l' from the number '1.' |
| Use Of the 'synchronized' Modifier | The 'synchronized' modifier on methods can sometimes cause confusion during maintenance as well as during debugging. This rule therefore recommends against using this modifier, and instead recommends using 'synchronized' statements as replacements. |

TABLE 17

| Superfluous Content Audits | |
|---|---|
| Superfluous Content Audits | Description |
| Duplicate Import Declarations | There should be at most one import declaration that imports a particular class/package. |
| Don't Import the Package the Source File Belongs To | No classes or interfaces need to be imported from the package to which the source code file belongs. Everything in that package is available without explicit import statements. |
| Explicit Import Of the java.lang Classes | Explicit import of classes from the package 'java.lang' should not be performed. |
| Equality Operations On Boolean Arguments | Avoid performing equality operations on Boolean operands. 'True' and 'false' literals should not be used in conditional clauses. |
| Imported Items Must Be Used | It is not legal to import a class or an interface and never use it. This rule checks classes and interfaces that are explicitly imported with their names-that is not with import of a complete package, using an asterisk. If unused class and interface imports are omitted, the amount of meaningless source code is reduced-thus the amount of code to be understood by a reader is minimized. |
| Unnecessary Casts | Checks for the use of type casts that are not necessary. |
| Unnecessary 'instance of' Evaluations | Verifies that the runtime type of the left-hand side expression is the same as the one specified on the right-hand side. |
| Unused Local Variables And Formal Parameters | Local variables and formal parameter declarations must be used. |
| Use Of Obsolete Interface Modifier | The modifier 'abstract' is considered obsolete and should not be used. |
| Use Of Unnecessary Interface Member Modifiers | All interface operations are implicitly public and abstract. All interface attributes are implicitly public, final and static. |
| Unused Private Class Member | An unused class member might indicate a logical flaw in the program. The class declaration has to be reconsidered in order to determine the need of the unused member(s). |

Figure 8B:
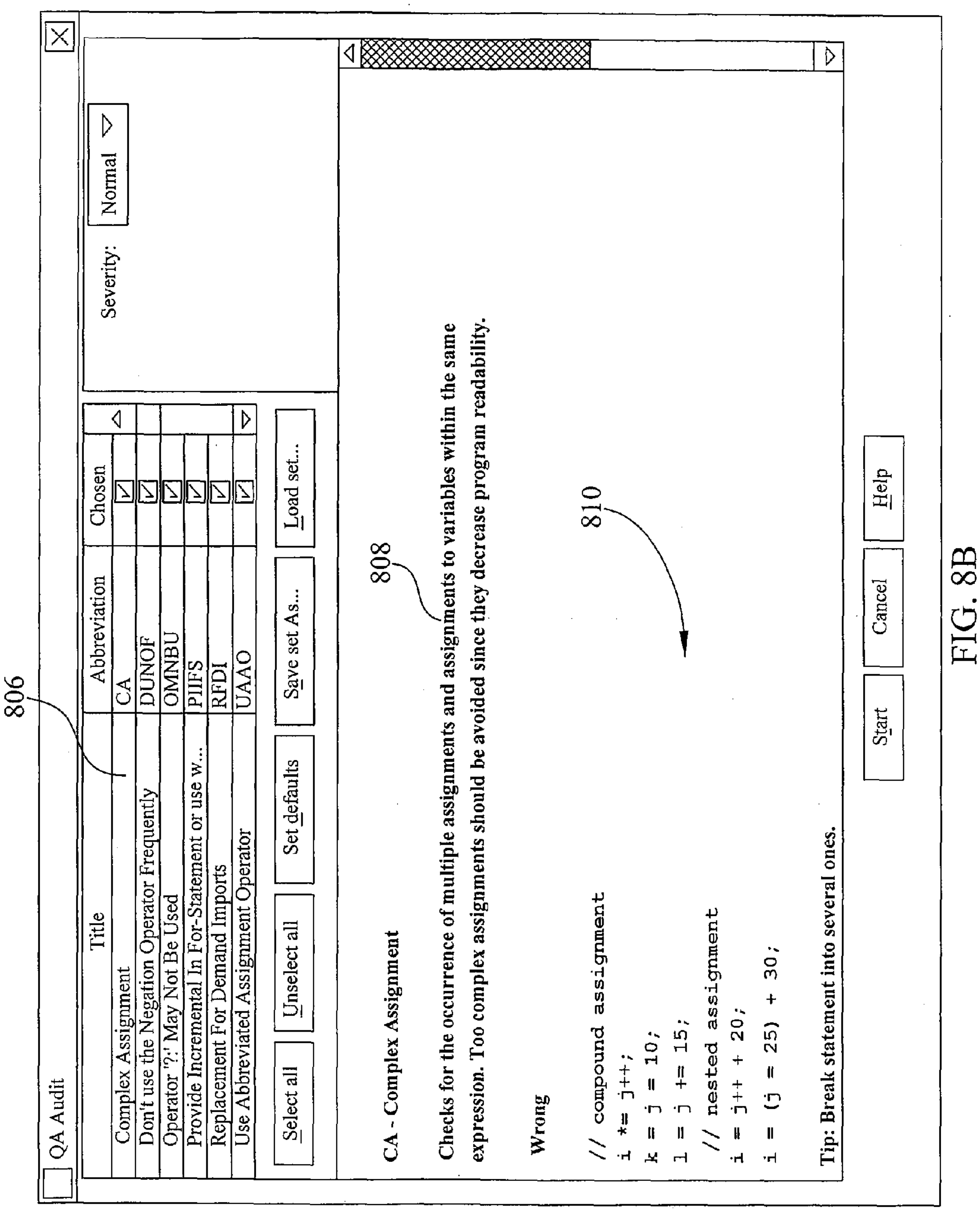
FIG. 8B depicts a user interface displayed by the software development tool depicted in FIG. 2, where the user interface displays the definition of the criteria which the software development tool checks in the source code, and an example of source code which does not conform to the criteria.

If the QA module determines that the source code does not conform, an error message is provided to the developer. For example, as depicted in FIG. 8A, the software development tool checks for a variety of coding styles 800. If the software development tool were to check for "Access Of Static Members Through Objects" 802, it would verify whether static members are referenced through class names rather than through objects 804. Further, as depicted in FIG. 8B, if the software development tool were to check for "Complex Assignment" 806, the software development tool would check for the occurrence of multiple assignments and assignments to variables within the same expression to avoid complex assignments since these decrease program readability 808. An example of source code having a complex assignment 810 and source code having a non-complex assignment 812 are depicted in FIGS. 8B and 8C, respectively. The QA module of the software development tool scans the source code for other syntax errors well known in the art, as described above, and provides an error message if any such errors are detected.

The improved software development tool of the present invention is used to develop source code in a project. The project comprises a plurality of files and the source code of a chosen one of the plurality of files is written in a given language. The software development tool determines the language of the source code of the chosen file, converts the source code from the language into a language-neutral representation, uses the language-neutral representation to textually display the source code of the chosen file in the language, and uses the language-neutral representation to display a graphical representation of at least a portion of the project. The source code and the graphical representation are displayed simultaneously.

The improved software development tool of the present invention is also used to develop source code. The software development tool receives an indication of a selected language for the source code, creates a file to store the source code in the selected language, converts the source code from the selected language into a language-neutral representation, uses the language-neutral representation to display the source code of the file, and uses the language-neutral representation to display a graphical representation of the file. Again, the source code and the graphical representation are displayed simultaneously.

Moreover, if the source code in the file is modified, the modified source code and a graphical representation of at least a portion of the modified source code are displayed simultaneously. The QA module of the software development tool provides an error message if the modification does not conform to predefined or user-defined styles, as described above. The modification to the source code may be received from the display of the source code, the display of the graphical representation of the project, or via some other independent software to modify the code. The graphical representation of the project may be in Unified Modeling Language; however, one skilled in the art will recognize that other graphical representations of the source code may be displayed. Further, although the present invention is described and shown using the various views of the UML, one of ordinary skill in the art will recognize that other views may be displayed.

Figure 9:
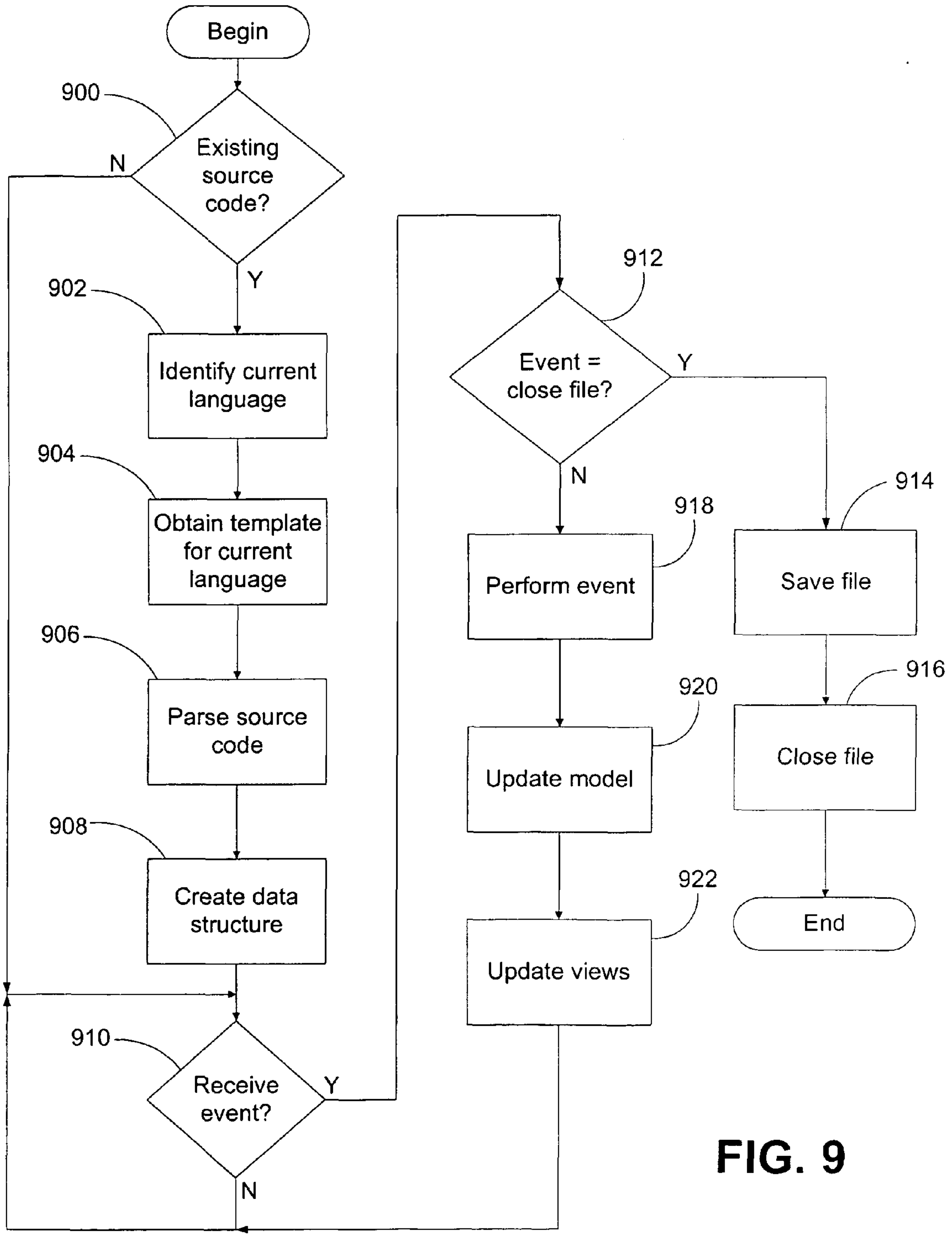
FIG. 9 depicts a flow diagram of the steps performed by the software development tool depicted in FIG. 2.

FIG. 9 depicts a flow diagram of the steps performed by the software development tool to develop a project in accordance with the present invention. As previously stated, the project comprises a plurality of files. The developer either uses the software development tool to open a file which contains existing source code, or to create a file in which the source code will be developed. If the software development tool is used to open the file, determined in step 900, the software development tool initially determines the programming language in which the code is written (step 902). The language is identified by the extension of the file, e.g., "java" identifies source code written in the Java™ language, while ".cpp" identifies source code written in C++. The software development tool then obtains a template for the current programming language, i.e., a collection of generalized definitions for the particular language that can be used to build the data structure (step 904). For example, the definition of a new Java™ class contains a default name, e.g., "Class1," and the default code, "public class Class1 { }." Such templates are well known in the art. For example, the "Microsoft Foundation Class Library" and the "Microsoft Word Template For Business Use Case Modeling" are examples of standard template libraries from which programmers can choose individual template classes. The software development tool uses the template to parse the source code (step 906), and create the data structure (step 908). After creating the data structure or if there is no existing code, the software development tool awaits an event, i.e., a modification or addition to the source code by the developer (step 910). If an event is received and the event is to close the file (step 912), the file is saved (step 914) and closed (step 916). Otherwise, the software development tool performs the event (step 918), i.e., the tool makes the modification. The software development tool then updates the TMM or model (step 920), as discussed in detail below, and updates both the graphical and the textual views (step 922).

Figure 10A:
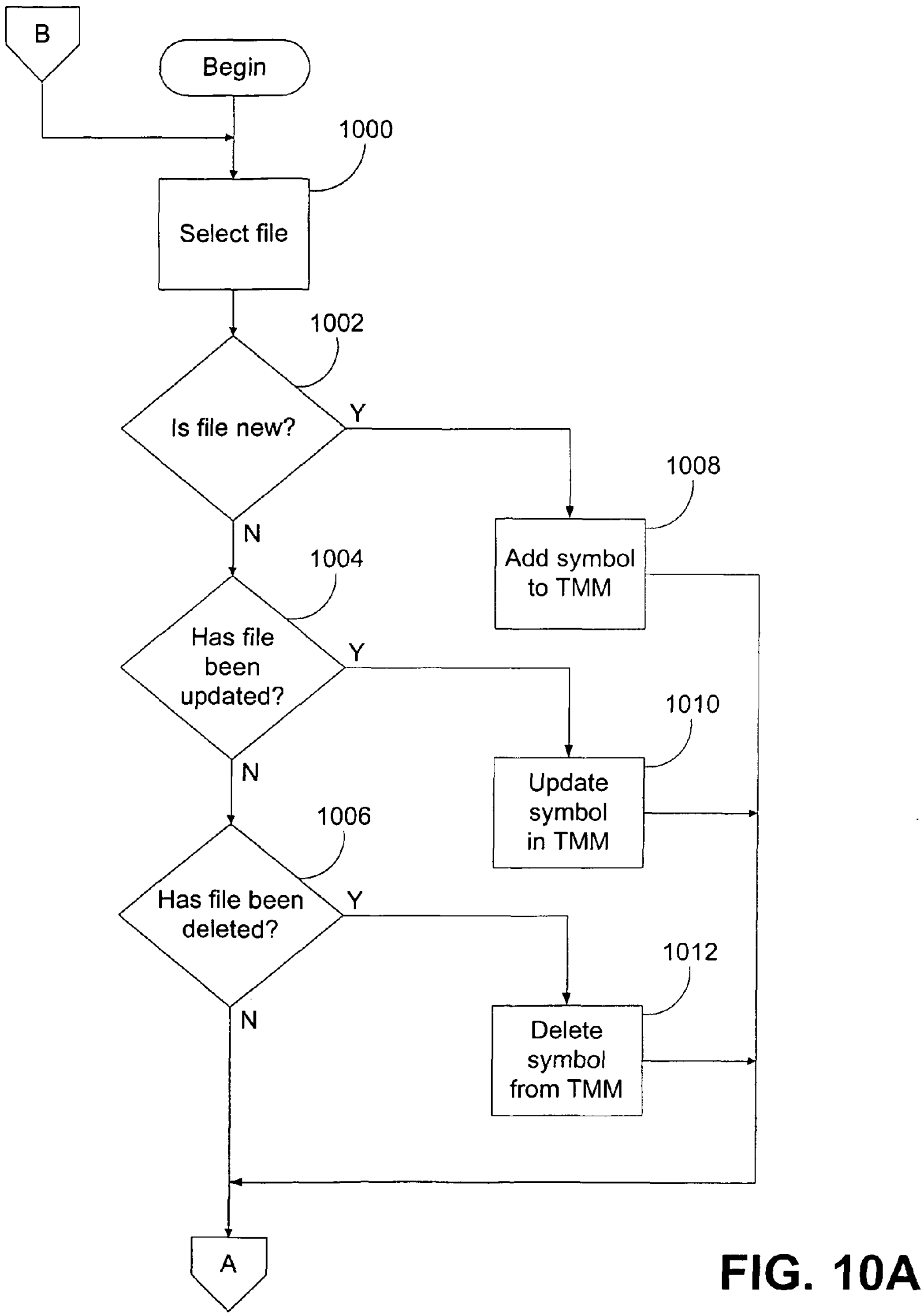
FIGS. 10A and 10B depict a flow diagram illustrating the update model step of FIG. 9.
Figure 10B:
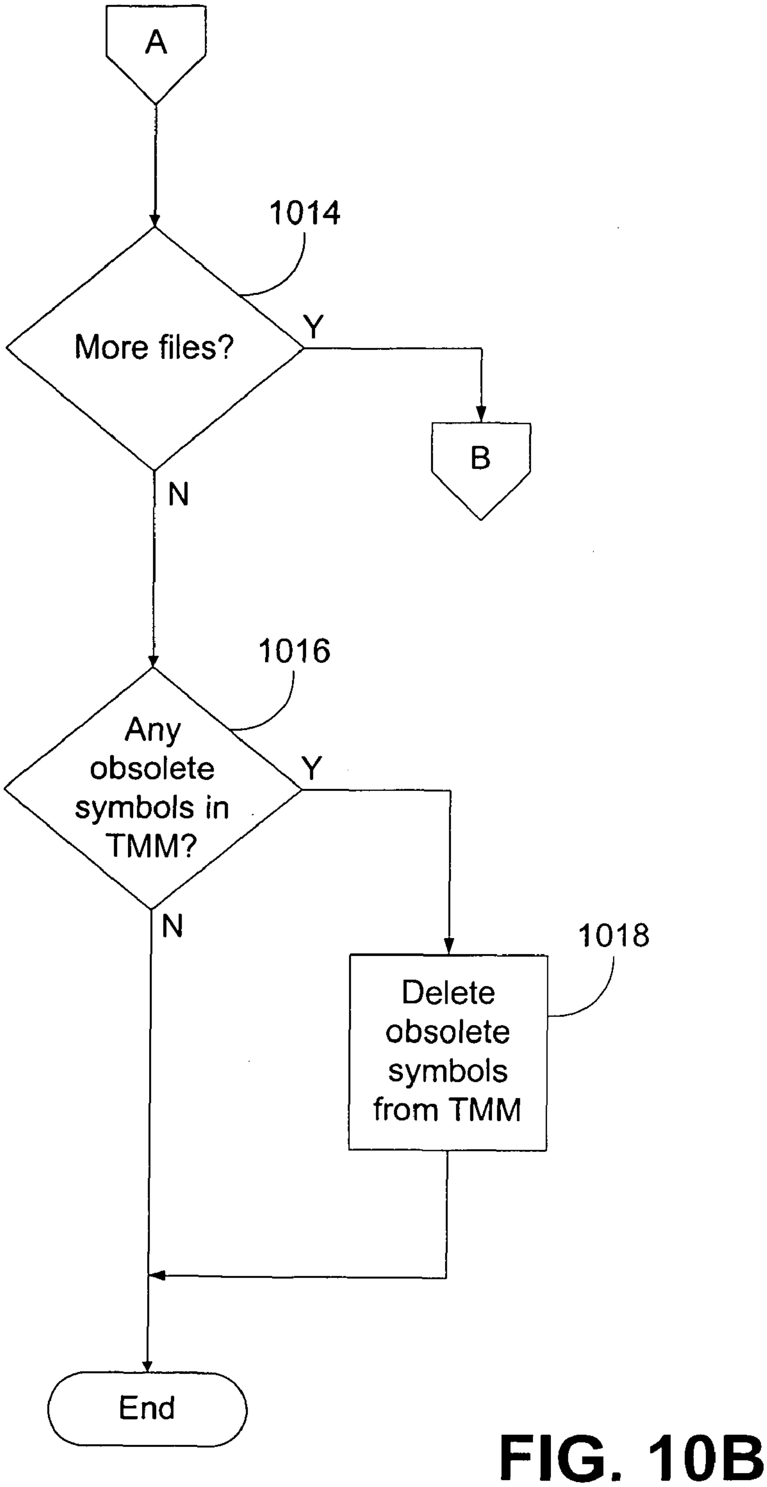

FIGS. 10A and 10B depict a flow diagram illustrating the update model step of FIG. 9. The software development tool selects a file from the project (step 1000), and determines whether the file is new (step 1002), whether the file has been updated (step 1004), or whether the file has been deleted (step 1006). If the file is new, the software development tool adds the additional symbols from the file to the TMM (step 1008). To add the symbol to the TMM, the software development tool uses the template to parse the symbol to the TMM. If the file has been updated, the software development tool updates the symbols in the TMM (step 1010). Similar to the addition of a symbol to the TMM, the software development tool uses the template to parse the symbol to the TMM. If the file has been deleted, the software development tool deletes the symbols in the TMM (step 1012). The software development tool continues this analysis for all files in the project. After all files are analyzed (step 1014), any obsolete symbols in the TMM (step 1016) are deleted (step 1018).

Figure 11:
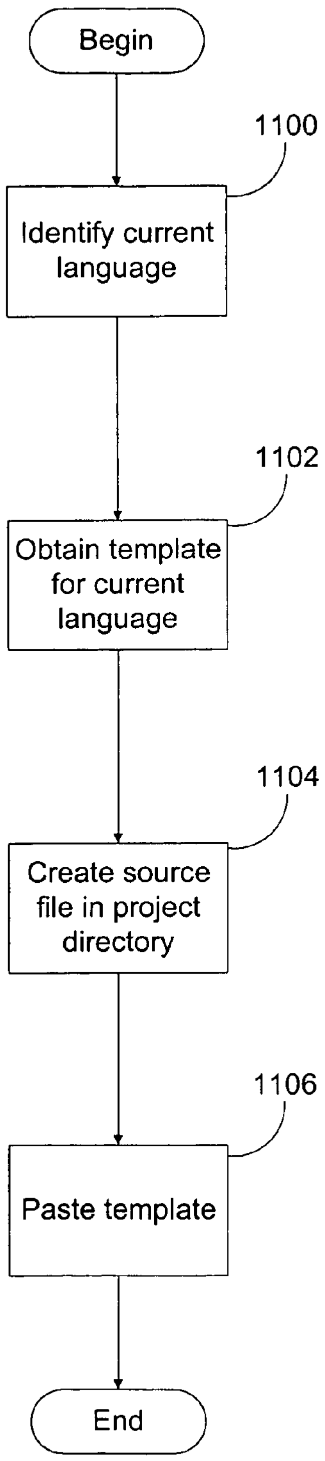
FIG. 11 depicts a flow diagram of the steps performed by the software development tool in FIG. 2 when creating a class.

FIG. 11 depicts a flow diagram illustrating the performance of an event, specifically the creation of a class, in accordance with the present invention. After identifying the programming language (step 1100), the software development tool obtains a template for the language (step 1102), creates a source code file in the project directory (step 1104), and pastes the template onto the TMM (step 1106). The project directory corresponds to the SCI model 302 of FIG. 3. Additional events which a developer may perform using the software development tool include the creation, modification or deletion of packages, projects, attributes, interfaces, links, operations, and the closing of a file.

Figure 12:
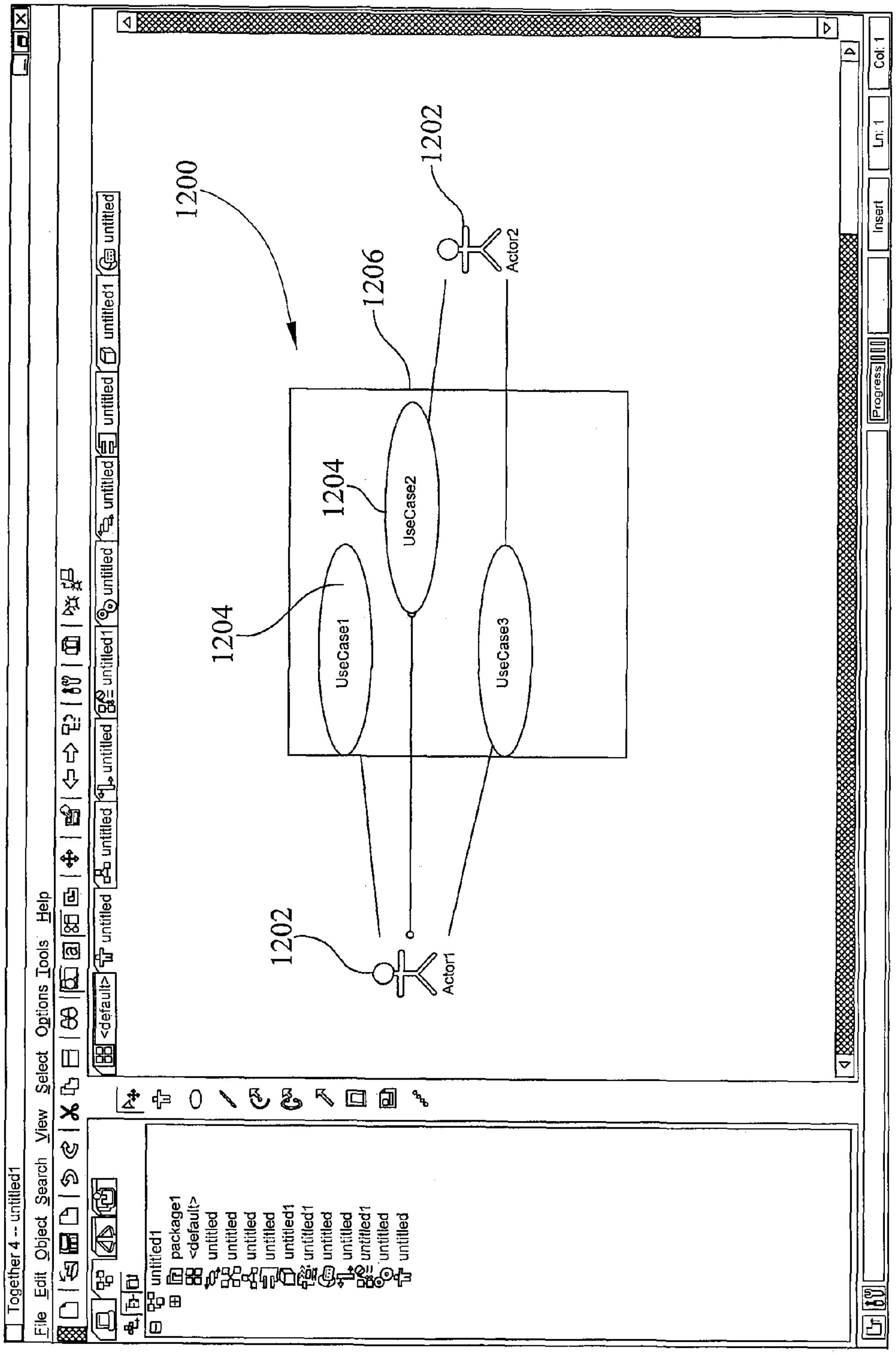
FIG. 12 depicts a user interface displayed by the software development tool depicted in FIG. 2, where the user interface displays a use case diagram of source code.
Figure 13:
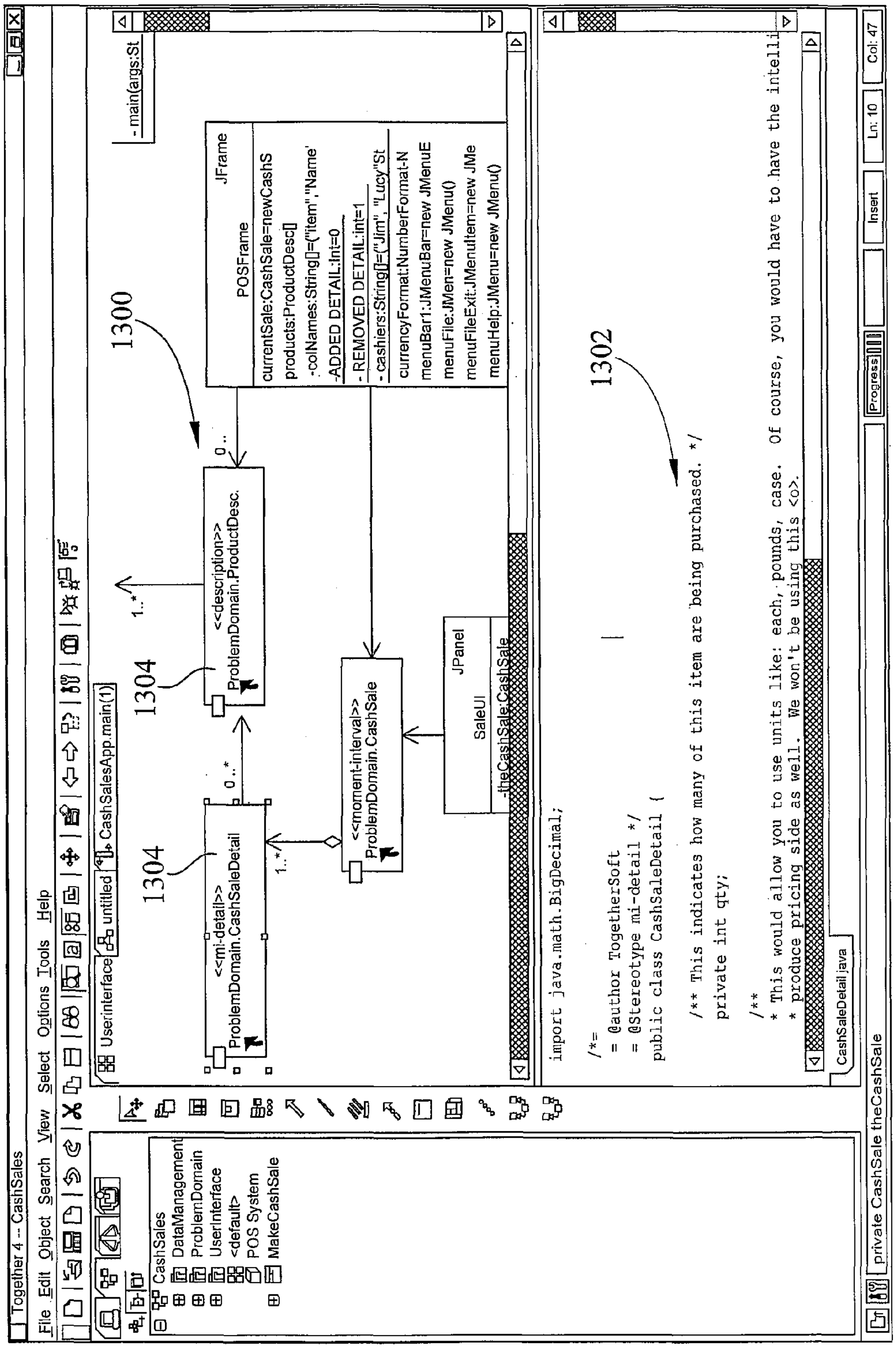
FIG. 13 depicts a user interface displayed by the software development tool depicted in FIG. 2, where the user interface displays both a class diagram and a textual view of source code.

The software development tool is collectively broken into three views of the application: the static view, the dynamic view, and the functional view. The static view is modeled using the use-case and class diagrams. A use case diagram 1200, depicted in FIG. 12, shows the relationship among actors 1202 and use cases 1204 within the system 1206. A class diagram 1300, depicted in FIG. 13 with its associated source code 1302, on the other hand, includes classes 1304, interfaces, packages and their relationships connected as a graph to each other and to their contents.

Figure 14:
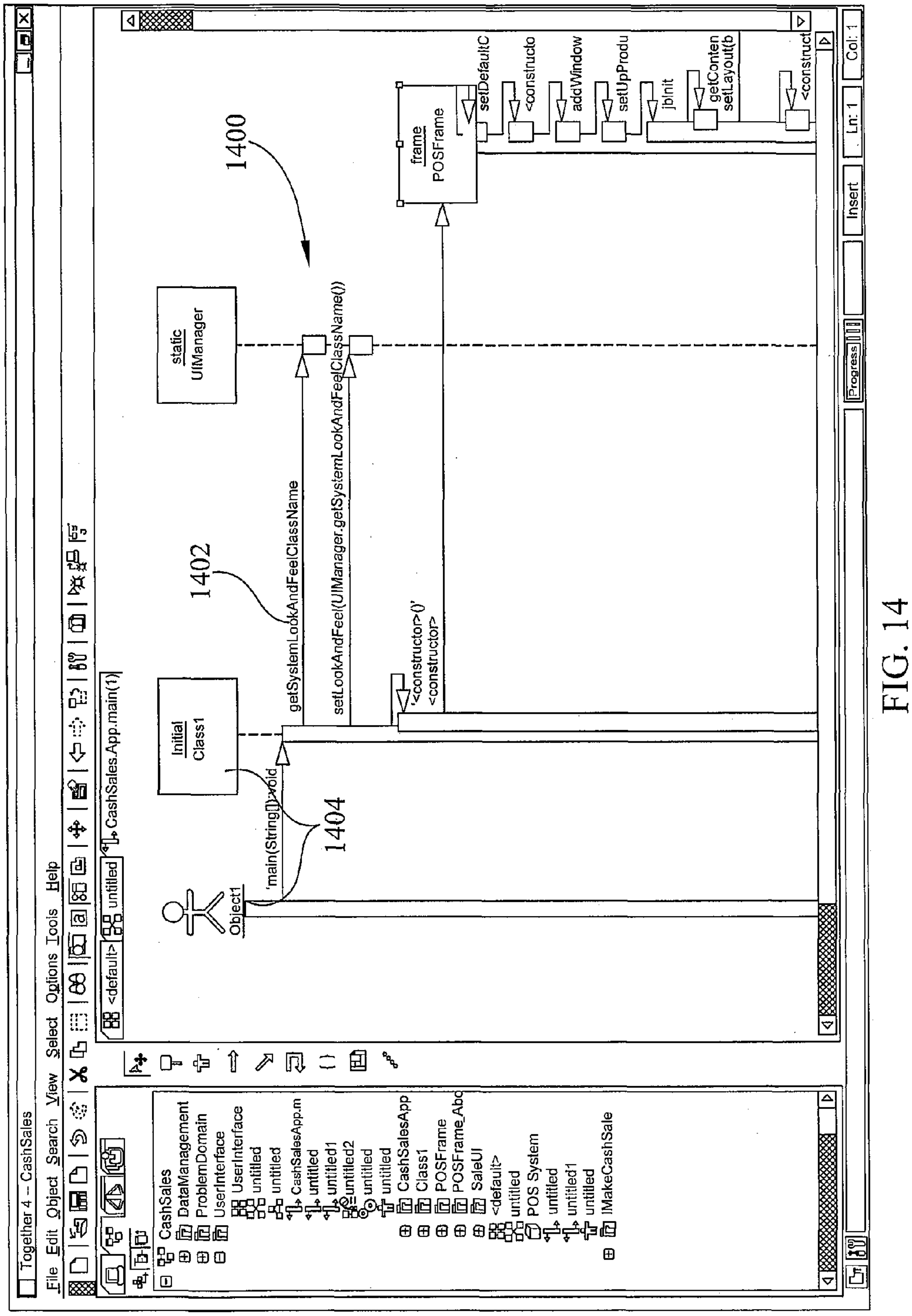
FIG. 14 depicts a user interface displayed by the software development tool depicted in FIG. 2, where the user interface displays a sequence diagram of source code.
Figure 15:
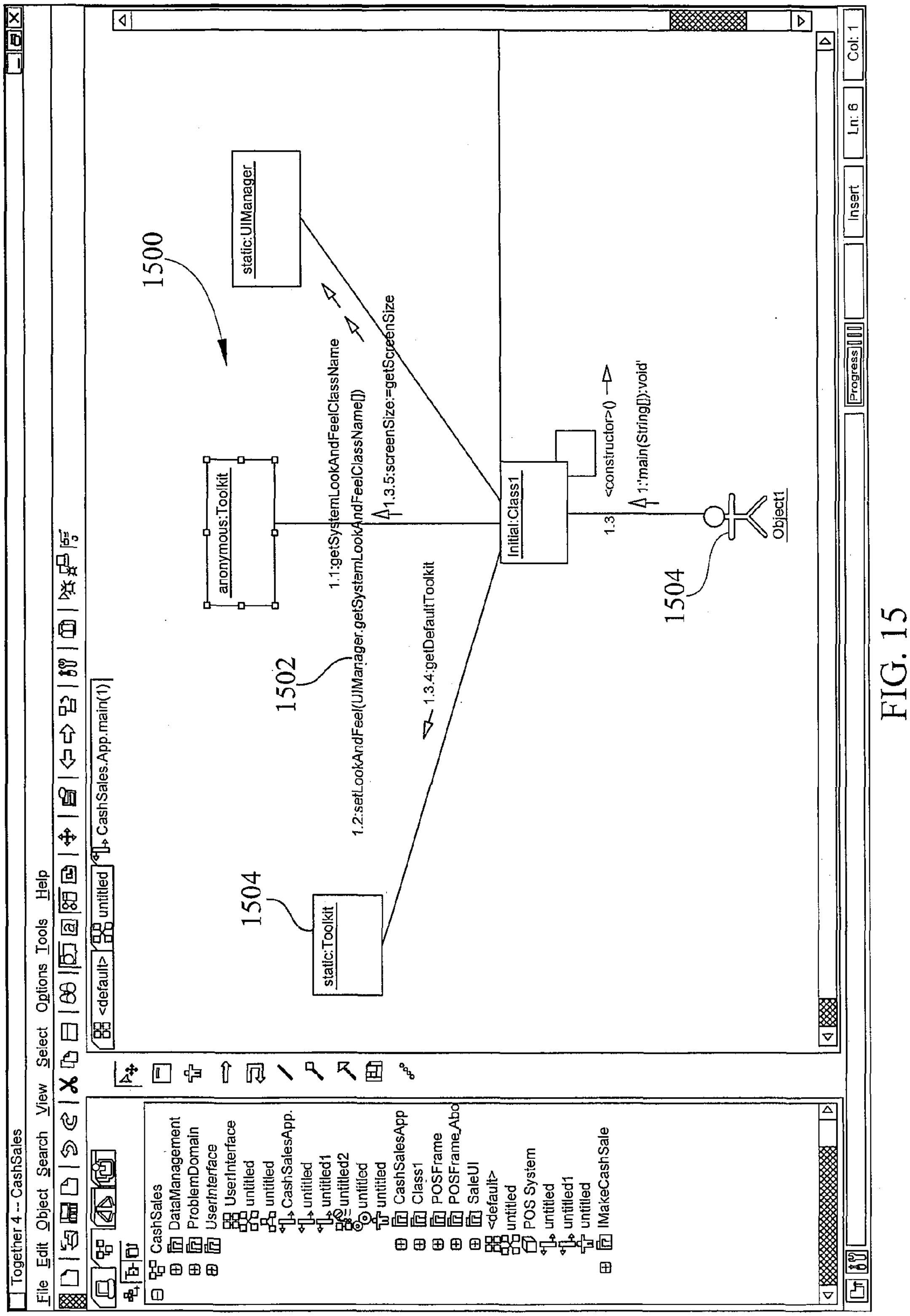
FIG. 15 depicts a user interface displayed by the software development tool depicted in FIG. 2, where the user interface displays a collaboration diagram of source code.

The dynamic view is modeled using the sequence, collaboration and statechart diagrams. As depicted in FIG. 14, a sequence diagram 1400 represents an interaction, which is a set of messages 1402 exchanged among objects 1404 within a collaboration to effect a desired operation or result. In a sequence diagram 1400, the vertical dimension represents time and the horizontal dimension represents different objects. A collaboration diagram 1500, depicted in FIG. 15, is also an interaction with messages 1502 exchanged among objects 1504, but it is also a collaboration, which is a set of objects 1504 related in a particular context. Contrary to sequence diagrams 1400 (FIG. 14), which emphasize the time ordering of messages along the vertical axis, collaboration diagrams 1500 (FIG. 15) emphasize the structural organization of objects.

Figure 16:
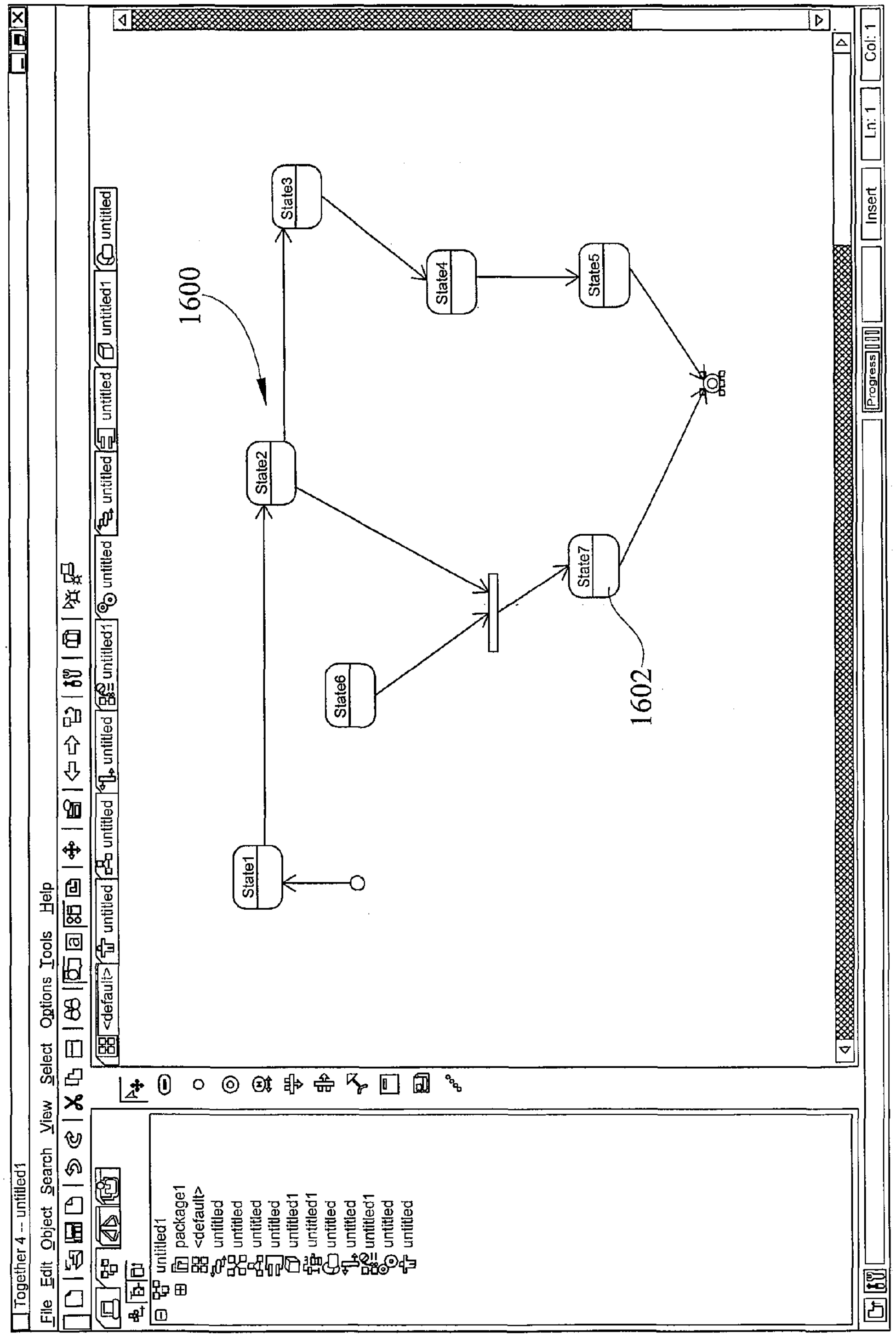
FIG. 16 depicts a user interface displayed by the software development tool depicted in FIG. 2, where the user interface displays a statechart diagram of source code.

A statechart diagram 1600 is depicted in FIG. 16. The statechart diagram 1600 includes the sequences of states 1602 that an object or interaction goes through during its life in response to stimuli, together with its responses and actions. It uses a graphic notation that shows states of an object, the events that cause a transition from one state to another, and the actions that result from the transition.

Figure 17:
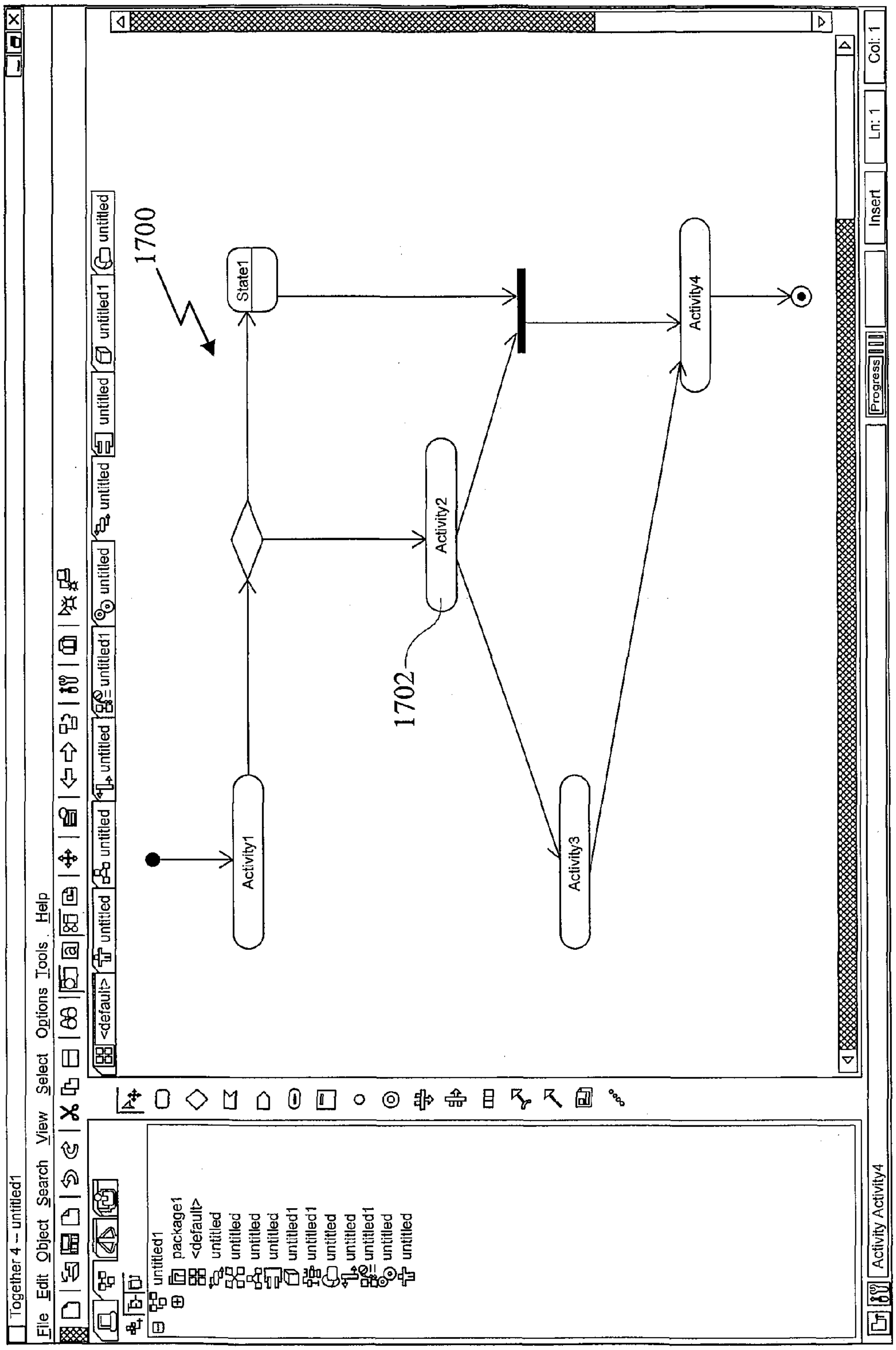
FIG. 17 depicts a user interface displayed by the software development tool depicted in FIG. 2, where the user interface displays an activity diagram of source code.

The functional view can be represented by activity diagrams 1700 and more traditional descriptive narratives such as pseudocode and minispecifications. An activity diagram 1700 is depicted in FIG. 17, and is a special case of a state diagram where most, if not all, of the states are action states 1702 and where most, if not all, of the transitions are triggered by completion of the actions in the source states. Activity diagrams 1700 are used in situations where all or most of the events represent the completion of internally generated actions.

Figure 18:
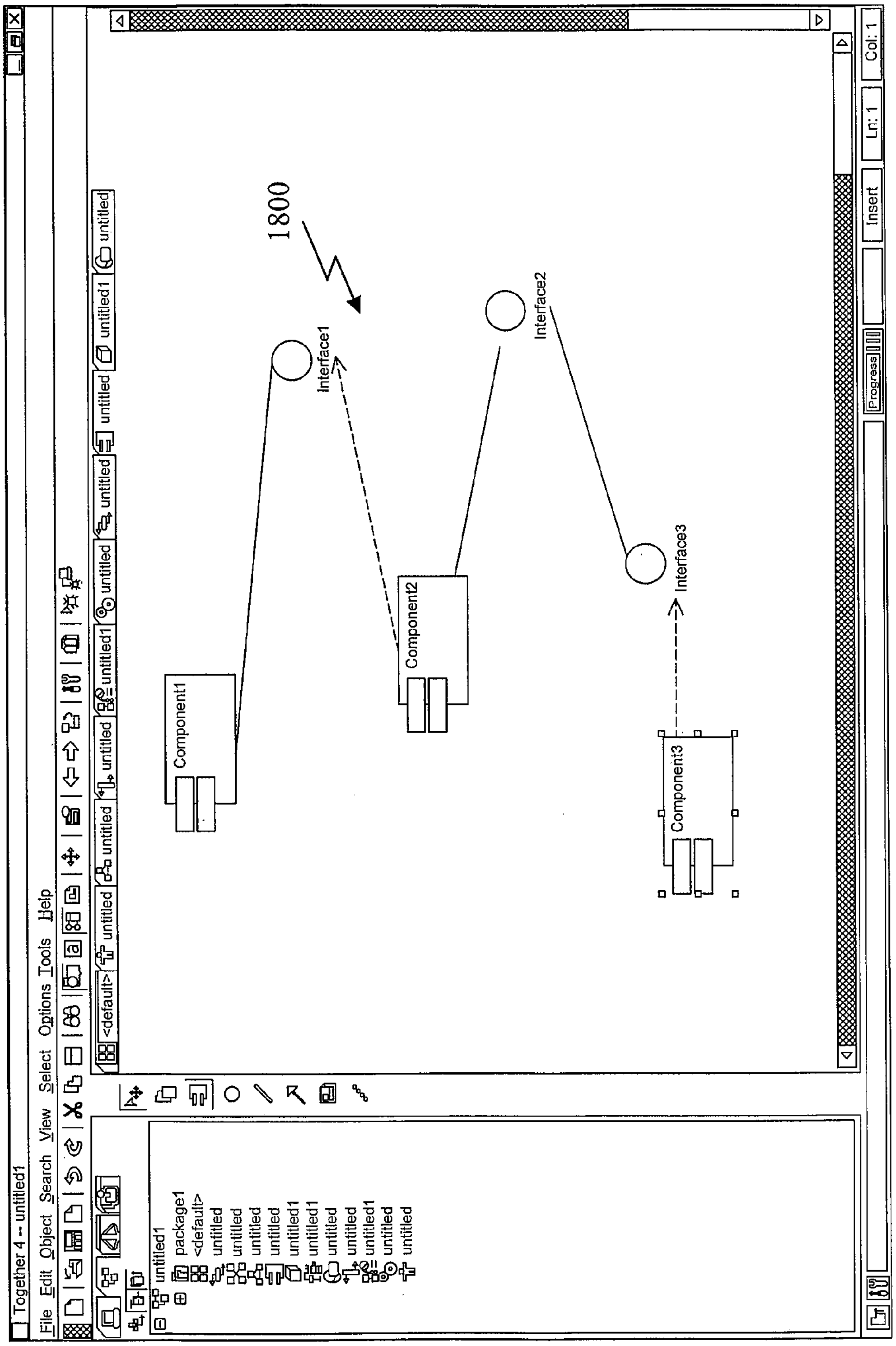
FIG. 18 depicts a user interface displayed by the software development tool depicted in FIG. 2, where the user interface displays a component diagram of source code.
Figure 19:
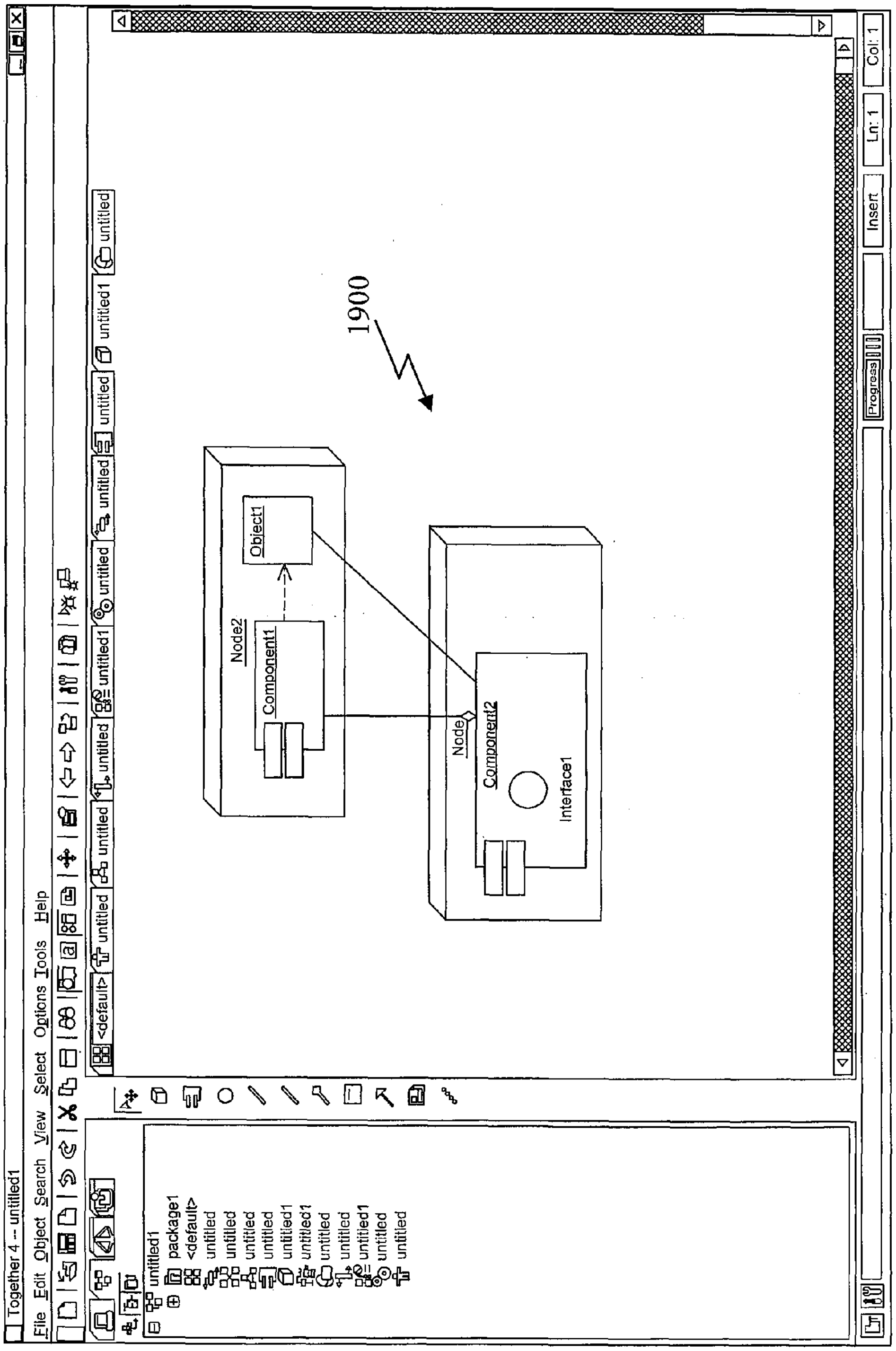
FIG. 19 depicts a user interface displayed by the software development tool depicted in FIG. 2, where the user interface displays a deployment diagram of source code.

There is also a fourth view mingled with the static view called the architectural view. This view is modeled using package, component and deployment diagrams. Package diagrams show packages of classes and the dependencies among them. Component diagrams 1800, depicted in FIG. 18, are graphical representations of a system or its component parts. Component diagrams 1800 show the dependencies among software components, including source code components, binary code components and executable components. As depicted in FIG. 19, Deployment diagrams 1900 are used to show the distribution strategy for a distributed object system. Deployment diagrams 1900 show the configuration of run-time processing elements and the software components, processes and objects that live on them.

Although discussed in terms of class diagrams, one skilled in the art will recognize that the software development tool of the present invention may support these and other graphical views.

Relating a Data Structure and Object-oriented Element for Distributed Computing

In addition to the functionality described above, the software development tool significantly reduces programming development time for a developer by allowing the developer to automatically generate an Enterprise JavaBean™ (EJB) or a persistent class from a database table and automatically generate a database table from an EJB or a persistent class. Furthermore, when the EJB or persistent class is modified, the software development tool is able to automatically update the corresponding database table so as to keep the EJB or persistent class and the corresponding database table in synchronization. Similarly, when the database table corresponding to the EJB or persistent class is updated, the software development tool is able to automatically update the EJB or persistent class.

As is well known to one skilled in the art, a persistent class has attributes that are mapped to a database table and whose state is maintained between calls to operations within code corresponding to the persistent class. Because the software development tool is able to relate a database table to a persistent class, the software development tool saves the programmer time in developing and maintaining code that includes these attributes by generating and updating code for these attributes from a corresponding database table. Also, as is well known to one skilled in the art, an EJB serves as a front-end to a DBMS, where the EJB embodies business logic that is performed on the data in the database associated with the DBMS. The data in the database represents the specific details and information flow of the organization or of a particular industry. An EJB allows application programs to be independent of the business logic, so that when the business logic changes, the application need not change. Thus, a developer is able to focus on developing code for a client application that utilizes the business data stored in the database, rather than worrying about endless amounts of programming and coding needed to connect all the working parts for accessing the database.

Figure 37:
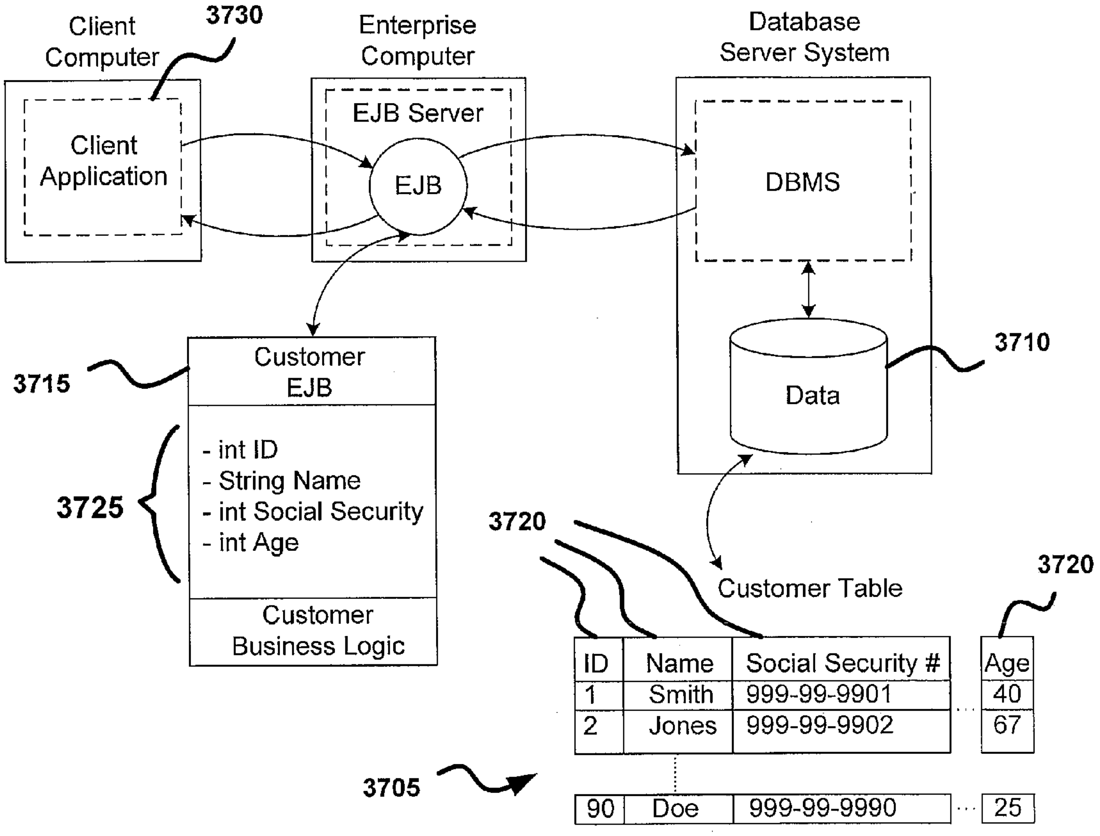
FIG. 37 depicts an Enterprise JavaBean™ server interacting with other systems.

An example of an EJB representing a real-world object (e.g., a customer of an enterprise) is depicted in FIG. 37. Each record in the Customer Table 3705 found in the database 3710 is accessible by the example Customer EJB 3715 via the attribute fields 3720 of the Customer Table 3705 (i.e., "ID", "Name", "Social Security Number", and "Age" are shown) that are mapped to attributes 3725 in the code corresponding to the EJB. Assuming the Client Application 3730 needs to determine whether the person named "Jones" qualifies for a senior citizen discount on a purchase order, the Customer EJB 3715 may be invoked to answer the question by performing the necessary business logic operation which may involve ascertaining the "age" for "Jones" from the Customer Table 3705 and determining if the "age" for "Jones" is over 50 before reporting back the answer to the Client Application 3730.

As shown in the above example, an EJB (i.e., an EJB EntityBean) may represent a real-world object, such as a customer, a bank account, or a cruise ship, which has persistent records (i.e., data structures) in a database. An EJB (i.e., an EJB SessionBean) may also represent a set of processes or tasks, which are performed on behalf of a client application. Thus, an EJB is a distributed computing component, where a distributed computing component is a software component that runs on a computer and is designed to perform business logic for client application(s) requiring a solution to a business problem (e.g., process a customer order or determine a senior citizen discount for a customer). The solution to the business problem typically requires access to corresponding business data contained in an enterprise database. As described below, the software development tool supports relating a distributed computing component, such as an EJB, to a database table or data structure.

By allowing a developer to generate or update an EJB from an existing data structure in a database, the software development tool saves the developer development time as the programmer no longer has to use one tool to query the database for the composition of the data structure and another tool to create the EJB with attributes and methods (i.e., business logic operations) that map to the database in order to allow access to the data structure after the EJB is deployed. Similarly, the software development tool saves a developer time that would be spent creating a data structure that maps to code corresponding to a previously developed EJB by allowing the developer to form or update a data structure from the EJB. Thus, the software development tool relates a data structure to an object-oriented element, such as a persistent class or an EJB, so that code corresponding to the object-oriented element correlates to the data structure. One skilled in the art will appreciate that other object-oriented elements may be related to a data structure in a database by the software development tool using methods and systems consistent with the present invention. However, for clarity in the detailed description below, the methods and systems consistent with the present invention are discussed in reference to a persistent class and an EJB. An EJB is more clearly described in the following references that are incorporated herein by reference: (1) Richard Monson-Haefel, *Enterprise JavaBeans*™ $2^{nd}$ *Edition,* O'Reilly & Associates (2000); and (2) Sun Microsystems' Enterprise JavaBeans™ Specification v1.0, v1.1, and v2.0, available at http://java.sun.com/products/ejb/docs.html.

Figure 20:
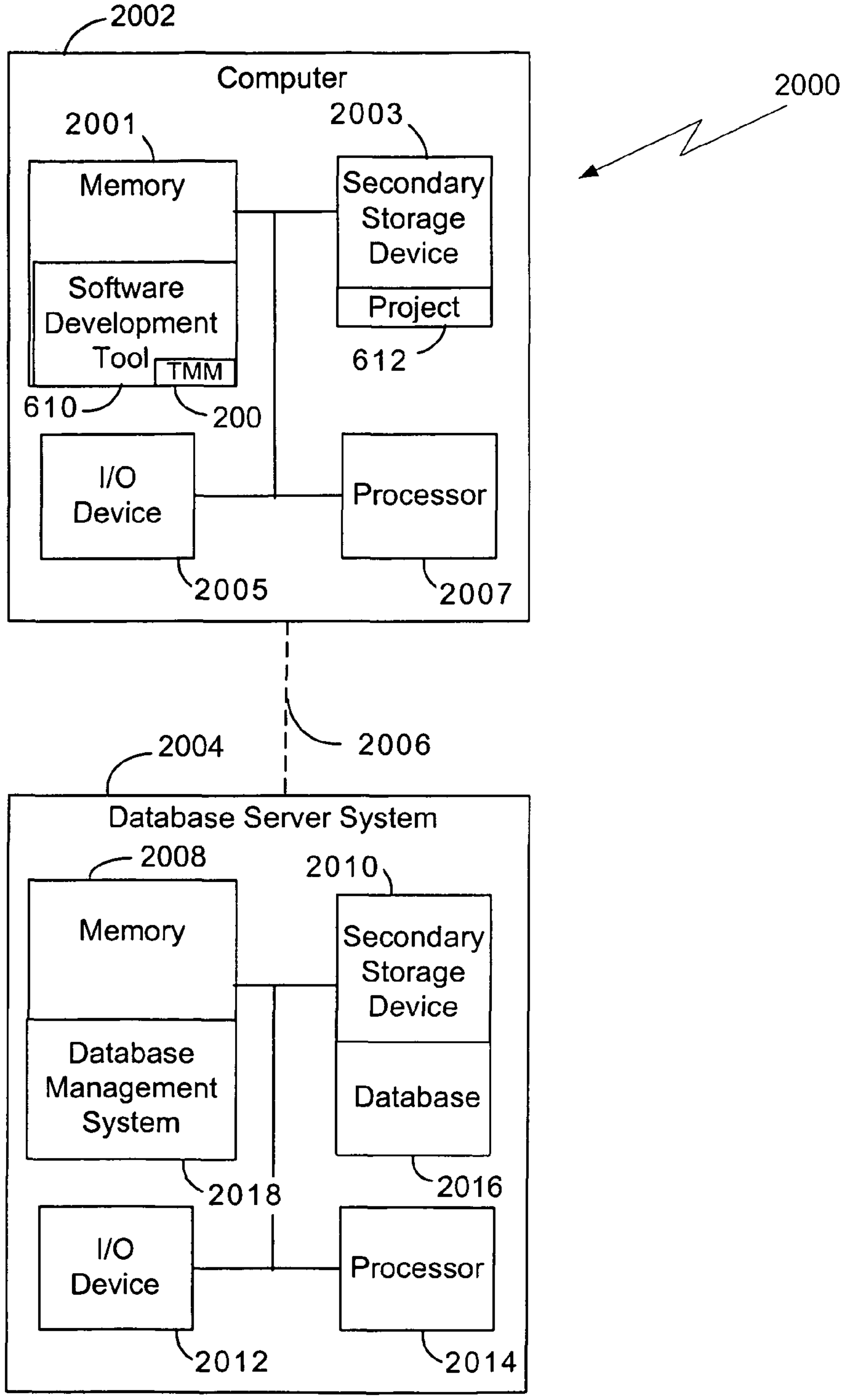
FIG. 20 depicts an exemplary data processing system in which the improved software development tool depicted in FIG. 2 may operate.

Turning to FIG. 20, a data processing system 2000 is depicted that is suitable for practicing methods and systems consistent with the present invention, including relating an object-oriented element to a data structure in a database that contains business data. Data processing system 2000 includes a computer 2002 and a database server system 2004 that are connected via network 2006. The network 2006 may be any known physical or wireless link capable of supporting a data transmission between two computer systems, such as a Local Area Network (LAN), a Wide Area Network (WAN), Internet or leased phone lines.

Computer 2002 includes the software development tool 610. The database server system 2004 includes a memory 2008, a secondary storage device 2010, an I/O device 2012, and a processor 2014. The secondary storage device 2010 includes a database 2016 that contains data structures which hold business data used in distributed computing. Memory 2008 includes a database management system 2018 that enables a requester, such as a developer using the software development tool 610, to store, modify, and extract information from the database 2016. The database management system 2018 may be any known database management system (DBMS) that is able to control the access to the database 2016.

In another implementation, the secondary storage device 2003 of the computer 2002 includes the database 2016 and the memory 2001 of the computer 2002 includes the database management system 2018. In this implementation, the software development tool 610 accesses the database 2016 without communicating via network 2006 to database server system 2004.

Figure 21A:
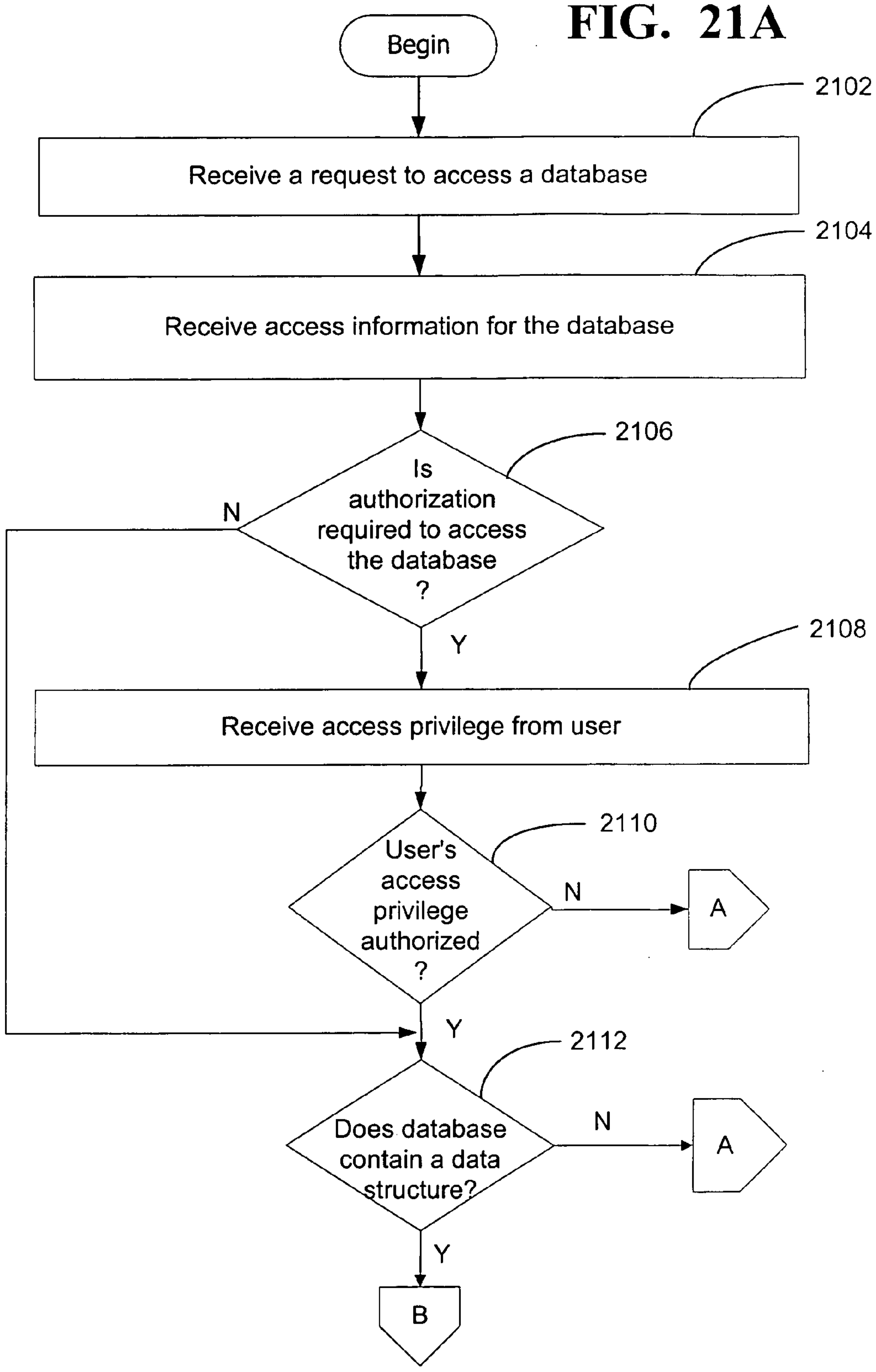
Figure 21C:
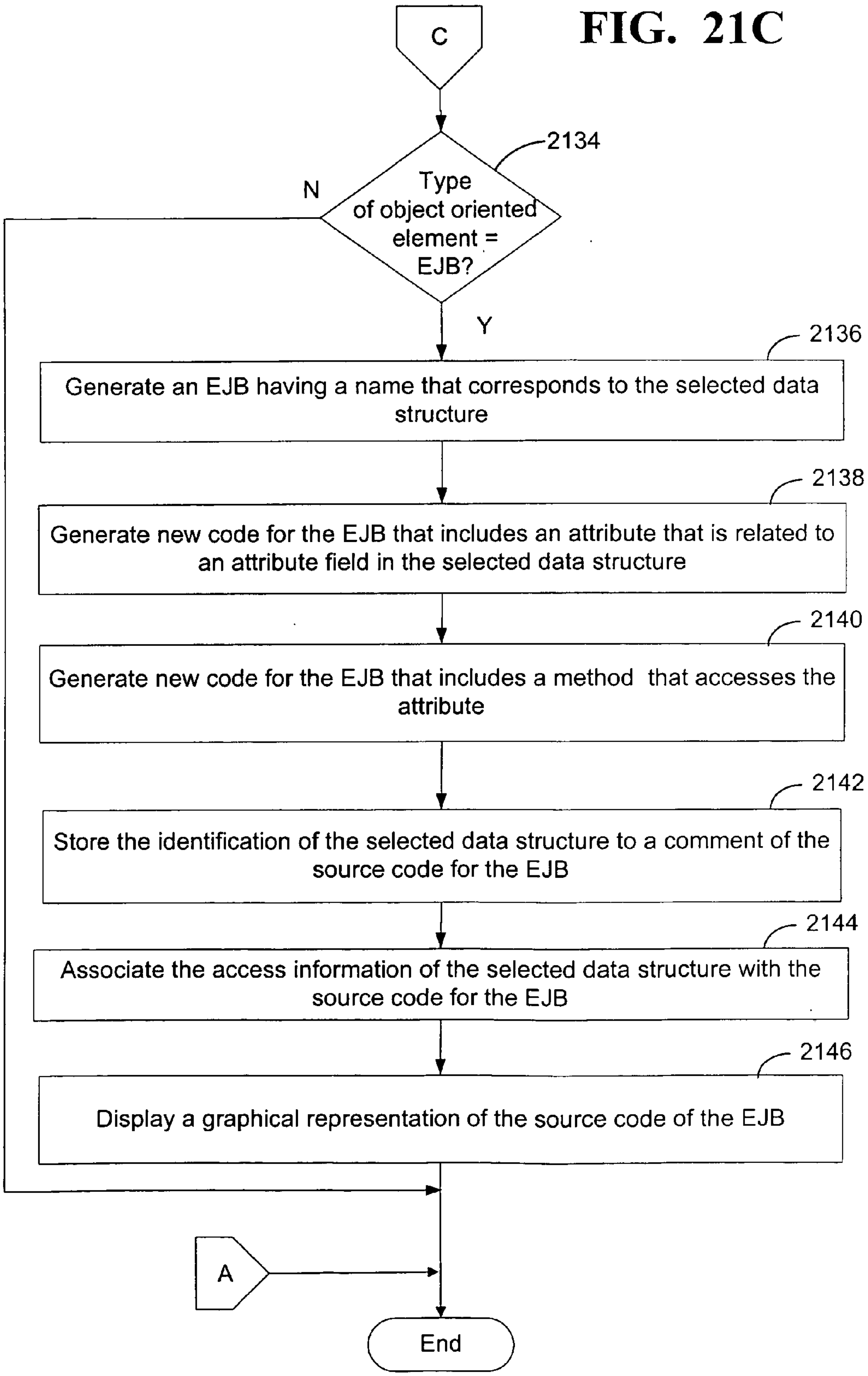
Figure 22:
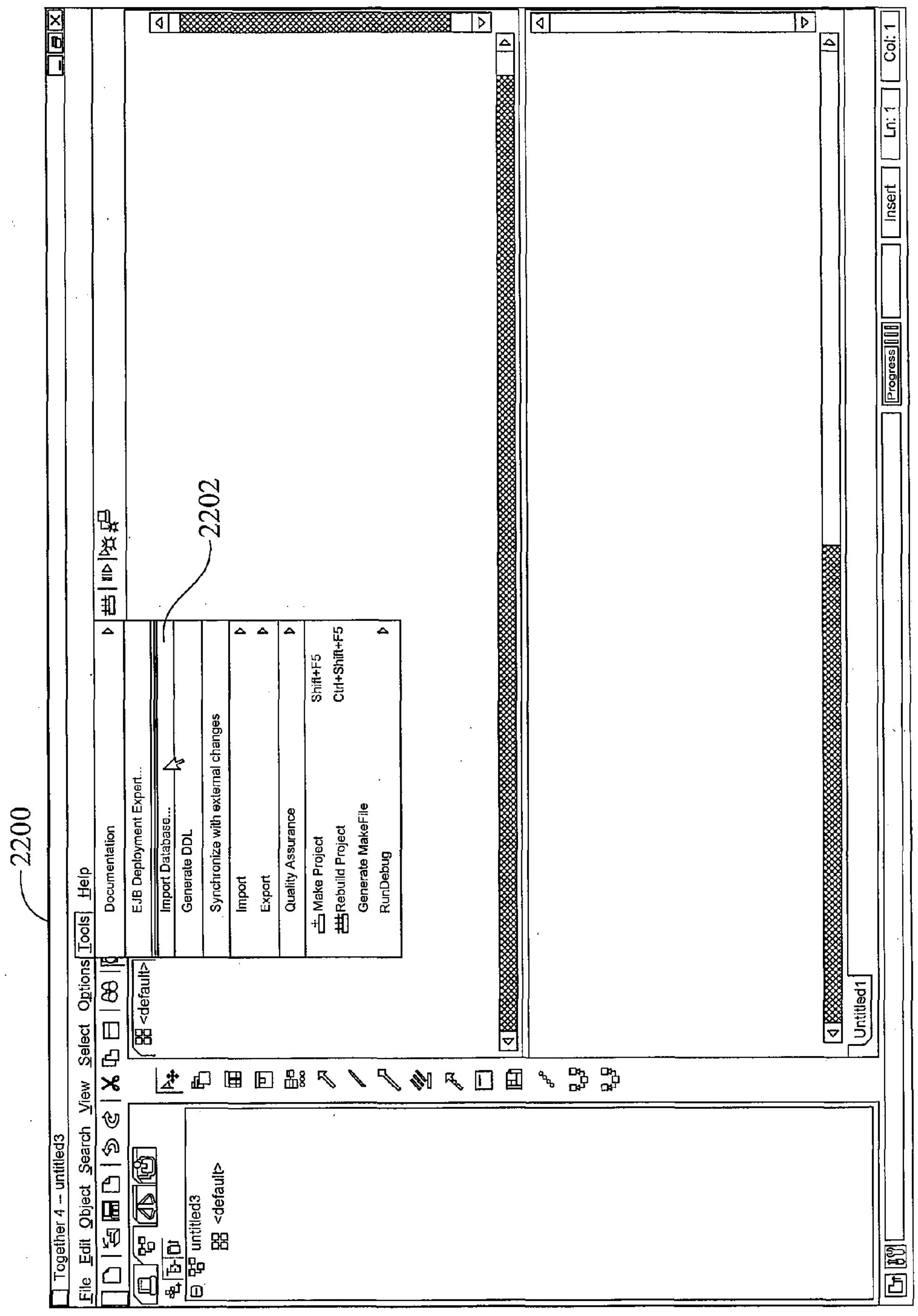
FIG. 22 depicts a user interface displayed by the software development tool for receiving a request to access a database.

FIGS. 21A-C depict a flow diagram illustrating an exemplary process performed by the software development tool 610 for generating source code for an object-oriented element from a data structure in a database. To form an object-oriented element from a data structure, the software development tool 610 receives a request to access a database (step 2102). As depicted in FIG. 22, the software development tool may receive the request to access the database via a menu selection 2202 on a user interface 2200. However, a programmer may indicate the request to the software development tool using any known programming input technique, such as a keyboard input or icon selection.

Figure 23:
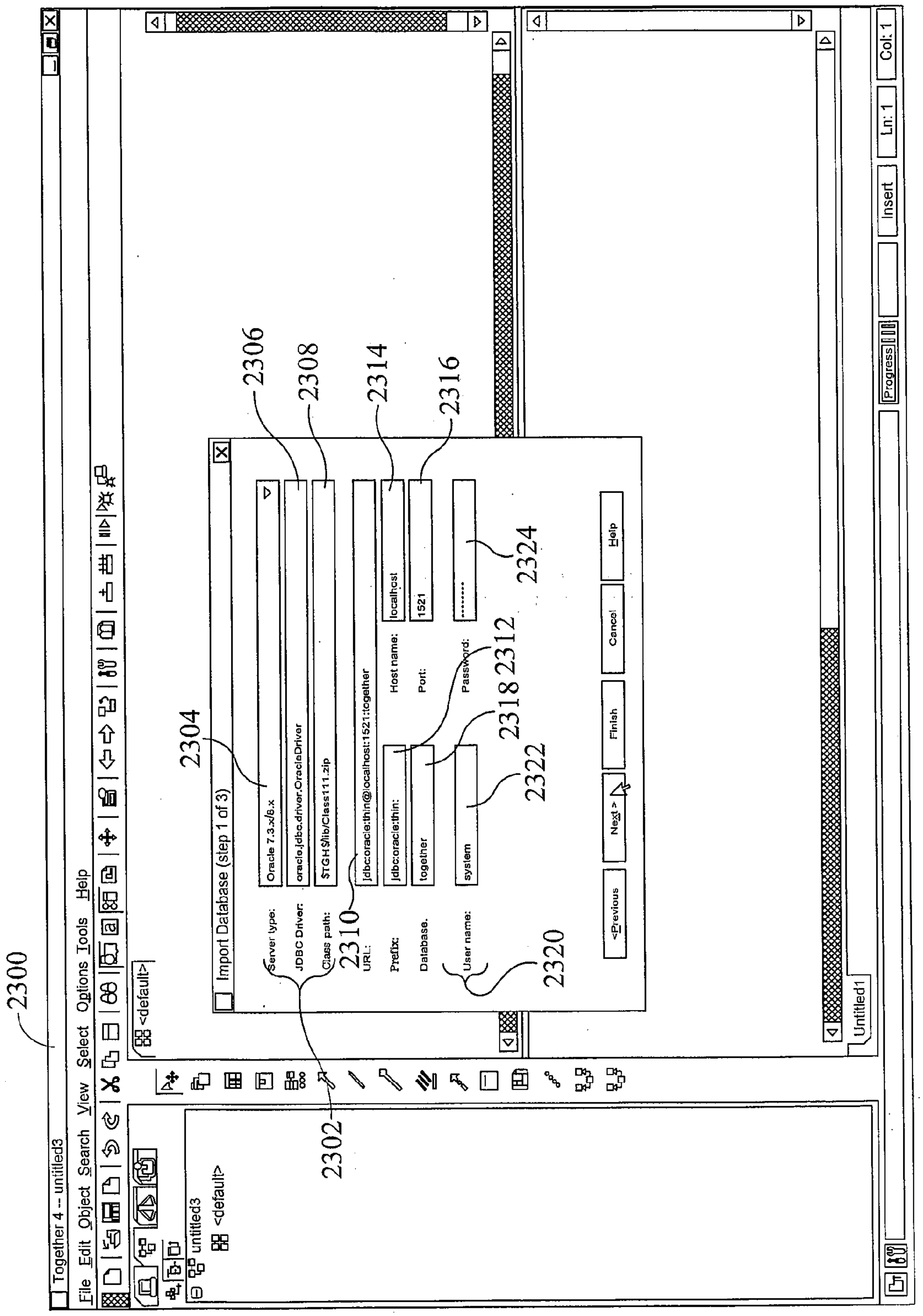
FIG. 23 depicts a user interface displayed by the software development tool for receiving access information for the database.

The software development tool 610 also receives access information for the database (step 2104). FIG. 23 depicts an exemplary user interface displayed by the software development tool for receiving access information 2302 for the database. In this implementation, the access information 2302 includes an identification 2304 of the database management system 2018, a driver 2306 for the software development tool to use to communicate with the database 2016 via the database management system 2018, a location 2308 on the computer 2002 where the driver 2306 is stored, and a network address 2310 or URL for the database 2016 on the database server system 2004. The identified database management system 2304 maybe any known DBMS server type, such as Oracle 7.3x/8x, ODBC/Access 97, Cloudscape, ODBC/MS SQL Server, and IBM DB2 6.1. The driver 2306 may be any known driver or interface program that is suitable for communicating with the identified database management system 2304. In the exemplary implementation shown in FIG. 24, the software development tool 610 displays a default network address 2310 that a developer can change by providing a new address prefix 2312 corresponding to the identified database management system 2306, a new host name 2414 that identifies a system platform where the database management system 2018 and the database 2016 reside (e.g., local host corresponds to the computer 2002), a port 2316 assigned to the identified database management system 2304 for network communication, and a database identification 2318. As known to one skilled in the art, a commercially available DBMS may control a number of different databases. Thus, in this implementation where the identified database management system 2304 is a DBMS, the database identification 2318 names the database to be accessed via the identified database management system 2304.

Returning to FIG. 21A, after receiving access information for the database, the software development tool 610 determines if authorization is required to access the database 2016 (step 2106). The software development tool 610 determines if authorization is required based on the identification of the database management system 2304 or by querying the database management system 2304. If authorization is required, the software development tool receives an access privilege from a user (step 2108). As shown in FIG. 23, the access privilege received by the software development tool may include a user name 2322 and a password 2324, and then determines whether the access privilege 2320 is authorized (step 2110). The software development tool determines if the received access privilege is authorized by performing known authentication methods, such as querying the identified database management system to authenticate access or querying the computer 2004 where the database management system resides to authenticate access based on a respective user access profile (not shown in figures).

If access is authorized or authorization is not required, the software development tool determines whether the database contains any data structure which the programmer may select (step 2112). To determine if the database contains a data structure, the software development tool may query the database for an identification of each data structure within the database 2016. In another implementation, the software development tool may request that the database 2016 provide an identification of at least one data structure within the database. In either implementation, the software development tool may abort processing if the software development tool does not receive an identification of at least one data structure in the database.

Figure 24:
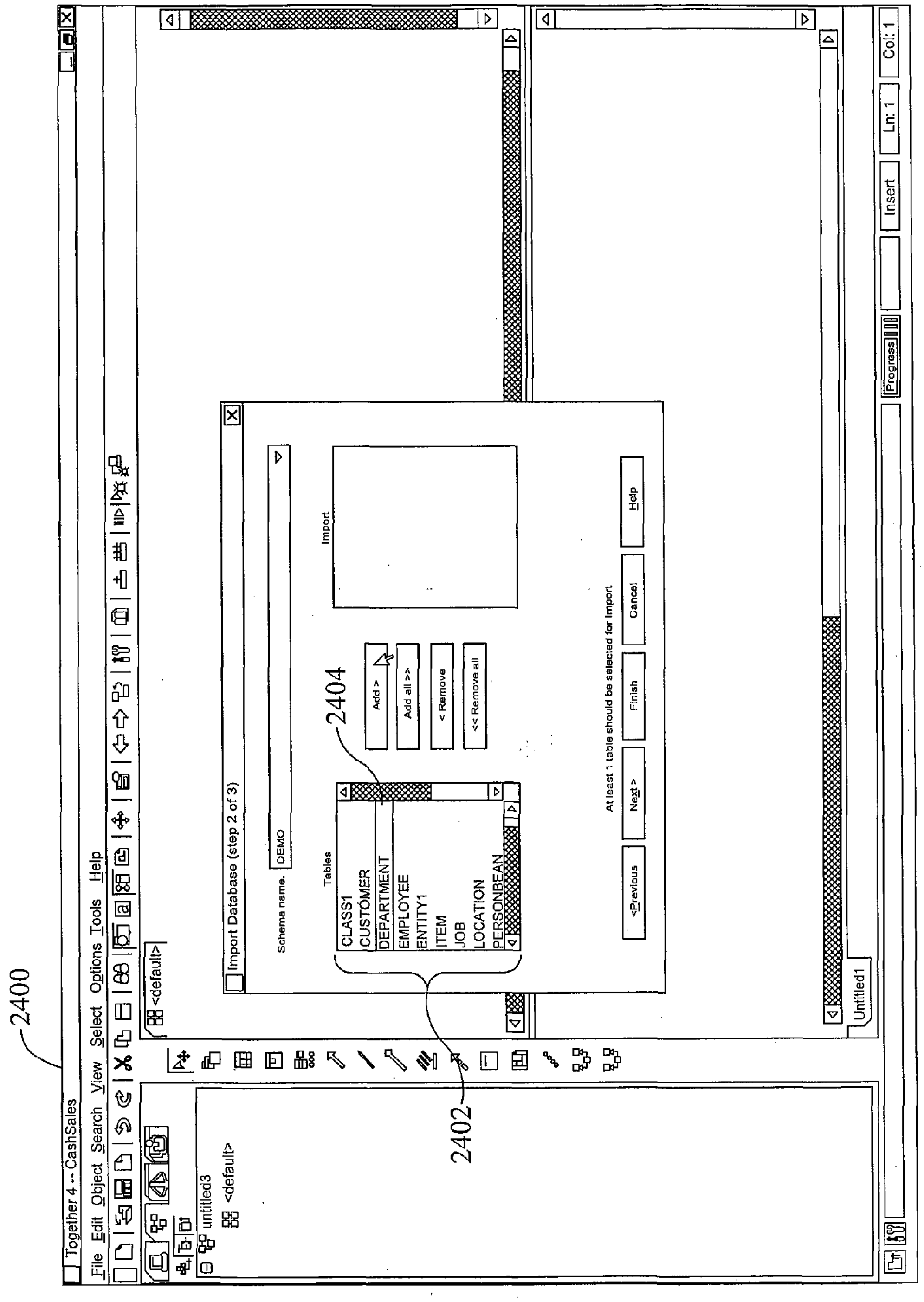
FIG. 24 depicts a user interface displayed by the software development tool, where the user interface displays an identification of each data structure stored in the database.

If the database contains a data structure, the software development tool displays an identification of each data structure in the database (step 2114 in FIG. 21B). For example, in FIG. 24, an exemplary user interface 2400 displayed by the software development tool shows the identification of each data structure 2402 displayed by the software development tool in response to querying the database 2016. Next, the software development tool 610 receives an identification of a selected data structure 2404 (step 2116). As shown in FIG. 24, the software development tool may receive an identification of a selected data structure 2404 via any known programming input technique, such as a mouse click on one of the displayed data structures 2402. In one implementation, the software development tool allows the programmer to select multiple data structures to be accessed by the software development tool in order to form multiple object-oriented elements as discussed below.

Figure 25:
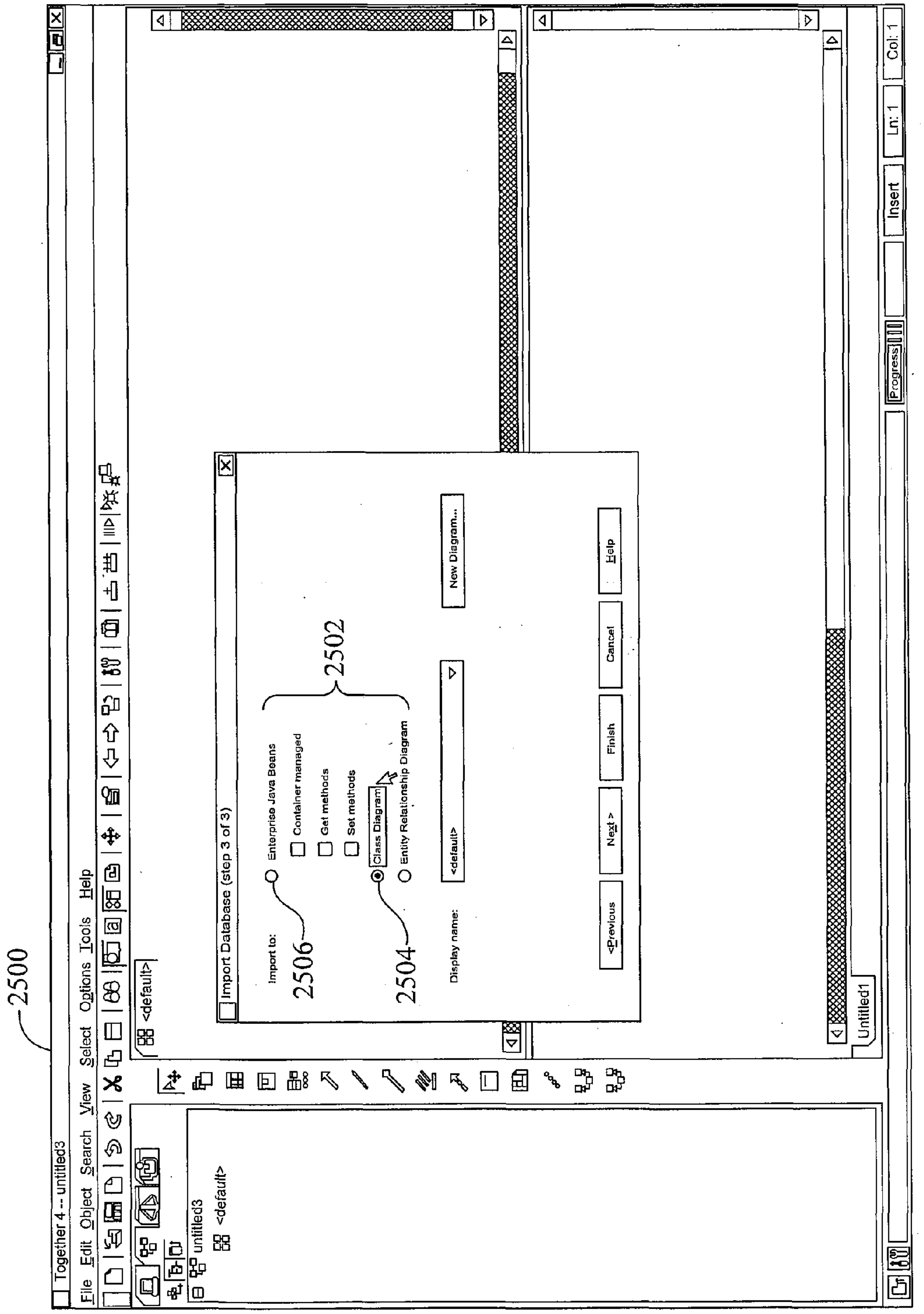
FIG. 25 depicts a user interface displayed by the software development tool, where the user interface displays an indication of a type of object-oriented element to form from the database.

Next, the software development tool receives an indication of a type of object-oriented element to form from the selected data structure (step 2118). As illustrated in FIG. 25, the type of object-oriented element 2502 may be any object-oriented element that has source code with persistent attributes mapped to the data structure in the database, such as a persistent class 2504 or an Enterprise JavaBean™ 2506. As previously discussed, a persistent attribute has a state that is maintained between calls to operations within code corresponding to the respective object-oriented element.

The software development tool accesses a portion of the selected data structure from the database (step 2120). In one implementation, the software development tool 610 accesses a portion of the selected data structure using access information 2302 to query the database in order to receive all the attribute fields in the data structure for forming the object-oriented element. In another implementation, the software development tool may receive the entire data structure. The query is formed by the software development tool to be recognizable to the database management system 2018 that functions as a DBMS in this instance. As known to one skilled in the art, a DBMS retrieves information from a respective database based on a query that corresponds to a known, recognizable command to the DBMS.

Based on the indication of the type of object-oriented element to form, the software development tool determines whether the type of object-oriented element is a class (step 2122). In one implementation shown in FIG. 26, if the type of object-oriented element is a class, the software development tool generates source code for a class 2602 having a name 2604 that corresponds to the selected data structure 2404 (step 2124). As discussed below, if the software development tool is later instructed to update the class 2602, the identification of the data structure to access may be obtained by the software development tool from the name of the class 2602. When forming the class 2602, the software development tool generates new code for the class 2602 that includes an attribute 2606 that is related to an attribute field in the portion of the selected data structure 2404 (step 2126). Thus, the software development tool saves a developer time and effort by providing a class that has attributes that mirror the data structure so that the developer can add new methods or code specifically for referencing the data structure.

Figure 26:
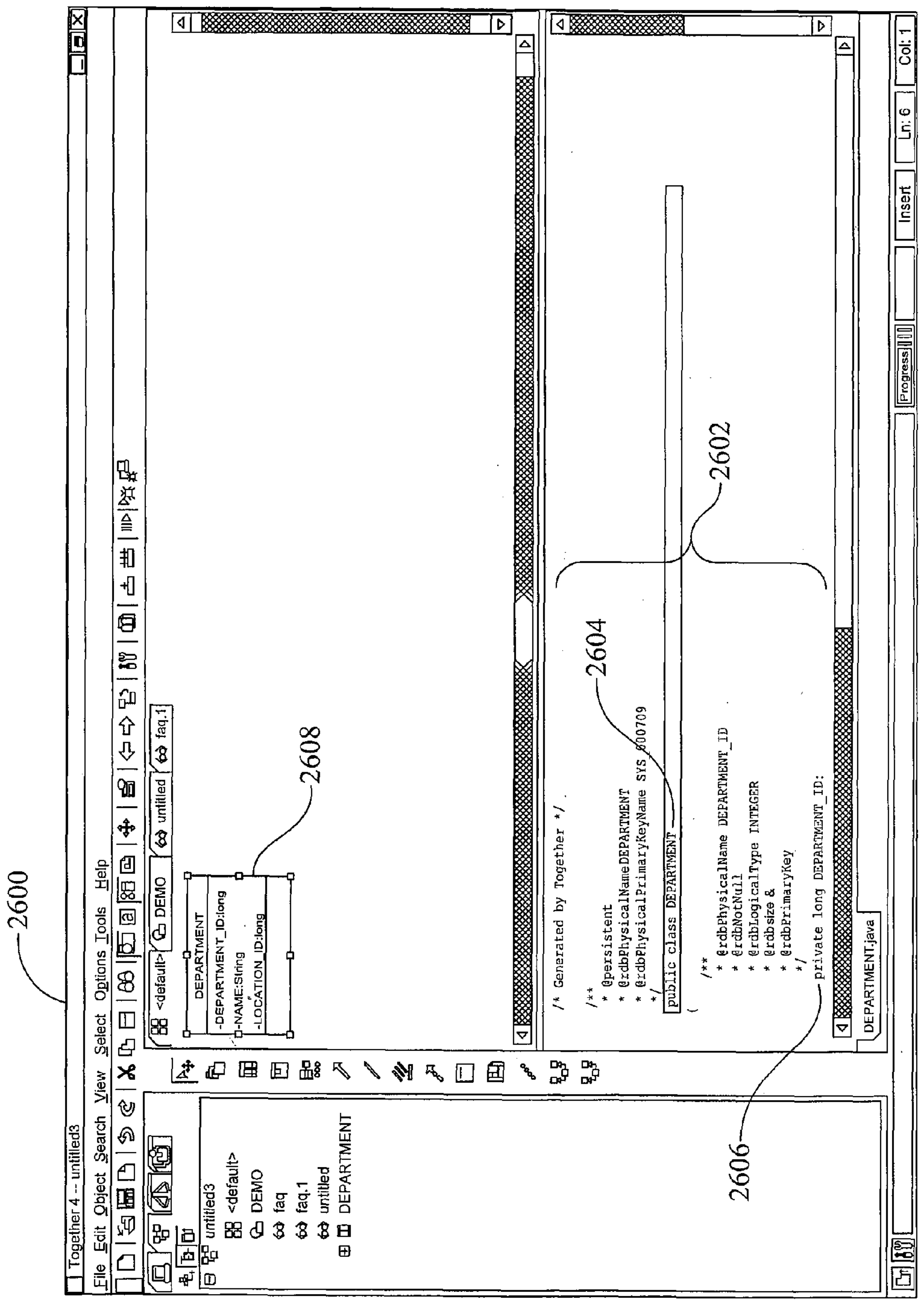
FIG. 26 depicts a user interface displayed by the software development tool, where the user interface displays source code for a class that is generated from a selected data structure in the database.

The software development tool also places the identification of the selected data structure in a comment of the source code for the class (step 2128). Therefore, in the event that the selected data structure 2404 is modified or the class is modified, the software development tool is still able to relate the data structure to the class and update one to the other as explained below. In addition, the software development tool associates the access information with the source code of the class (step 2130). By associating the access information with the source code of the class, the software development tool enables the data structure to be accessed again without prompting a developer for the access information. In one implementation, the software development tool may associate the access information with the source by storing the access information with the identification of the selected data structure in a configuration file. In this implementation, the configuration file may be stored anywhere in the project. In another implementation, the software development tool may associate the access information with the source code by storing the access information with the identification of the data structure as a comment in the source code of the class 2602. In either implementation, the software development tool is able to identify the access information based on the identification of the selected data structure 2404. Having generated the source code of the class to correspond to the selected data structure, the software development tool displays a graphical representation of the source code of the class (step 2132). As shown in FIG. 26, the software development tool graphically represents source code corresponding to the class 2602 in the diagram 2608.

Figure 27:
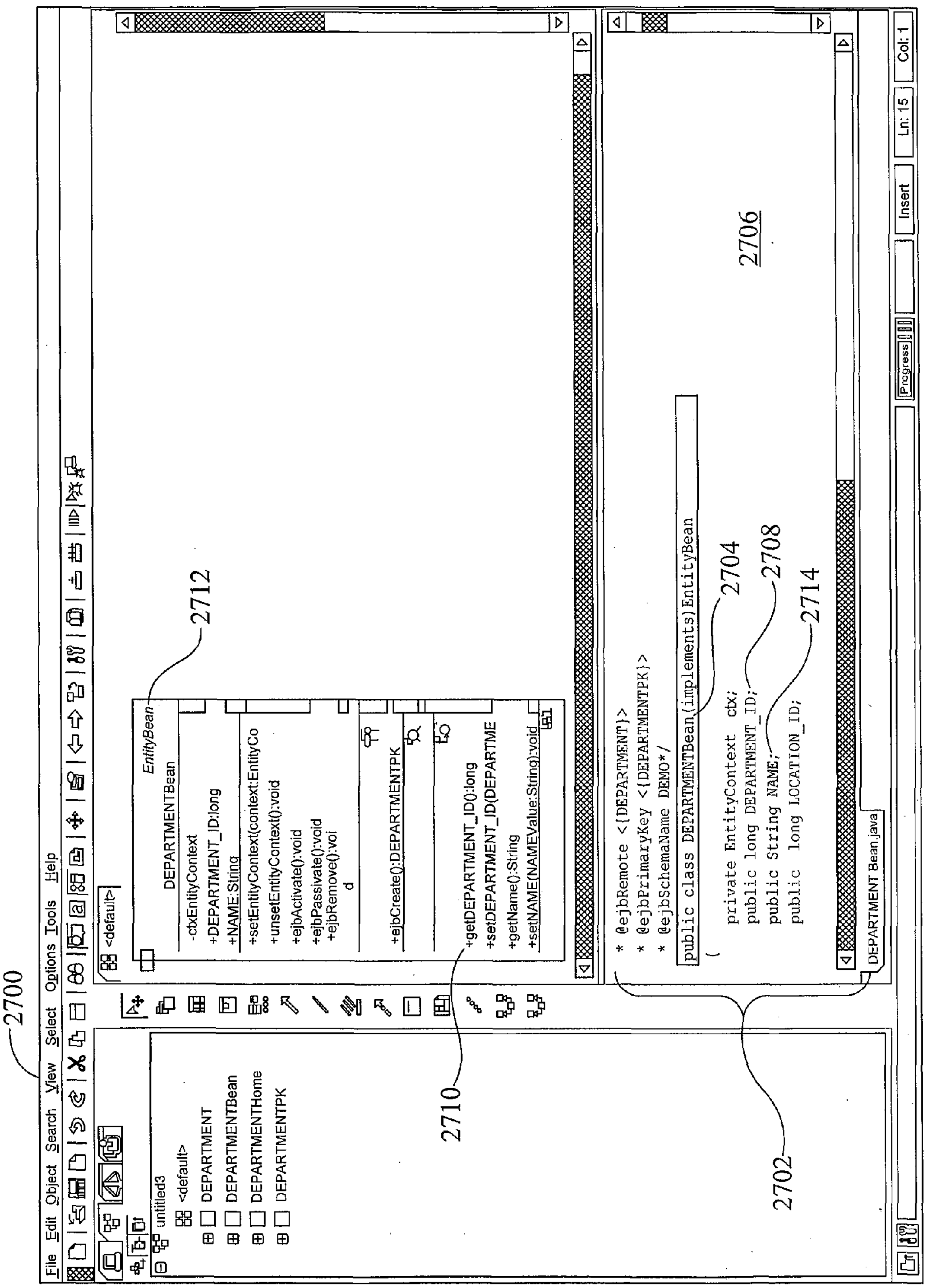
FIG. 27 depicts a user interface displayed by the software development tool depicted, where the user interface displays source code for a Enterprise JavaBean™ that is generated from a selected data structure in the database.

If the type of object-oriented element is not a class, the software development tool determines whether the type of object-oriented element is an EJB (step 2134). If the type of object-oriented element is an EJB, the software development tool generates source code for the EJB that has a name that corresponds to the selected data structure (step 2136). In FIG. 27, the software development tool displays a portion of the source code for the EJB 2702 in the textual pane 2706. The source code for the EJB in its entirety as generated by the software development tool is shown in FIG. 28. As illustrated in FIGS. 27 and 28, the software development tool generates source code 2702 that has a name 2704 "DEPARTMENTBean" which corresponds to the selected data structure 2404, "DEPARTMENT," shown in FIG. 24.

The software development tool also generates new code for the EJB that includes an attribute that is related to an attribute field in the portion of the selected data structure (step 2138). As shown in FIG. 27, the software development tool generates an attribute 2708 in code 2702 corresponding to the displayed EJB 2712 that is related to an attribute field in the portion of the selected data structure 2404. In addition, the software development tool generates other new code for the EJB that includes a method that accesses the related attribute field in the portion of the selected data structure (step 2140). As illustrated in FIG. 27, the software development tool generates other new code for the EJB that includes a method 2710 ("getDepartment_ID( ) long") that accesses the related attribute field in the portion of the selected data structure 2404. Thus, the software development tool again saves a developer time and effort by providing an EJB that has attributes that mirror the attribute fields of the selected data structure and that has methods that access the attributes. The developer can then add other code specifically for referencing the data structure and using business related information contained therein to perform a specific function, such as remotely accessing a car parts inventory and generating an automated order to re-supply a customer when certain parts are found to be low.

The software development tool also adds the identification associated with the selected data structure as a comment in the source code for the EJB (step 2142). The software development tool then associates the access information with the source code of the class (step 2144). In performing these steps, the software development tool enables the data structure to be accessed again without prompting a developer for the selected data structure or access information. The software development tool may associate the access information with the source by storing the access information with the identification of the selected data structure in a configuration file. In another implementation, the software development tool may associate the access information with the source code by storing the access information with the identification of the data structure as a comment 2804 in the source code of the EJB. Having generated the source code of the EJB to correspond to the selected data structure, the software development tool displays a graphical representation of the source code of the EJB (step 2146). As shown in FIG. 27, the software development tool graphically represents source code corresponding to the EJB 2702, 2802 in the diagram 2712.

Figure 29A:
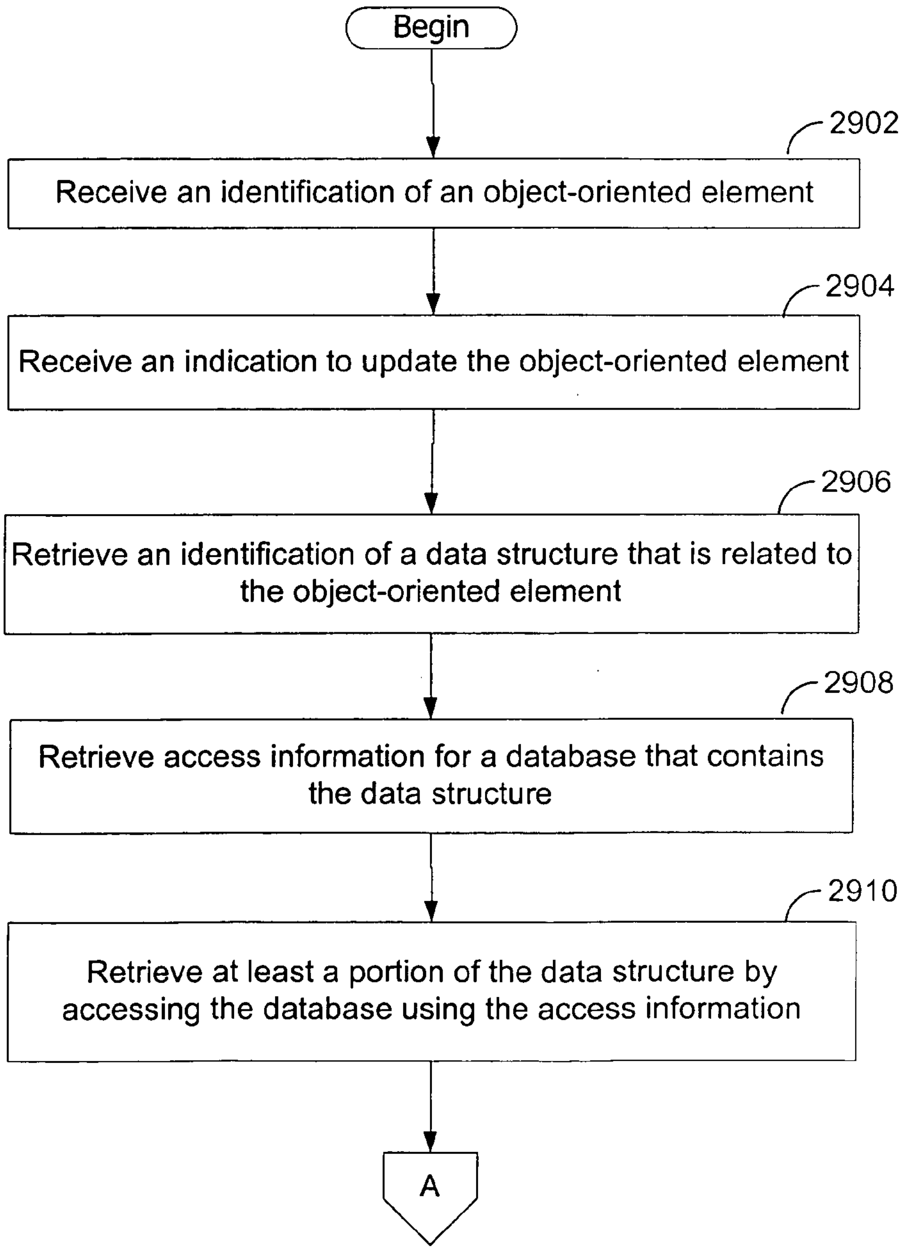
FIGS. 29A-B depict a flow diagram illustrating an exemplary process performed by the software development tool for updating an object-oriented element from a related data structure in a database.
Figure 29B:
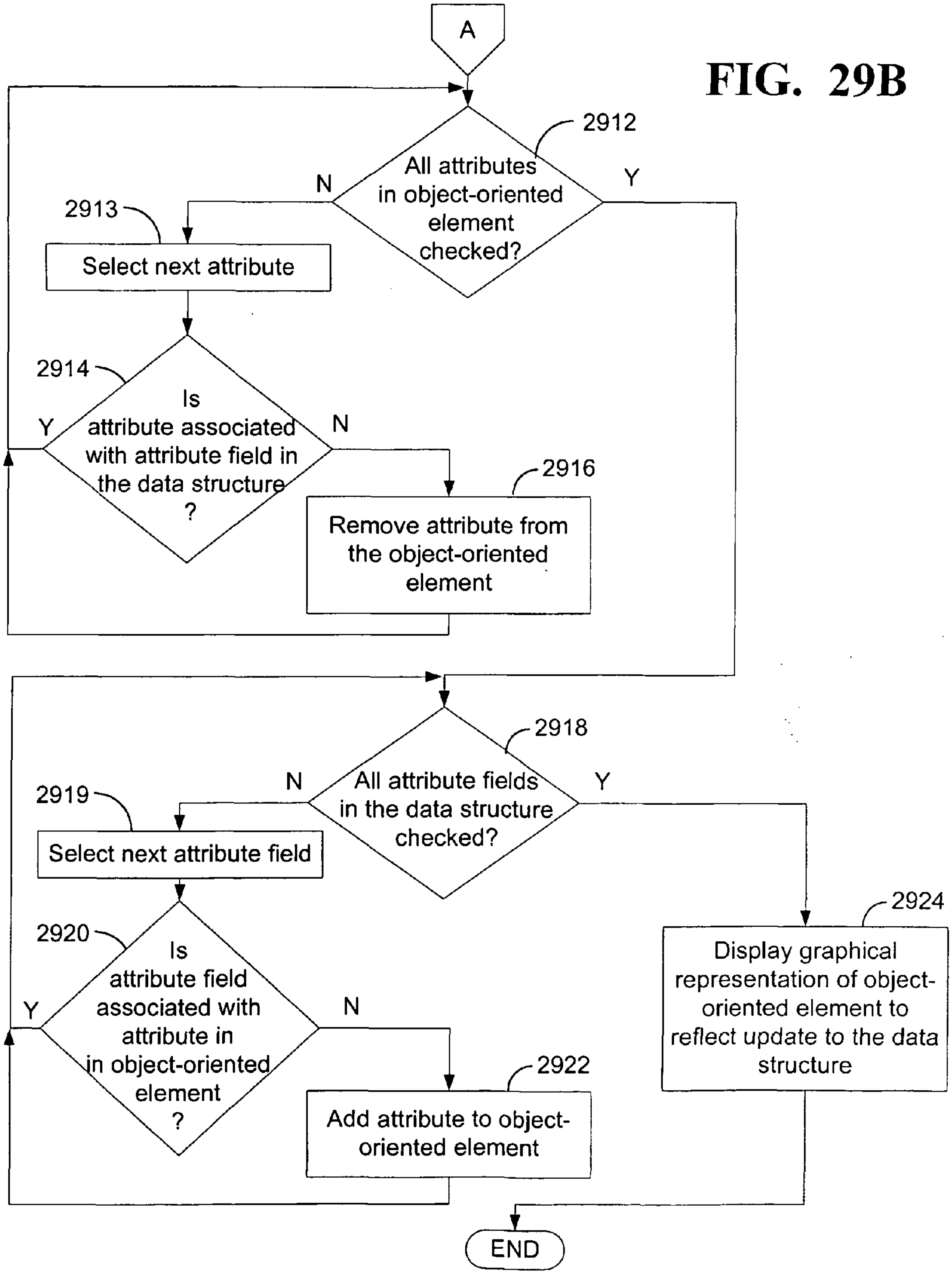
Figure 30:
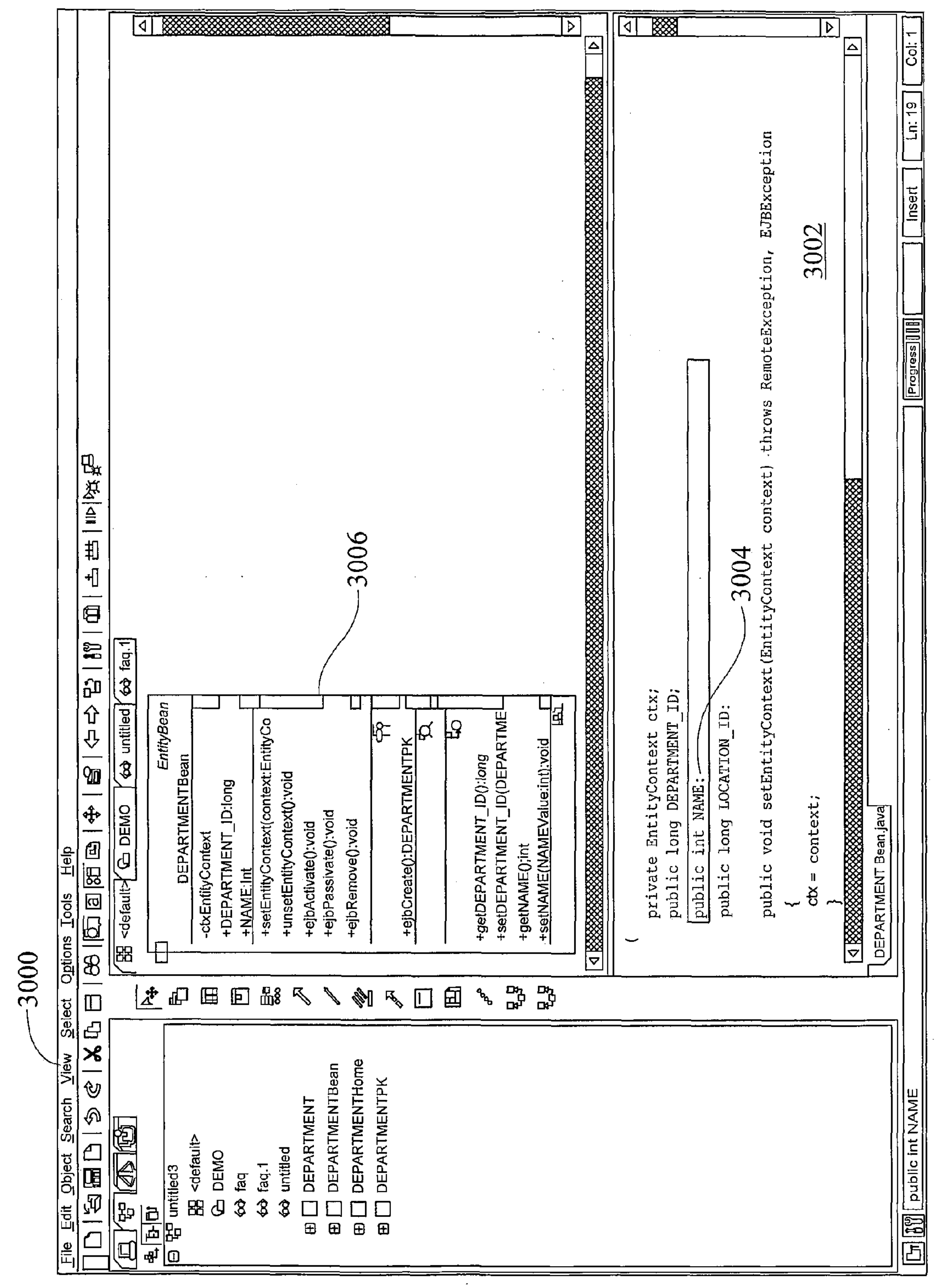
FIG. 30 depicts a user interface displayed by the software development tool, where the user interface displays source code for a distributed computing component that is updated from the related data structure in the database.

Once source code is generated from a data structure, the software development tool is able to update the source code to match the current state of a related data structure without losing any code. In FIGS. 29A-B, a flow diagram is shown that illustrates an exemplary process performed by the software development tool for updating an object-oriented element from a related data structure. The software development tool receives an indication of an object-oriented element (step 2902) and receives an indication to update the object-oriented element (step 2904). Turning to FIG. 30, in one implementation, the indication of the object-oriented element is the last element selected on the textual pane 3002. In another implementation, the object-oriented element may be any object-oriented element in the project that is related to a data structure or that has been previously formed from a data structure.

To update the source code of the object-oriented, the software development tool retrieves the identification of the data structure that is related to the object-oriented element (step 2906). In one implementation, to retrieve the identification of the data structure, the software development tool searches a source code file associated with the object-oriented element for the identification of the data structure. In this implementation, the software development tool is able to check comment fields within the source code of the object-oriented element for a predefined delimiter that identifies the data structure that is related to the object-oriented element. In another implementation, the software development tool may associate the name of the source code or object-oriented element with the identification of the data structure.

Next, the software development tool also retrieves access information for a database that stores the selected data structure (step 2908). In one implementation, the access information is stored in association with the identification of the data structure in a configuration file for the project. In another implementation, the access information is stored in association with the identification of the data structure in the source code of the object-oriented element. In either implementation, the software development tool is able to locate the access information based on the retrieved identification of the data structure.

After retrieving the access information for the database, the software development tool retrieves a portion of the data structure by accessing the database using the retrieved access information (step 2910). The portion retrieved by the software development tool includes each attribute field in the data structure. By retrieving each attribute field in the data structure, the software development tool is able to update the object-oriented element by removing an attribute that has been added to the data structure since the object-oriented element was formed from the data structure. In addition, the software development tool is able to update the object-oriented element by adding an attribute that corresponds to an attribute field added to the data structure since the object-oriented element was formed.

To update the object-oriented element to reflect a deletion to the data structure, the software development tool 610 determines whether each attribute in the object-oriented element has been checked (step 2912). If each attribute in the object-oriented element has not been checked, the software development tool selects the next attribute, starting with the first attribute (step 2913). The software development tool then determines whether the next attribute in the object-oriented element is associated with an attribute field in the data structure (step 2914). If the next attribute in the object-oriented element is not associated with the attribute field from the data structure, the software development tool removes the next attribute from the source code of the object-oriented element (step 2916). In one implementation, the software development tool removes the next attribute and a method that accesses the next attribute.

As part of updating the object-oriented element to reflect an addition to the data structure, the software development tool determines whether each attribute in the data structure has been checked (step 2918). If each attribute in the object-oriented element has not been checked, the software development tool selects the next attribute field, starting with the first attribute field (step 2919). The software development tool then determines whether the next attribute field in the data structure is associated with an attribute in the source code of the object-oriented element (step 2920). If the next attribute field in the data structure is not associated with an attribute in the source code of the object-oriented element, the software development tool adds the attribute to the source code of the object-oriented element (step 2922).

The software development tool then displays a graphical representation of the object-oriented element to reflect the update to the data structure (step 2924). For example, in FIG. 30 a user interface 3000 is displayed by the software development tool in response to the updating of source code 2802 associated with the EJB (graphically depicted as 2712 in FIG. 27) to the data structure "DEPARTMENT." The data structure "DEPARTMENT" had previously been used to form the EJB 2712 as illustrated in FIG. 27. In response to the indication to update the object-oriented element, the software development tool removes the first attribute 2714, "public String NAME" (depicted in FIG. 27), and adds the second attribute 3004, "public int NAME" (depicted in FIG. 30), to the source code of the EJB. Hence, changing the attribute field "NAME" in the data structure causes the development tool to update the source code to reflect the change. The diagram 3006 (i.e., the graphical representation of the source code for the EJB) reflects the deletion of the first attribute 2714 and the addition of the second attribute 3404. Thus, when an attribute field of the data structure is eliminated or added by a developer after the EJB is formed from the data structure, the software development tool is able to quickly update the EJB to the data structure to resynchronize attributes of the data structure to the EJB. One skilled in the art will appreciate that the software development tool may perform the process in FIGS. 29A-B for other object-oriented elements, such as a persistent class.

Figure 31A:
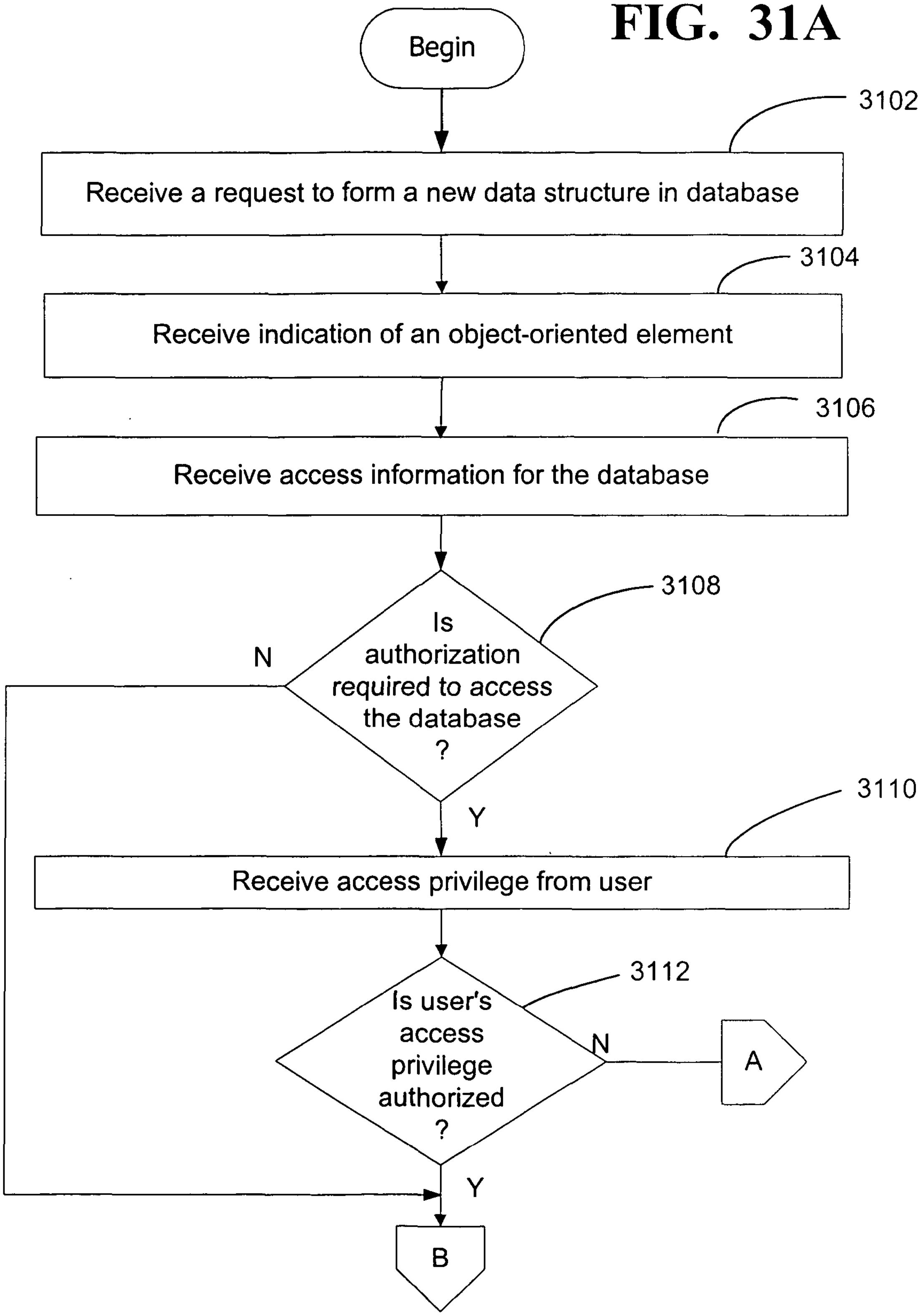
FIGS. 31A-B depict a flow diagram illustrating an exemplary process performed by the software development tool for forming a data structure in a database from source code of an object-oriented element.
Figure 31B:
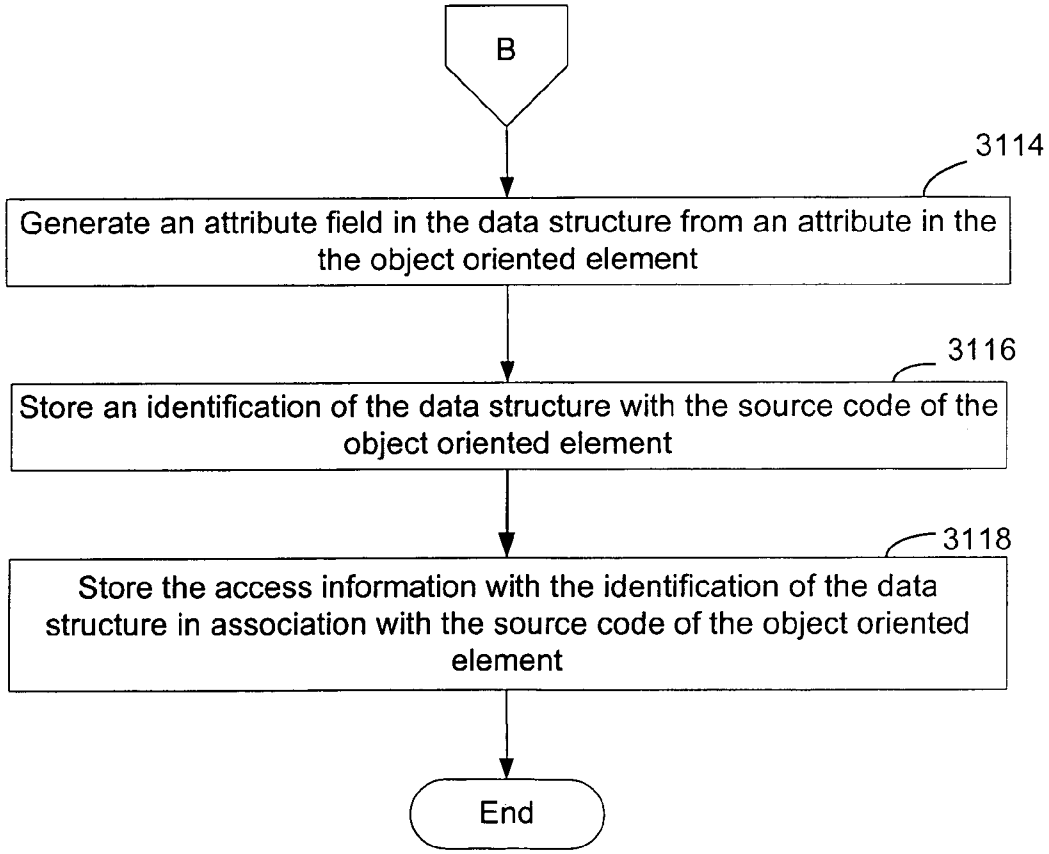
Figure 32:
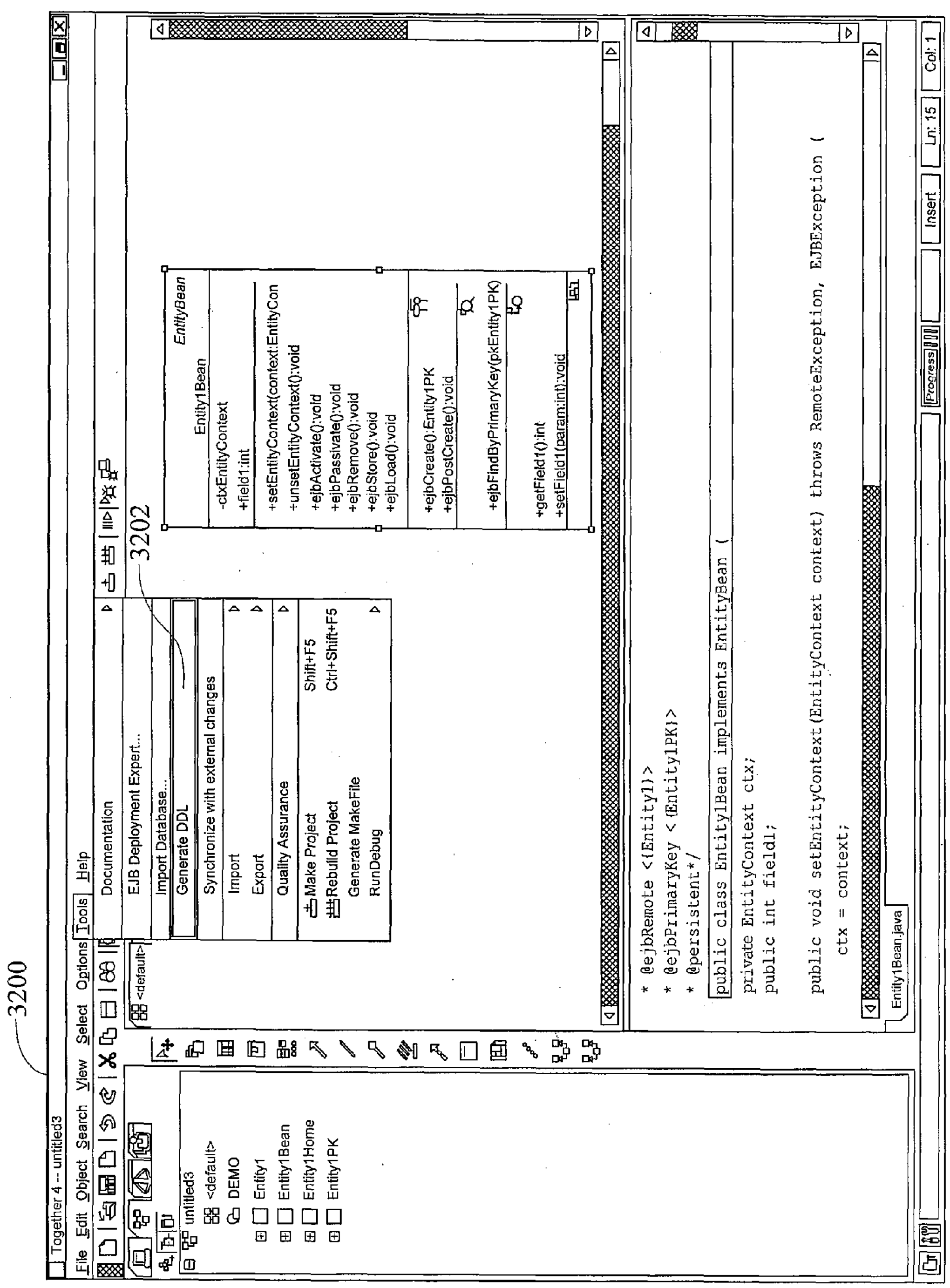
FIG. 32 depicts a user interface displayed by the software development tool for receiving a request to form a data structure in a database.

FIGS. 31A-B depicts a flow diagram illustrating an exemplary process performed by the software development tool for forming a data structure used in distributed computing from source code of an object-oriented element. To form the data structure, the software development tool receives a request to form a new data structure in a database (step 3102). The type of data structure to be formed may correspond to any known data structure used for distributed computing, such as a table in a database. As shown in FIG. 32, the software development tool may receive the request from a programmer via any known programming input technique, such as a keyboard input or a menu selection 3202 on a user interface 3200. In the example illustrated in FIG. 32, when menu selection 3602 is received, the software development tool receives the indication that the type of data structure to form is a Data Description Language (DDL) file. The Data Description Language is a known language recognized by a known DBMS for describing a table in a database. The DDL file may be transmitted by the software development tool to the DBMS 2018 generate a table in the database 2016.

Figure 33:
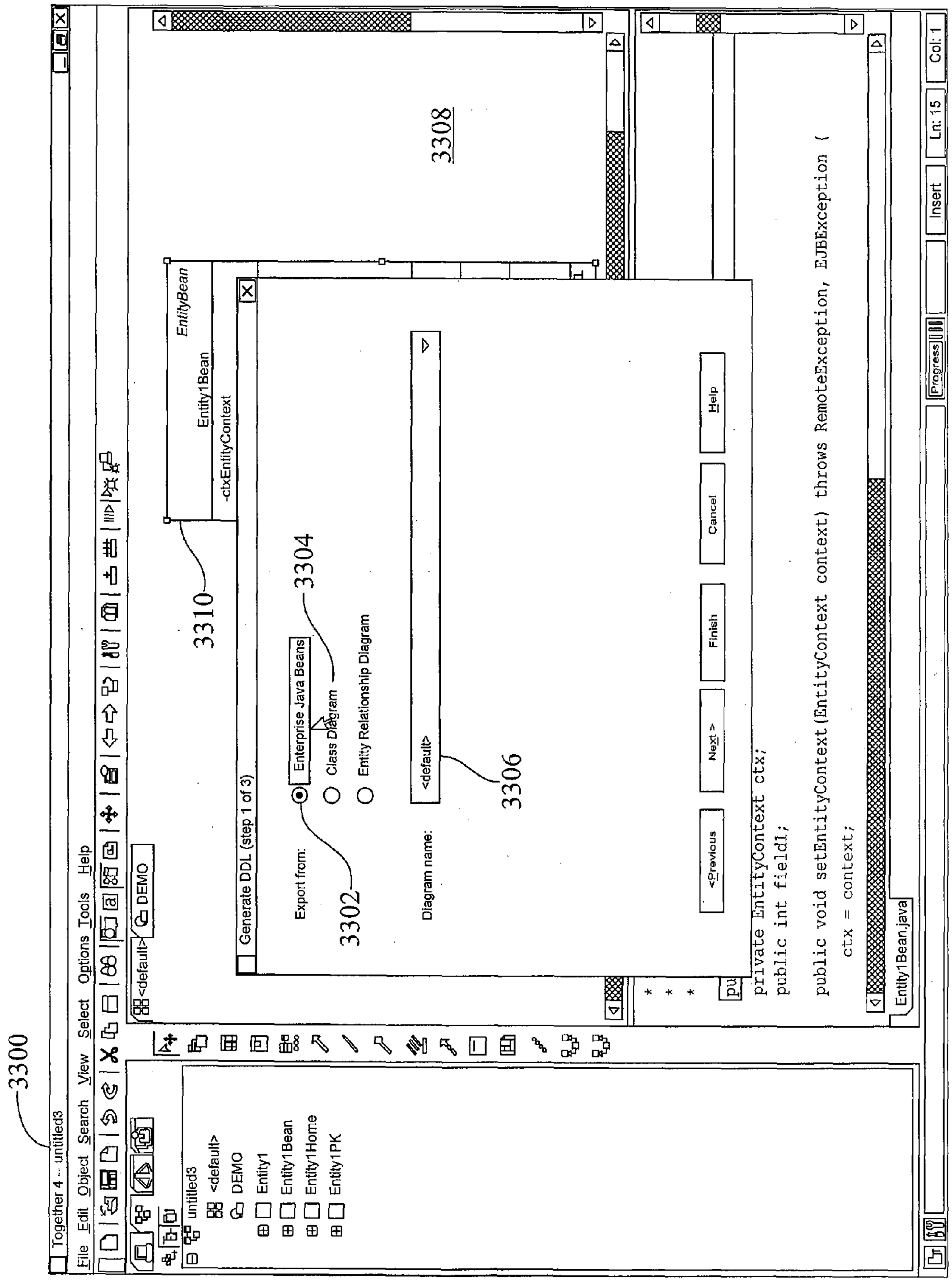
FIG. 33 depicts a user interface displayed by the software development tool for receiving an indication of an object-oriented element to use to form the data structure.

The software development tool also receives an indication of an object-oriented element to use to form the data structure in the database (step 3104). In one implementation shown in FIG. 33, the programmer may indicate to the software development tool that the object-oriented element is an EJB 3302 or a persistent class 3304 that has a name 3306 depicted graphically in a diagram on the graphical pane 3308. In another implementation, the software development tool may receive the indication that the last selected object-oriented element (e.g., the EJB graphically depicted as 3310) on the graphical pane 3308 is to be used to form the data structure in the database.

Figure 34:
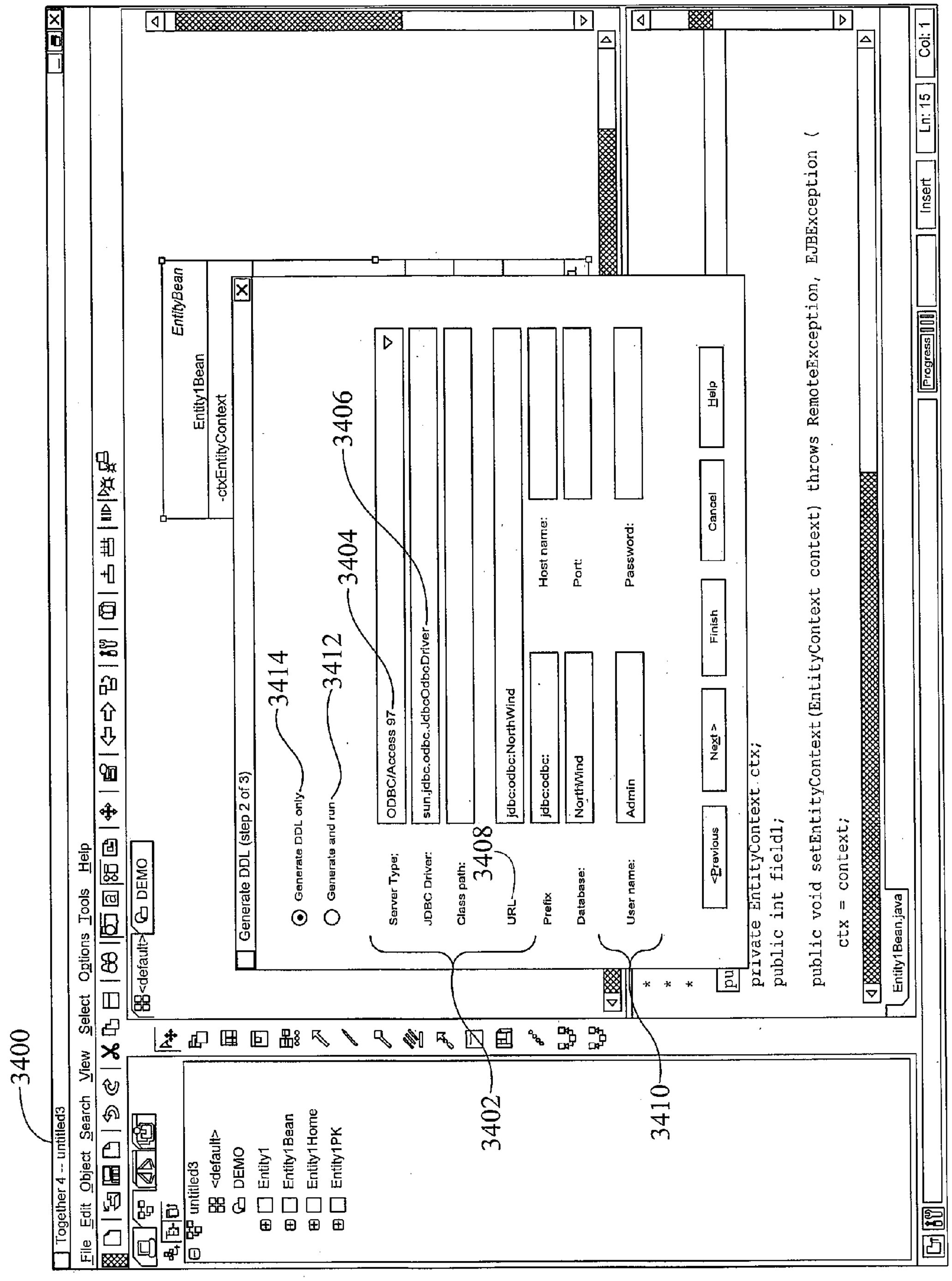
FIG. 34 depicts a user interface displayed by the software development tool for receiving access information for the database and for receiving a request to generate the data structure in the database.

The software development tool also receives access information for the database (step 3106). In one implementation shown in FIG. 34, the software development tool receives access information 3402 for the database, where access information includes an identification 3404 of the database management system 2018, a driver 3406 for the software development tool to use to communicate with the database 2016 via the database management system 2018, and a network address 2308 (i.e., URL) for the database 2016 on the database server system 2004.

Returning to FIG. 31A, after receiving the access information for the database, the software development tool determines if authorization is required to access the database 2016 (step 3108). The software development tool determines if authorization is required based on the identification of the database management system 3404 or by querying the database management system 3404. If authorization is required, the software development tool receives an access privilege 3410 (step 3110), and then determines whether the access privilege 3410 is authorized (step 3112).

Figure 35:
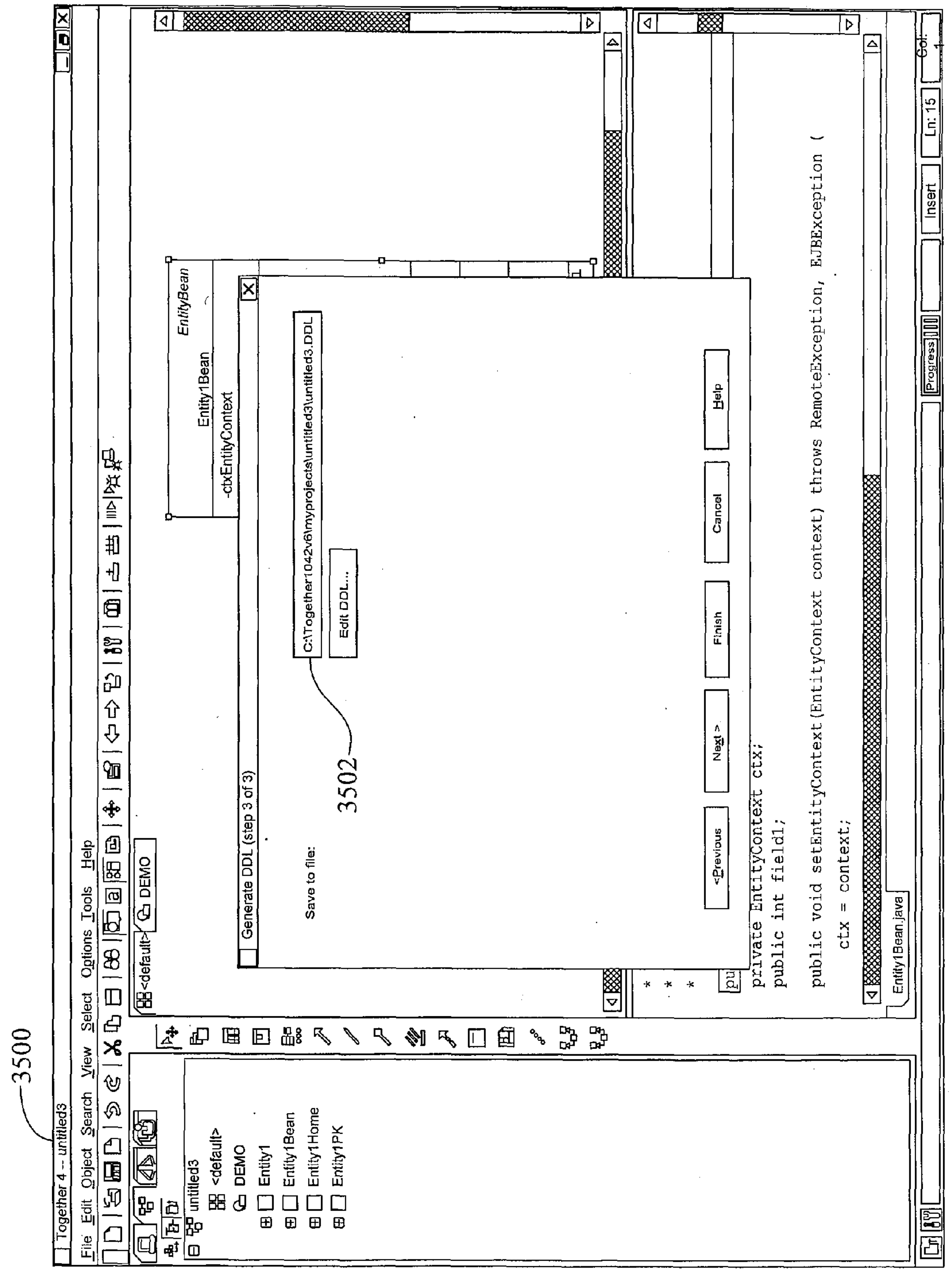
FIG. 35 depicts a user interface displayed by the software development tool depicted, where the user interface displays a location for storing the data structure formed from source code of the object-oriented element.

Once the source code of the object-oriented element is identified, the software development tool generates an attribute field in the data structure from an attribute in the object-oriented element (step 3114 in FIG. 31B). If the object-oriented element is an EJB, the software development tool generates an attribute field from an attribute that is accessed by a method or operation in the source of the object-oriented element. In one implementation, the software development tool receives an indication 3412 to generate the attribute field in the data structure by accessing the database 2016 via the DBMS 2018 and requesting the formation of the data structure with the attribute field. In another implementation shown in FIG. 35, the software development tool receives an indication 3412 to store the data structure in a file 3502, such as a Data Definition Language (DDL) file, so that an administrator with the authority to access and modify the database 2016 is able to form the data structure in the database 2016 at a later time.

The software development tool stores an identification of the data structure with the source code of the object-oriented element (step 3116). By storing the identification of the data structure with the source code of the object-oriented element, the software development tool is able to easily identify the data structure to update the data structure from the source code of the associated object-oriented element. The software development tool also stores the access information with the identification of the data structure in association with the source code of the object-oriented element (step 3118). In one implementation, the identification of the data structure is stored with the access information in a configuration file. In another implementation, the identification of the data structure is stored with the access information as a comment in the source code of the object-oriented element.

Figure 36A:
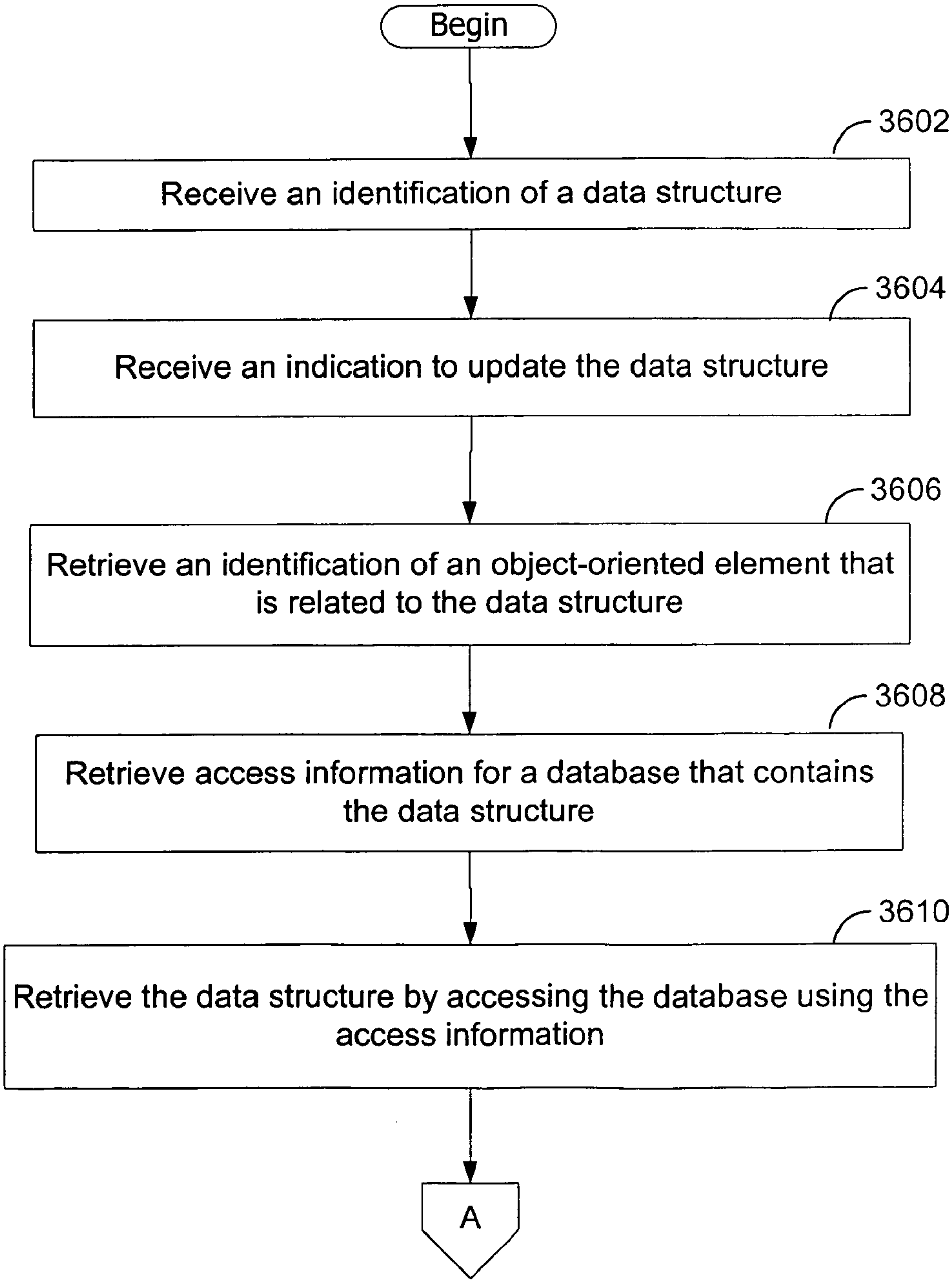
FIGS. 36A-B depict a flow diagram illustrating an exemplary process performed by the software development tool for updating a data structure in a database from a related object-oriented element.
Figure 36B:
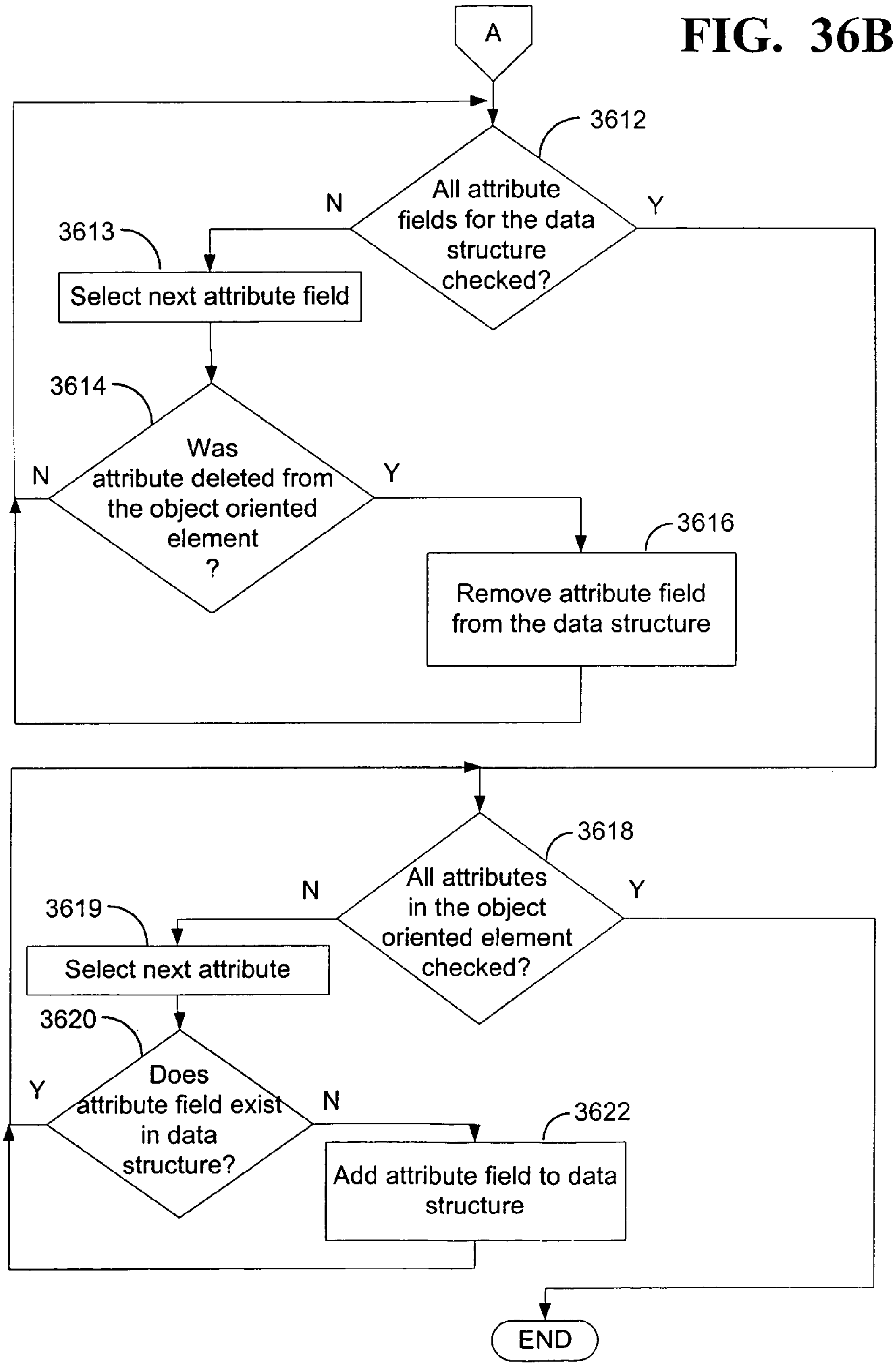

When the data structure is formed from an object-oriented element, the software development tool is able to update the data structure to match the current state of a related object-oriented element without corrupting the remainder of the data structure. In FIGS. 36A-B, a flow diagram is shown that illustrates an exemplary process performed by the software development tool for updating a related data structure from source code of an object-oriented element. The software development tool first receives an indication of a data structure (step 3602). The software development tool also receives an indication to update the data structure (step 3604). The software development tool then retrieves an identification of an object-oriented element that is related to the data structure (step 3606). In one implementation, the software development tool is able to search the source code of each object-oriented element in the project for the identification of the data structure. The identification of the data structure may be stored as the name of the object-oriented element. In another implementation, the identification of the data structure may be stored as a comment in the source code of the object-oriented element.

Next, the software development tool retrieves access information for a database that contains the data structure (step 3608). The software development tool may retrieve the access information from a configuration file where it is stored in association with the identification of the data structure. In another embodiment, the software development tool may retrieve the access information with the identification of the data structure from a comment in the source code of the object-oriented element.

The software development tool retrieves a portion of the data structure by accessing the database using the retrieved access information (step 3610). The portion retrieved by the software development tool includes each attribute field in the data structure. By retrieving each attribute field in the data structure, the software development tool is able to update the data structure by removing an attribute field that has been removed from the source code of the object-oriented element since the data structure was formed. In addition, the software development tool is able to update the data structure by adding an attribute that corresponds to an attribute field added to the data structure since the object-oriented element was formed.

To update the data structure to reflect a deletion to the object-oriented element, the software development tool determines whether each attribute field in the data structure has been checked (step 3612 in FIG. 36B). If each attribute field in the data structure element has not been checked, the software development tool selects the next attribute field, starting with the first attribute field (step 3613). The software development tool then determines whether the next attribute field in the data structure is associated with an attribute in the source code of the object-oriented element (step 3614). If the next attribute field in the data structure is not associated with an attribute in the source code of the object-oriented element, the software development tool removes the next attribute field from the data structure (step 3616).

To update the data structure to reflect an addition to source code of the object-oriented element, the software development tool determines whether each attribute in the object-oriented element has been checked (step 3618). If each attribute in the object-oriented element has not been checked, the software development tool selects the next attribute, starting with the first attribute (step 3619). If each attribute in the object-oriented element has not been checked, the software development tool determines whether an attribute in the object-oriented element is associated with an attribute field in the data structure (step 3820). The software development tool then adds the attribute field to the data structure (step 3622).

While various embodiments of the present invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method in a data processing system including a computer, comprising the steps of:

providing the computer with a software development tool having a user interface that is operable by a user to automatically reflect a modification in source code to avoid completely regenerating the source code, wherein the software development tool includes computer instructions for performing the following steps:

receiving an identification of a data structure with an attribute field in a database of data structures useable to form an object-oriented element from the data structure;

determining via the computer whether the data structure is associated with the source code;

when a determination is made that the data structure is associated with the source code, storing the identification of the data structure in a comment of the source code to relate the data structure with the source code and another determination is made via the computer as to whether the attribute field of the data structure is associated with an attribute in the source code;

when an alternative determination is made that the attribute field is not associated with an attribute in the source code, generating via the computer a source code modification, wherein the source code modification includes a new attribute in the source code based upon the attribute field;

receiving user input to modify the source code;

converting the source code modification to a transient meta model after receiving user input, wherein the transient meta model includes a language-neutral representation of the source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

2. The method of claim 1, further comprising having the computer perform the following steps:

when it is determined that the data structure is not associated with source code, retrieving a portion of the data structure; and generating the source code from the portion of the data structure.

3. The method of claim 1, further comprising having the computer perform the following steps:

when it is determined that the data structure is associated with source code, determining whether a second attribute in the source code is associated with a second attribute field in the data structure; and when it is determined that a second attribute in the source code is not associated with a second attribute field in the data structure, removing the second attribute from the source code.

4. The method of claim 3, wherein the step of removing the second attribute from the source code comprises the step of removing via the computer a method associated with the second attribute from the source code.

5. The method of claim 4, further comprising the step of modifying via the computer the graphical representation of the source code to reflect the removal of the second attribute.

6. The method of claim 1, wherein the step of determining whether the data structure is associated with the source code comprises the step of searching via the computer a comment in the source code for the identification of the data structure.

7. The method of claim 1, wherein the step of determining whether the data structure is associated with the source code comprises the step of comparing via the computer a name for the source code with the identification of the data structure.

8. The method of claim 1, further comprising having the computer perform the following steps:

retrieving access information for the database; and retrieving a portion of the data structure from the database using the access information.

9. The method of claim 8, wherein the step of retrieving the access information comprises the step of retrieving via the computer the identification of the data structure and the access information from a configuration file.

10. The method of claim 8, wherein the step of retrieving the access information comprises the step of retrieving via the computer the identification of the data structure and the access information from a comment of the source code.

11. The method of claim 8, wherein the portion of the data structure comprises the attribute field of the data structure.

12. The method of claim 1, wherein the source code comprises a class.

13. The method of claim 1, wherein the source code comprises a distributed computing component.

14. The method of claim 13, wherein the distributed computing component is an Enterprise JavaBean.

15. The method of claim 1, wherein the step of generating the new attribute in the source code comprises the step of generating via the computer a method in the source code to access the attribute field of the data structure.

16. A method in a data processing system including a computer having source code that corresponds to a data structure within a database of data structures useable to form an object-oriented element from the data structure on a secondary storage device, the method comprising the steps of:

providing a software development tool having a user interface that is operable by a user to automatically reflect a modification in the source code to avoid completely regenerating the source code, wherein the software development tool includes computer instructions for performing the following steps:

receiving an indication to update the source code;

determining via the computer whether the data structure is associated with the source code;

when a determination is made that the data structure is associated with the source code, storing the identification of the data structure in a comment of the source code to relate the data structure with the source code and another determination is made via the computer as to whether a first attribute in the source code is associated with a first attribute field in the data structure;

when it is determined that a first attribute in the source code is not associated with a first attribute field in the data structure, generating via the computer a source code modification, wherein the source code modification includes removing the first attribute from the source code;

determining via the computer whether a second attribute field in the data structure is associated with a second attribute in the source code;

when it is determined that the second attribute field is not associated with the second attribute in the source code, generating via the computer another source code modification, wherein the another source code modification includes generating the second attribute in the source code based upon the second attribute field and associating the second attribute with the second attribute field;

receiving user input to modify the source code;

converting the source code modification to a transient meta model after receiving user input, wherein the transient meta model includes a language-neutral representation of the source code modification and the another source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

17. The method of claim 16, further comprising the step of retrieving via the computer an identification of the data structure and access information for the secondary storage from a comment in the source code.

18. The method of claim 17, further comprising the step of retrieving via the computer a portion of the data structure from the secondary storage device using the access information.

19. The method of claim 18, wherein the portion comprises the first and the second attribute fields.

20. The method of claim 16, wherein the step of removing the first attribute from the source code comprises the step of removing via the computer a method associated with the first attribute from the source code.

21. The method of claim 16, wherein the step of generating the second attribute in the source code comprises the step of generating via the computer a method in the source code to access the second attribute field of the data structure.

22. A method in a data processing system including a computer having a memory device with source code and a secondary storage device with a data structure within a database of data structures useable to form an object-oriented element from the data structure corresponding to the source code, the method comprising the steps of:

providing a software development tool having a user interface that is operable by a user to automatically reflect a modification in the source code to avoid completely regenerating the source code, wherein the software development tool includes computer instructions for performing the following steps:

receiving an indication that the data structure has been modified; and automatically reflecting the modification in the source code via the computer so as to avoid completely regenerating the source code;

receiving user input to modify the source code;

converting the source code modification to a transient meta model after receiving user input, wherein the transient meta model includes a language-neutral representation of the source code modification and the another source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

23. The method of claim 22, wherein the step of automatically reflecting the modification comprises having the computer perform the following steps:

determining whether a first attribute in the source code is associated with a first attribute field in the data structure; and when it is determined that a first attribute in the source code is not associated with a first attribute field in the data structure, removing the first attribute from the source code.

24. The method of claim 23, wherein the step of removing the first attribute from the source code comprises the step of removing via the computer a first method associated with the first attribute in the source code.

25. The method of claim 23, wherein the step of automatically reflecting the modification further comprises having the computer perform the following steps:

determining whether a second attribute field in the data structure is associated with a second attribute in the source code; and when it is determined that a second attribute field in the data structure is not associated with a second attribute in the source code, generating the second attribute in the source code from the second attribute field and associating the second attribute with the second attribute field.

26. The method of claim 25, wherein the step of generating the second attribute in the source code comprises the step of generating via the computer a second method in the source code to access the second attribute field of the data structure.

27. The method of claim 22, wherein the source code comprises a class.

28. The method of claim 22, wherein the source code comprises a distributed computing component.

29. The method of claim 28, wherein the distributed computing component is an Enterprise JavaBean.

30. A method in a data processing system including a computer having a memory device with source code, the method comprising the steps of:

providing a software development tool having a user interface that is operable by a user to automatically reflect a modification in the source code to avoid completely regenerating the source code, wherein the software development tool includes computer instructions for performing the following steps:

determining via the computer whether the source code is associated with a data structure within a database of data structures useable to form an object-oriented element from the data structure;

when it is determined that the source code is associated with the data structure, storing the identification of the data structure in a comment of the source code to relate the data structure with the source code and determining via the computer whether a first attribute in the source code is associated with a first attribute field of the data structure;

when it is determined that the first attribute in the source code is not associated with the first attribute field in the data structure, generating via the computer the first attribute field in the data structure;

determining via the computer whether a second attribute field in the data structure is associated with a second attribute in the source code;

when it is determined that the second attribute field is not associated with the second attribute in the source code, removing via the computer the second attribute field from the data structure;

receiving user input to modify the source code;

converting the source code modification to a transient meta model after receiving user input, wherein the transient meta model includes a language-neutral representation of the source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

31. The method of claim 30, further comprising the step of when it is determined that the source code is not associated with the data structure, generating via the computer the data structure from the source code.

32. The method of claim 30, wherein the step of determining whether the source code is associated with the data structure comprises the step of searching via the computer a comment in the source code for an identification of the data structure.

33. The method of claim 30, wherein the step of determining whether the source code is associated with the data structure comprises the step of comparing via the computer a name for the source code with an identification of the data structure.

34. The method of claim 30, further comprising having the computer perform the following steps:

retrieving access information for a database that stores the data structure; and retrieving a portion of the data structure from the database using the access information.

35. The method of claim 34, wherein the step of retrieving the access information comprises the step of retrieving via the computer an identification of the data structure and the access information from a configuration file.

36. The method of claim 34, wherein the step of retrieving the access information comprises the step of retrieving via the computer an identification of the data structure and the access information from a comment of the source code.

37. The method of claim 34, wherein the portion of the data structure comprises the first attribute field in the data structure.

38. The method of claim 30, wherein the source code comprises a class.

39. The method of claim 30, wherein the source code comprises a distributed computing component.

40. The method of claim 30, wherein the first attribute field in the data structure is related to a method in the source code.

41. A method in a data processing system having a memory device with source code, the method comprising the steps of:

providing a software development tool having a user interface that is operable by a user to automatically modify source code, wherein the software development tool includes computer instructions for performing the following steps:

receiving an indication to update a data structure within a database of data structures useable to form an object-oriented element from the data structure related to the source code;

determining via the computer whether the data structure is associated with the source code;

when a determination is made that the data structure is associated with the source code, storing the identification of the data structure in a comment of the source code to relate the data structure with the source code and another determination is made via the computer whether a first attribute field of the data structure is associated with a first attribute in the source code;

when it is determined that the first attribute field of the data structure is not associated with the first attribute of the source code, generating via the computer a source code modification, wherein the source code modification includes removing the first attribute field from the data structure;

determining via the computer whether a second attribute in the source code is associated with a second attribute field in the data structure;

when it is determined that the second attribute is not associated with the second attribute field in the data structure, generating via the computer another source code modification, wherein the another source code modification includes adding the second attribute field to the data structure;

receiving user input to modify at least a portion of the source code;

converting the source code modification to a transient meta model after receiving user input, wherein the transient meta model includes a language-neutral representation of the source code modification and the another source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

42. The method of claim 41, further having the computer perform the following steps:

retrieving access information for a database that stores the data structure; and retrieving a portion of the data structure from the database using the access information.

43. The method of claim 42, wherein the step of retrieving the access information comprises the step of retrieving via the computer an identification of the data structure and the access information from a configuration file.

44. The method of claim 42, wherein the step of retrieving the access information comprises the step of retrieving via the computer an identification of the data structure and the access information from a comment of the source code.

45. The method of claim 42, wherein the portion of the data structure comprises the first attribute field in the data structure.

46. The method of claim 41, wherein the source code comprises a class.

47. The method of claim 41, wherein the source code comprises a distributed computing component.

48. A method in a data processing system having a memory device with source code and a secondary storage device with a data structure within a database of data structures useable to form an object-oriented element from the data structure corresponding to the source doe, the method comprising the steps of:

providing a software development tool having a user interface that is operable by a user to automatically reflect a modification in the source code to avoid completely regenerating the source code, wherein the software development tool includes computer instructions for performing the following steps:

receiving an indication that the source code has been modified; and automatically reflecting via the computer the modification in the data structure so as to avoid completely regenerating the data structure;

receive user input to modify the source code;

converting the source code modification to a transient meta model after receiving user input, wherein the transient meta model includes a language-neutral representation of the source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

49. The method of claim 48, wherein the step of automatically reflecting the modification comprises having the computer perform the following steps:

determining whether a first attribute in the source code is associated with a first attribute field of the data structure; and when it is determined that a first attribute is not associated with a first attribute field in the data structure, generating the first attribute field in the data structure.

50. The method of claim 48, further comprising having the computer perform the following steps: determining whether a second attribute field in the data structure is associated with a second attribute in the source code; and when it is determined that a second attribute field is not associated with a second attribute in the source code, removing the second attribute field from the data structure.

51. The method of claim 48, further having the computer perform the following steps:

retrieving access information for a database that stores the data structure; and retrieving a portion of the data structure from the database using the access information.

52. The method of claim 51, wherein the step of retrieving the access information comprises the step of retrieving via the computer an identification of the data structure and the access information from a configuration file.

53. The method of claim 51, wherein the step of retrieving the access information comprises the step of retrieving via the computer an identification of the data structure and the access information from a comment of the source code.

54. The method of claim 51, wherein the portion of the data structure comprises the first attribute field in the data structure.

55. The method of claim 48, wherein the source code comprises a class.

56. The method of claim 48, wherein the source code comprises a distributed computing component.

57. The method of claim 48, wherein the first attribute field in the data structure is related to a method in the source code.

58. A computer-readable medium containing instructions for controlling a data processing system to perform a method, the method comprising the steps of:

providing a software development tool having a user interface that is operable by a user to automatically reflect a modification in the source code to avoid completely regenerating the source code, wherein the software development tool includes computer instructions for performing the following steps:

receiving an identification of a data structure with an attribute field in a database of data structures useable to form and object-oriented element from the data structure; determining via the computer whether the data structure is associated with source code;

when it is determined that the data structure is associated with the source code, storing the identification of the data structure in a comment of the source code to relate the data structure with the source code and determining via the computer whether the attribute field of the data structure is associated with an attribute in the source code;

when it is determined that the attribute field is not associated with an attribute in the source code, generating via the computer a source code modification, wherein the source code modification includes a new attribute in the source code based upon the attribute field;

receiving user input to modify the source code;

converting the source code modification to a transient meta model after receiving user input, wherein the transient meta model includes a language-neutral representation of the source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

59. The computer-readable medium of claim 58, wherein the method further comprises having the computer perform the following steps:

when it is determined that the data structure is not associated with source code, retrieving a portion of the data structure; and generating the source code from the portion of the data structure.

60. The computer-readable medium of claim 58, wherein the method further comprises having the computer perform the following steps:

when it is determined that the data structure is associated with source code, determining whether a second attribute in the source code is associated with a second attribute field in the data structure; and when it is determined that a second attribute in the source code is not associated with a second attribute field in the data structure, removing the second attribute from the source code.

61. The computer-readable medium of claim 60, wherein the step of removing the second attribute from the source code comprises the step of removing via the computer a method associated with the second attribute from the source code.

62. The computer-readable medium of claim 61, wherein the method further comprises the step of modifying via the computer the graphical representation of the source code to reflect the removal of the second attribute.

63. The computer-readable medium of claim 58, wherein the step of determining whether the data structure is associated with the source code comprises the step of searching via the computer a comment in the source code for the identification of the data structure.

64. The computer-readable medium of claim 58, wherein the step of determining whether the data structure is associated with the source code comprises the step of comparing via the computer a name for the source code with the identification of the data structure.

65. The computer-readable medium of claim 58, wherein the method further comprises having the computer perform the following steps: retrieving access information for the database; and retrieving a portion of the data structure from the database using the access information.

66. The computer-readable medium of claim 65, wherein the step of retrieving the access information comprises the step of retrieving via the computer the identification of the data structure and the access information from a configuration file.

67. The computer-readable medium of claim 65, wherein the step of retrieving the access information comprises the step of retrieving via the computer the identification of the data structure and the access information from a comment of the source code.

68. The computer-readable medium of claim 65, wherein the portion of the data structure comprises the attribute field of the data structure.

69. The computer-readable medium of claim 58, wherein the source code comprises a class.

70. The computer-readable medium of claim 58, wherein the source code comprises a distributed computing component.

71. The computer-readable medium of claim 70, wherein the distributed computing component is an Enterprise JavaBean.

72. The computer-readable medium of claim 58, wherein the step of generating the new attribute in the source code comprises the step of generating via the computer a method in the source code to access the attribute field of the data structure.

73. A computer-readable medium containing instructions for controlling a data processing system to perform a method, the data processing system having source code that corresponds to a data structure within a database of data structures useable to form an object-oriented element from the data structure on a secondary storage device, the method comprising the steps of: providing a software development tool having a user interface that is operable by a user to automatically reflect a modification in the source code to avoid completely regenerating the source code, wherein the software development tool is for performing the following steps:

receiving an indication to update the source code;

determining via the computer whether the data structure is associated with the source code;

when a determination is made that the data structure is associated with the source code, storing the identification of the data structure in a comment of the source code to relate the data structure with the source code and another determination is made via the computer as to whether a first attribute in the source code is associated with a first attribute field in the data structure;

when it is determined that a first attribute in the source code is not associated with a first attribute field in the data structure, generating via the computer a source code modification, wherein the source code modification includes removing via the computer the first attribute from the source code;

determining via the computer whether a second attribute field in the data structure is associated with a second attribute in the source code;

when it is determined that the second attribute field is not associated with the second attribute in the source code, generating via the computer another source code modification, wherein the another source code modification includes generating the second attribute in the source code based upon the second attribute field and associating the second attribute with the second attribute field;

receiving user input to modify the source code;

converting the source code modification to a transient meta model after receiving user input, wherein the transient meta model includes a language-neutral representation of the source code modification and the another source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

74. The computer-readable medium of claim 73, wherein the method further comprises the step of retrieving via the computer an identification of the data structure and access information for the secondary storage from a comment in the source code.

75. The computer-readable medium of claim 74, wherein the method further comprises the step of retrieving via the computer a portion of the data structure from the secondary storage device using the access information.

76. The computer-readable medium of claim 75, wherein the portion comprises the first and the second attribute fields.

77. The computer-readable medium of claim 73, wherein the step of removing the first attribute from the source code comprises the step of removing via the computer a method associated with the first attribute from the source code.

78. The computer-readable medium of claim 73, wherein the step of generating the second attribute in the source code comprises the step of generating via the computer a method in the source code to access the second attribute field of the data structure.

79. A computer-readable medium containing instructions for controlling a data processing system including a computer to perform a method, the data processing system having a memory device with source code and a secondary storage device with a data structure within a database of data structures useable to form an object-oriented element from the data structure corresponding to the source code, the method comprising the steps of:

providing a software development tool having a user interface that is operable by a user to automatically reflect a modification in the source code to avoid completely regenerating the source code, wherein the software development tool is for performing the following steps:

receiving an indication that the data source has been modified;

automatically reflecting via the computer the modification in the source code so as to avoid completely regenerating the source code;

receiving user input to modify the source code;

converting the source code modification to a transient meta model after receiving user input, wherein the transient meta model includes a language-neutral representation of the source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

80. The computer-readable medium of claim 79, wherein the step of automatically reflecting the modification comprises having the computer perform the following steps:

determining whether a first attribute in the source code is associated with a first attribute field in the data structure; and when it is determined that a first attribute in the source code is not associated with a first attribute field in the data structure, removing the first attribute from the source code.

81. The computer-readable medium of claim 80, wherein the step of removing the first attribute from the source code comprises the step of removing via the computer a first method associated with the first attribute in the source code.

82. The computer-readable medium of claim 80, wherein the step of automatically reflecting the modification further comprises having the computer perform the following steps:

determining whether a second attribute field in the data structure is associated with a second attribute in the source code; and when it is determined that a second attribute field in the data structure is not associated with a second attribute in the source code, generating the second attribute in the source code from the second attribute field and associating the second attribute with the second attribute field.

83. The computer-readable medium of claim 82, wherein the step of generating the second attribute in the source code comprises the step of generating via the computer a second method in the source code to access the second attribute field of the data structure.

84. The computer-readable medium of claim 79, wherein the source code comprises a class.

85. The computer-readable medium of claim 79, wherein the source code comprises a distributed computing component.

86. The computer-readable medium of claim 85, wherein the distributed computing component is an Enterprise JavaBean.

87. A computer-readable medium containing instructions for controlling a data processing system including a computer to perform a method, the data processing system having a memory device with source code, the method comprising the steps of: providing a software development tool having a user interface that is operable by a user to automatically reflect a modification in the source code to avoid completely regenerating the source code, wherein the software development tool includes computer instructions for performing the following steps:

determining via the computer whether the source code is associated with a data structure within a database of data structures useable to form and object-oriented element from the data structure;

when it is determined that the source code is associated with the data structure, storing an identification of the data structure in a comment of the source code to relate the data structure with the source code and determining via the computer whether a first attribute in the source code is associated with a first attribute field of the data structure;

when it is determined that the first attribute in the source code is not associated with the first attribute field in the data structure, generating the first attribute field in the data structure;

determining via the computer whether a second attribute field in the data structure is associated with a second attribute in the source code;

when it is determined that the second attribute field is not associated with the second attribute in the source code, removing via the computer the second attribute field from the data structure;

receiving user input to modify the source code;

converting the source code modification to a transient meta model after receiving user input, wherein the transient meta model includes a language-neutral representation of the source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

88. The computer-readable medium of claim 87, wherein the method further comprises the step of when it is determined that the source code is not associated with the data structure, generating via the computer the data structure from the source code.

89. The computer-readable medium of claim 87, wherein the step of determining whether the source code is associated with the data structure comprises the step of searching via the computer a comment in the source code for an identification of the data structure.

90. The computer-readable medium of claim 87, wherein the step of determining whether the source code is associated with the data structure comprises the step of comparing via the computer a name for the source code with an identification of the data structure.

91. The computer-readable medium of claim 87, wherein the method further comprises having the computer perform the following steps:

retrieving access information for a database that stores the data structure; and retrieving a portion of the data structure from the database using the access information.

92. The computer-readable medium of claim 91, wherein the step of retrieving the access information comprises the step of retrieving via the computer an identification of the data structure and the access information from a configuration file.

93. The computer-readable medium of claim 91, wherein the step of retrieving the access information comprises the step of retrieving via the computer an identification of the data structure and the access information from a comment of the source code.

94. The computer-readable medium of claim 91, wherein the portion of the data structure comprises the first attribute field in the data structure.

95. The computer-readable medium of claim 87, wherein the source code comprises a class.

96. The computer-readable medium of claim 87, wherein the source code comprises a distributed computing component.

97. The computer-readable medium of claim 87, wherein the first attribute field in the data structure is related to a method in the source code.

98. A computer-readable medium containing instructions for controlling a data processing system to perform a method, the data processing system having a memory device with source code, the method comprising the steps of:

providing a software development tool having a user interface that is operable by a user to automatically reflect a modification in the source code to avoid completely regenerating the source code, wherein the software development tool includes computer instructions for performing the following steps:

receiving an indication to update a data structure within a database of data structures useable to form an object-oriented element from the data structure related to the source code;

determining via the computer whether the data structure is associated with the source code;

when a determination is made that the data structure is associated with the source code, storing an identification of the data structure in a comment of the source code to relate the data structure with the source code and another determination is made determining via the computer whether a first attribute field of the data structure is associated with a first attribute in the source code;

when it is determined that the first attribute field of the data structure is not associated with the first attribute of the source code, removing via the computer the first attribute field from the data structure;

determining via the computer whether a second attribute in the source code is associated with a second attribute field in the data structure;

when it is determined that the second attribute is not associated with the second attribute field in the data structure, adding the second attribute field to the data structure;

receiving user input to modify the source code;

converting the source code modification to a transient meta model after receiving user input, wherein the transient meta model includes a language-neutral representation of the source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

99. The computer-readable medium of claim 98, wherein the method further comprises having the computer perform the following steps:

retrieving access information for a database that stores the data structure; and retrieving a portion of the data structure from the database using the access information.

100. The computer-readable medium of claim 99, wherein the step of retrieving the access information comprises the step of retrieving via the computer an identification of the data structure and the access information from a configuration file.

101. The computer-readable medium of claim 99, wherein the step of retrieving the access information comprises the step of retrieving via the computer an identification of the data structure and the access information from a comment of the source code.

102. The computer-readable medium of claim 99, wherein the portion of the data structure comprises the first attribute field in the data structure.

103. The computer-readable medium of claim 98, wherein the source code comprises a class.

104. The computer-readable medium of claim 98, wherein the source code comprises a distributed computing component.

105. A computer-readable medium containing instructions for controlling a data processing system including a computer to perform a method, the data processing system having a memory device with source code and a secondary storage device with a data structure corresponding to the source code, the method comprising the steps of:

providing a software development tool having a user interface that is operable by a user to automatically reflect a modification in the source code to avoid completely regenerating the source code, wherein the software development tool includes computer instructions for performing the following steps:

receiving an indication that the source code has been modified; and automatically reflecting via computer the modification in the data structure so as to avoid completely regenerating the data structure;

receiving user input to modify the source code;

converting the source code modification to a transient meta model after receiving user input, wherein the transient meta model includes a language-neutral representation of the source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

106. The computer-readable medium of claim 105, wherein the step of automatically reflecting the modification comprises having the computer perform the following steps:

determining whether a first attribute in the source code is associated with a first attribute field of the data structure; and when it is determined that a first attribute is not associated with a first attribute field in the data structure, generating the first attribute field in the data structure.

107. The computer-readable medium of claim 105, wherein the method further comprises having the computer perform the following steps:

determining whether a second attribute field in the data structure is associated with a second attribute in the source code; and when it is determined that a second attribute field is not associated with a second attribute in the source code, removing the second attribute field from the data structure.

108. The computer-readable medium of claim 105, wherein the method further comprises having the computer perform the following steps:

retrieving access information for a database that stores the data structure; and retrieving a portion of the data structure from the database using the access information.

109. The computer-readable medium of claim 108, wherein the step of retrieving the access information comprises the step of retrieving via the computer an identification of the data structure and the access information from a configuration file.

110. The computer-readable medium of claim 108, wherein the step of retrieving the access information comprises the step of retrieving via the computer an identification of the data structure and the access information from a comment of the source code.

111. The computer-readable medium of claim 108, wherein the portion of the data structure comprises the first attribute field in the data structure.

112. The computer-readable medium of claim 105, wherein the source code comprises a class.

113. The computer-readable medium of claim 105, wherein the source code comprises a distributed computing component.

114. The computer-readable medium of claim 105, wherein the first attribute field in the data structure is related to a method in the source code.

115. A data processing system comprising:

a software development tool having a user interface that is operable by a user to automatically reflect a modification in the source code to avoid completely regenerating the source code;

a secondary storage device further comprising source code that corresponds to a data structure within a database of data structures useable to form an object-oriented element from the data structure on a secondary storage device;

a computer including a memory device further comprising a program that receives an indication to update the source code;

determining via the computer whether the data structure is associated with the source code;

when a determination is made that the data structure is associated with the source code, storing an identification of the data structure in a comment of the source code to relate the data structure with the source code and another determination is made as to whether a first attribute in the source code is associated with a first attribute field in the data structure;

when determined that a first attribute in the source code is not associated with a first attribute field in the data structure, the program generates a source code modification wherein the source code modification includes removing removes the first attribute from the source code;

determining whether a second attribute field in the data structure is associated with a second attribute in the source code;

when determined that a second attribute field is not associated with a second attribute in the source code, the computer program generates another source code modification wherein the source code modification includes generating the second attribute in the source code from the second attribute field and associating via computer the second attribute with the second attribute field;

receiving user input to modify the source code;

converting the source code modification to a transient meta model after receiving user input, wherein the transient meta model includes a language-neutral representation of the source code modification and the another source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

116. The data processing system of claim 115, wherein the computer program further retrieves via the computer an identification of the data structure and access information for the secondary storage from a comment in the source code.

117. The data processing system of claim 116, wherein the computer program further retrieves a portion of the data structure from the secondary storage device using the access information.

118. The data processing system of claim 117, wherein the portion comprises the first and the second attribute fields.

119. The data processing system of claim 115, wherein when the computer program removes the first attribute from the source code, the computer program removes a method associated with the first attribute from the source code.

120. The data processing system of claim 115, wherein when the computer program generates the second attribute in the source code, the computer program generates a method in the source code to access the second attribute field of the data structure.

121. A data processing system comprising:

a software development tool having a user interface that is operable by a user to automatically reflect a modification in the source code to avoid completely regenerating the source code; a secondary storage device further comprising source code;

a computer including a memory device further comprising a computer program that receives an indication to update a data structure within a database of data structures useable to form an object-oriented element from the data structure related to the source code, that determines whether a first attribute field of the data structure is associated with a first attribute in the source code;

when determined that the data structure is associated with the source code, the computer program stores an identification of the data structure in a comment of the source code to relate the data structure with the source code and when determined that the first attribute field of the data structure is not associated with the first attribute of the source code, the computer program removes the first attribute field from the data structure, the computer program further determines whether a second attribute in the source code is associated with a second attribute field in the data structure;

when determined that the second attribute is not associated with the second attribute field in the data structure, the computer program adds the second attribute field to the data structure;

receiving user input to modify the source code;

converting the source code modification to a transient meta model after receiving user input, wherein the transient meta model includes a language-neutral representation of the source code modification, and wherein the language-neutral representation is configured to textually display the source code modification in the language and configured to display a graphical representation of at least a portion of the database of data structures;

modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and using a QA module to evaluate the modified source code, wherein an error message is generated and displayed if the modified source code does not conform to a predefined or user-defined style.

122. The data processing system of claim 121, wherein when the program further retrieves access information for a database that stores the data structure, and retrieves a portion of the data structure from the database using the access information.

123. The data processing system of claim 122, wherein when the computer program retrieves the access information, and the computer program retrieves an identification of the data structure and the access information from a configuration file.

124. The data processing system of claim 122, wherein when the computer program retrieves the access information, the computer program retrieves an identification of the data structure and the access information from a comment of the source code.

125. The data processing system of claim 122, wherein the portion of the data structure comprises the first attribute field in the data structure.

126. The data processing system of claim 121, wherein the source code comprises a class.

127. The data processing system of claim 121, wherein the source code comprises a distributed computing component.

128. A system including a computer having a memory device with source code and a secondary storage device with a data structure within a database of data structures useable to form an object-oriented element from the data structure corresponding to the source code, the system comprising:

a software development tool having a user interface that is operable by a user to modify source code;

wherein the software development tool includes computer instructions for storing the identification of the data structure in a comment of the source code to relate the data structure with the source code when a determination is made that the data structure is associated with the source code;

wherein the software development tool includes computer instructions for receiving an indication that the data structure has been modified; and computer instruction for automatically reflecting the modification in the source code so as to avoid completely regenerating the source code;

wherein the software development tool includes computer instructions for converting the source code modification to a transient meta model after reflecting the modification in the source code, wherein the transient meta model includes a language-neutral representation of the source code modification, and wherein the language-neutral representation is configured to textually display the source code modification in the language and configured to display a graphical representation of at least a portion of the database of data structures;

wherein the software development tool includes computer instruction for modifying and displaying via the computer a graphical representation of at least a portion of the language-neutral representation to reflect the source code modification and a textual representation of at least a portion of the language-neutral representation to reflect the source code modification, wherein the textual representation and the graphical representation are displayed simultaneously; and a QA module configured to evaluate the modified source code, wherein an error message is generated and displayed if the modified source code does not conform to a predefined or user-defined style.

* * * * *